United States Patent
Fujita et al.

(10) Patent No.: US 12,514,398 B2
(45) Date of Patent: *Jan. 6, 2026

(54) DATA PROCESSING DEVICE AND DATA PROCESSING METHOD

(71) Applicant: SONY GROUP CORPORATION, Tokyo (JP)

(72) Inventors: Masahiro Fujita, Saitama (JP); Kaoru Yoshida, Kanagawa (JP); Michael Siegfried Spranger, Tokyo (JP); Tatsushi Nashida, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 389 days.

This patent is subject to a terminal disclaimer.

(21) Appl. No.: 17/433,814

(22) PCT Filed: Feb. 14, 2020

(86) PCT No.: PCT/JP2020/005729
§ 371 (c)(1),
(2) Date: Aug. 25, 2021

(87) PCT Pub. No.: WO2020/179408
PCT Pub. Date: Sep. 10, 2020

(65) Prior Publication Data
US 2022/0142397 A1    May 12, 2022

(30) Foreign Application Priority Data
Mar. 1, 2019   (JP) ................................ 2019-038071

(51) Int. Cl.
*A23L 5/10*     (2016.01)
*A47J 36/32*    (2006.01)
(Continued)

(52) U.S. Cl.
CPC ................. *A47J 36/32* (2013.01); *A23L 5/10* (2016.08); *A61B 5/024* (2013.01); *A61B 5/381* (2021.01);
(Continued)

(58) Field of Classification Search
None
See application file for complete search history.

(56) References Cited

U.S. PATENT DOCUMENTS 12,171,365 B2 * 12/2024 Fujita ..................... B25J 9/0084
2016/0059412 A1 * 3/2016 Oleynik ................... B25J 19/02
700/250

(Continued)

FOREIGN PATENT DOCUMENTS

JP      2010061381 A    *   3/2010
JP      2011-108156 A       6/2011
(Continued)

OTHER PUBLICATIONS

JP 2010-061381 A (Takahashi, Nobuki et al.) Mar. 18, 2010 [retrieved on Feb. 22, 2025]. Retrieved from Foreign Image and Text Database, translation by Clarivate Analytics. (Year: 2010).*

*Primary Examiner* — John J Norton
(74) *Attorney, Agent, or Firm* — Paratus Law Group, PLLC

(57) ABSTRACT

There is provided a data processing device and a data processing method capable of customizing a dish made by a cooking robot according to a preference of a person who eats the dish. The data processing device (11) according to one aspect of the present technology generates recipe data including a data set used when a cooking robot (1) performs a cooking operation, the data set linking cooking operation data in which information regarding an ingredient of a dish and information regarding an operation of a cook in a cooking process using the ingredient are described, and cook
(Continued)

biological data indicating a biological reaction of the cook measured in conjunction with progress of the cooking process. The present technology can be applied to a computer that controls cooking in a cooking robot.

17 Claims, 44 Drawing Sheets

(51) Int. Cl.
*A61B 5/00* (2006.01)
*A61B 5/024* (2006.01)
*A61B 5/381* (2021.01)
*A61B 5/389* (2021.01)
*B25J 11/00* (2006.01)

(52) U.S. Cl.
CPC ............ *A61B 5/389* (2021.01); *A61B 5/4803* (2013.01); *A23V 2002/00* (2013.01); *A61B 2503/20* (2013.01); *B25J 11/0045* (2013.01)

(56) References Cited

U.S. PATENT DOCUMENTS

| | | | |
|---|---|---|---|
| 2018/0168385 A1* | 6/2018 | Boone | G06Q 30/0621 |
| 2019/0310611 A1* | 10/2019 | Jain | B67D 1/0888 |
| 2022/0142398 A1* | 5/2022 | Fujita | B25J 11/008 |

FOREIGN PATENT DOCUMENTS

| | | | | |
|---|---|---|---|---|
| JP | 2016-103042 A | 6/2016 | | |
| JP | 2017-506169 A | 3/2017 | | |
| JP | 2017-536247 A | 12/2017 | | |
| WO | WO-2014009280 A2 * | 1/2014 | ............. | A47J 36/32 |

* cited by examiner

FIG. 6

FLAVOR(flavor)=TASTE(taste)+AROMA(aroma)+TEXTURE(texture)

DATA PROCESSING DEVICE AND DATA PROCESSING METHOD

CROSS REFERENCE TO PRIOR APPLICATION

This application is a National Stage Patent Application of PCT International Patent Application No. PCT/JP2020/005729 (filed on Feb. 14, 2020) under 35 U.S.C. § 371, which claims priority to Japanese Patent Application No. 2019-038071 (filed on Mar. 1, 2019), which are all hereby incorporated by reference in their entirety.

TECHNICAL FIELD

The present technology relates to a data processing device and a data processing method, and more particularly relates to a data processing device and a data processing method capable of customizing a dish made by a cooking robot according to a preference of a person who eats the dish.

BACKGROUND ART

There has been studied a technique of reproducing a dish made by a cook on a cooking robot side by sensing movement of the cook during cooking, and storing and transmitting data of a sensing result. A cooking operation by the cooking robot is performed such that, for example, the same movement as the movement of the hand of the cook is achieved on the basis of the sensing result.

CITATION LIST

Patent Document

Patent Document 1: Japanese Translation of PCT International Application Publication No. 2017-506169
Patent Document 2: Japanese Translation of PCT International Application Publication No. 2017-536247

SUMMARY OF THE INVENTION

Problems to be Solved by the Invention

Cooking by a conventional cooking robot proceeds according to a recipe prepared in advance as control data. Thus, the completed dish may not match a preference of a person who eats the dish.

The present technology has been made in view of such a situation, and enables customization of a dish made by a cooking robot according to a preference of a person who eats the dish.

Solutions to Problems

A data processing device according to one aspect of the present technology includes a generation unit that generates recipe data including a data set used when a cooking robot performs a cooking operation, the data set linking cooking operation data in which information regarding an ingredient of a dish and information regarding an operation of a cook in a cooking process using the ingredient are described, and cook biological data indicating a biological reaction of the cook measured in conjunction with progress of the cooking process.

In one aspect of the present technology, there is generated recipe data including a data set used when a cooking robot performs a cooking operation, the data set linking cooking operation data in which information regarding an ingredient of a dish and information regarding an operation of a cook in a cooking process using the ingredient are described, and cook biological data indicating a biological reaction of the cook measured in conjunction with progress of the cooking process.

BRIEF DESCRIPTION OF DRAWINGS

FIG. 6 is a diagram illustrating examples of components of flavor.

MODE FOR CARRYING OUT THE INVENTION

Overview of Present Technology

Figure 1:
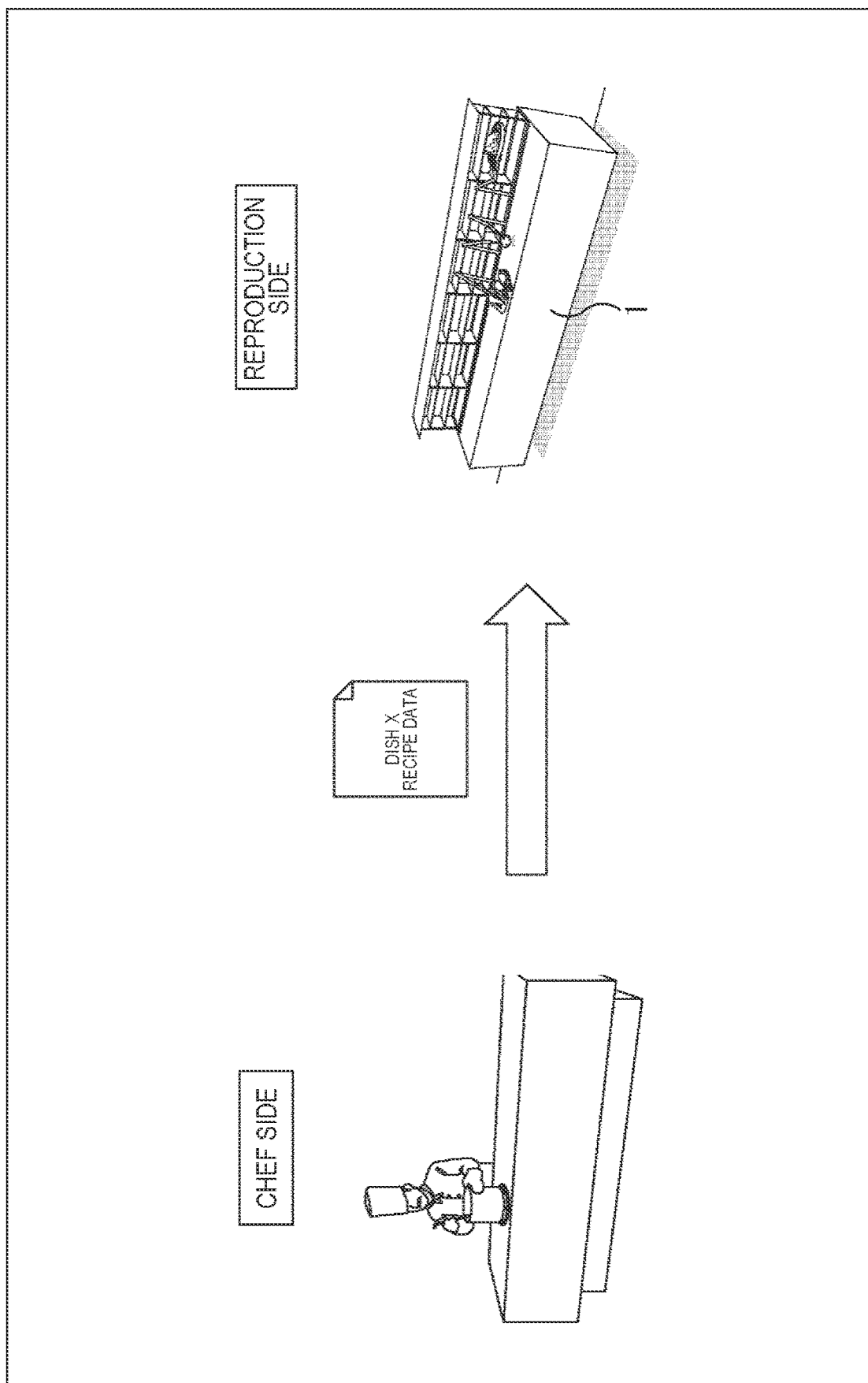
FIG. 1 is a diagram illustrating an example of overall processing in a cooking system according to one embodiment of the present technology.

The present technology senses a biological reaction when a cook makes a dish, includes sensed biological data in recipe data, and provides the recipe data to a side of a cooking robot that reproduces the dish.

Furthermore, the present technology uses the biological data included in the recipe data on the cooking robot side to update a cooking process at the time of reproducing the dish made by the cook, thereby enabling reproduction of a dish having a flavor finely adjusted according to a preference of a person who eats the dish.

Moreover, the present technology focuses on a difference (difference amount) between a sensation when a cook makes a dish and a sensation when cooking is performed on the basis of a recipe created by the cook, and links sensation data, which is obtained by converting a sensation of the cook at the time of making the dish into data, to data describing ingredients and a cooking process and manages the data as recipe data.

Hereinafter, a mode for carrying out the present technology will be described. The description will be made in the following order.

1. Generation of recipe data and reproduction of dish in cooking system
2. Regarding description of recipe data
3. Example of generating recipe data
4. Example of flow of generation of recipe data and reproduction of dish
5. Modification example of description of recipe data
6. Configuration example of cooking system
7. Operation of cooking system
8. Recipe data including flavor information
9. Modification example <Generation of Recipe Data and Reproduction of Dish in Cooking System>

FIG. 1 is a diagram illustrating an example of overall processing in a cooking system according to one embodiment of the present technology.

As illustrated in FIG. 1, the cooking system includes a configuration on a side of a chef who performs cooking and a configuration on a reproduction side that reproduces a dish made by the chef.

The configuration on the chef side is, for example, a configuration provided in a certain restaurant, and the configuration on the reproduction side is, for example, a configuration provided in a general home. As a configuration on the reproduction side, a cooking robot 1 is prepared.

The cooking system of FIG. 1 is a system that reproduces the same dish as a dish made by the chef, by the cooking robot 1 as a configuration on the reproduction side. The cooking robot 1 is a robot having a drive system device such as a cooking arm and various sensors and is provided with a function of performing cooking.

From the configuration on the chef side to the configuration on the reproduction side including the cooking robot 1, recipe data is provided as indicated by an arrow. As will be described in detail later, the recipe data describes information regarding a dish made by the chef including ingredients of the dish.

In the configuration on the reproduction side, a cooking operation of the cooking robot 1 is controlled on the basis of recipe data, thereby reproducing the dish. For example, a dish is reproduced by causing the cooking robot 1 to perform the cooking operation for achieving the same process as the cooking process of the chef.

Although the chef is illustrated as a cook who performs cooking, the cooking system of FIG. 1 can be applied to cases where any person performs cooking regardless of names such as a chef and a cook and a role in a kitchen.

Furthermore, in FIG. 1, only a configuration on the side of one chef is illustrated, but the cooking system includes configurations on sides of a plurality of chefs provided respectively in a plurality of restaurants and the like. To the configuration on the reproduction side, for example, recipe data of a predetermined dish made by a predetermined chef selected by a person who eats the dish reproduced by the cooking robot 1 is provided.

Note that the dish means a product completed through cooking. The cooking means a process of making a dish or an action (operation) of making a dish.

Figure 2:
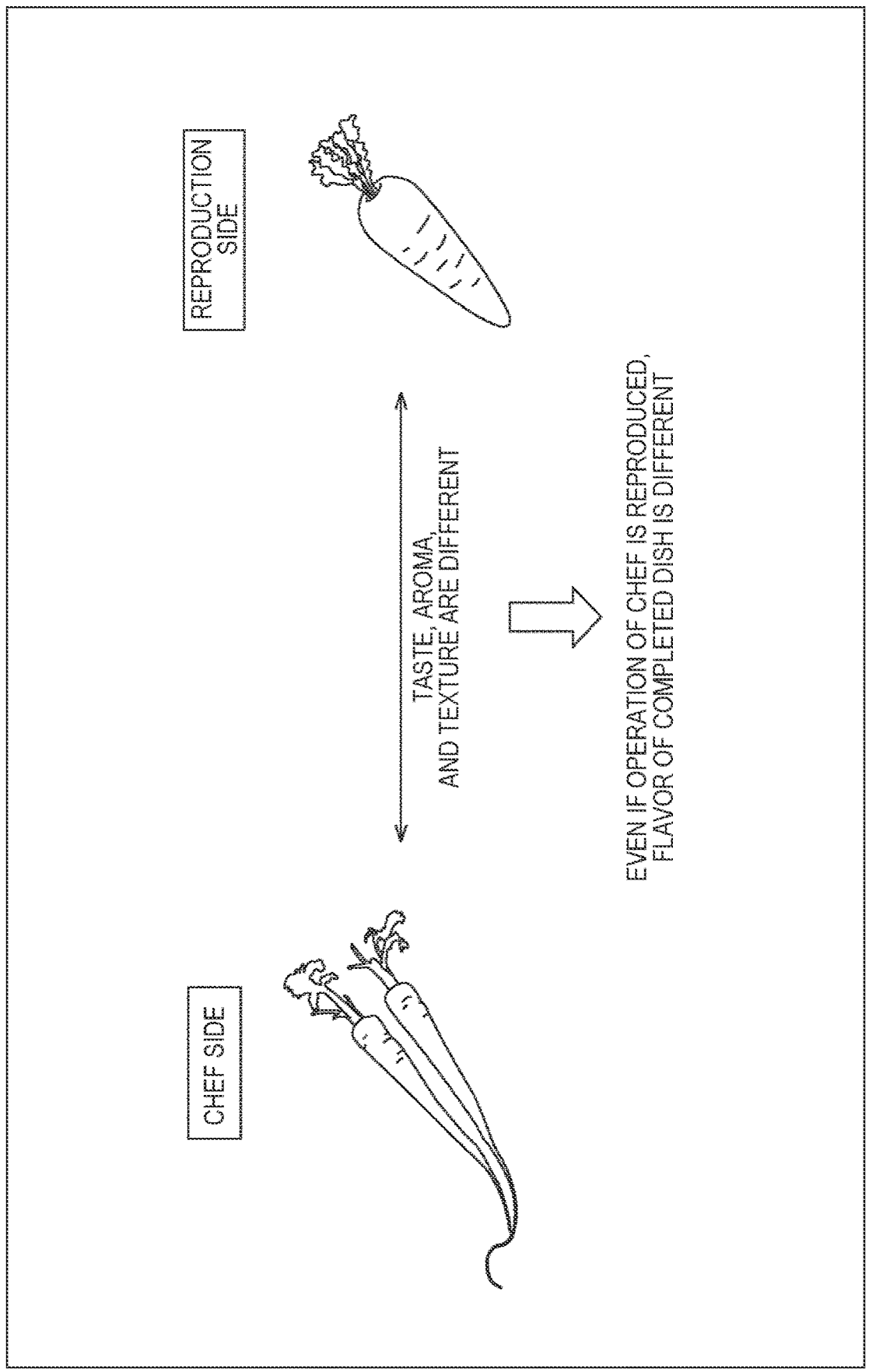
FIG. 2 is a diagram describing a difference in ingredients used on each of a chef side and a reproduction side.

FIG. 2 is a diagram describing a difference in ingredients used on each of the chef side and the reproduction side.

For example, in a case where a carrot is used for cooking by the chef, information indicating that the carrot is used as an ingredient is described in the recipe data. Furthermore, information associated with a cooking process using the carrot is described.

Similarly, on the reproduction side, the cooking operation using the carrot is performed on the basis of the recipe data.

Here, even among ingredients classified as the same "carrot", the taste, aroma, and texture of the carrot prepared on the chef side and the carrot prepared on the reproduction side are different depending on a difference in type, a difference in production area, a difference in harvest time, a difference in growth situation, a difference in environment after harvest, and the like. There are no completely the same ingredients among ingredients as natural objects.

Therefore, even if the cooking robot 1 is caused to perform completely the same cooking operation as the operation of the chef, the flavor of the dish completed using the carrot is different.

Although a plurality of cooking processes is required until one dish is completed, even when an intermediate dish that is completed through one cooking process using the carrot is seen, the flavor of the dish is different between the chef side and the reproduction side.

Even a dish that the chef feels delicious will not always be felt the same way depending on a person who eats the dish reproduced by the cooking robot 1.

Accordingly, in the cooking system of FIG. 1, biological reaction of the chef who is cooking is measured. In the recipe data provided to the reproduction side, biological information obtained by converting the biological reaction of the chef into data is described by linking with information of ingredients and operations.

On the reproduction side, it is required to perform tasting by a person present around the cooking robot 1, such as a person who eats the dish reproduced by the cooking robot 1 until all the cooking processes finish. For example, the timing of tasting at which the biological reaction that the chef feels delicious is measured is specified on the basis of the biological information included in the recipe data, and the tasting is required to be performed at the corresponding timing.

Furthermore, biological reaction of a person performing tasting is measured, and the cooking process of the cooking robot 1 is appropriately updated according to a measurement result.

It can be said that the biological reaction when a person puts food into the mouth represents how the person feels the flavor. Cooking by the cooking robot 1 is controlled on the basis of biological information indicating how the chef feels the flavor, and the cooking process described in the recipe data is updated according to how the person who has performed tasting while cooking by the cooking robot 1 feels flavor.

Hereinafter, the biological information indicating the biological reaction of the chef is appropriately referred to as cook biological information.

Furthermore, a person who eats cooked ingredients cooked by the cooking robot 1 or a completed (reproduced) dish using the cooked ingredients is referred to as an eating person. The biological information indicating the biological reaction of the eating person who has performed tasting in response to the request by the cooking robot 1 is eating person biological information.

<Regarding Description of Recipe Data>

Figure 3:
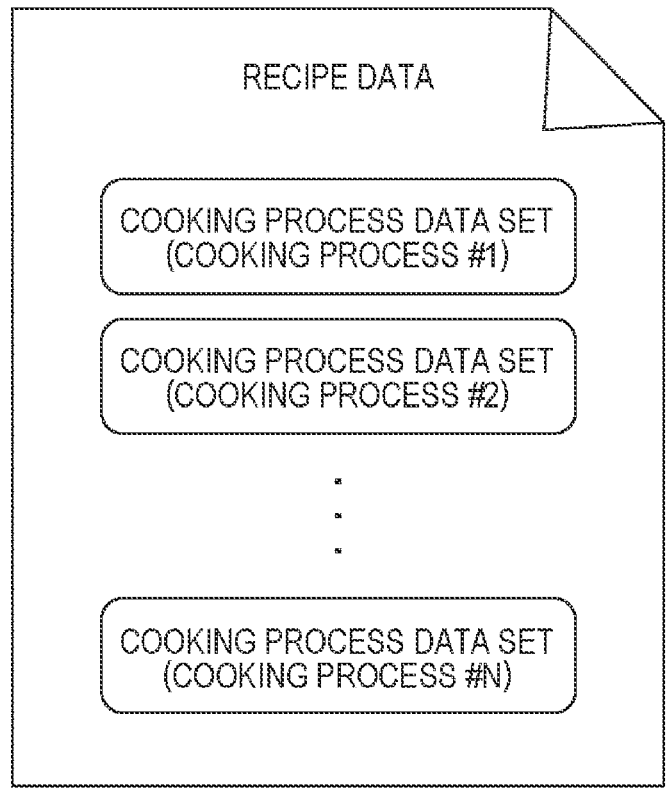
FIG. 3 is a diagram illustrating an example of description contents of recipe data.

FIG. 3 is a diagram illustrating an example of description contents of recipe data.

As illustrated in FIG. 3, one recipe data includes a plurality of cooking process data sets. In the example of FIG. 3, a cooking process data set associated with a cooking process #1, a cooking process data set related to a cooking process #2, . . . , and a cooking process data set related to cooking process #N are included.

Thus, in the recipe data, information associated with one cooking process is described as one cooking process data set.

Figure 4:
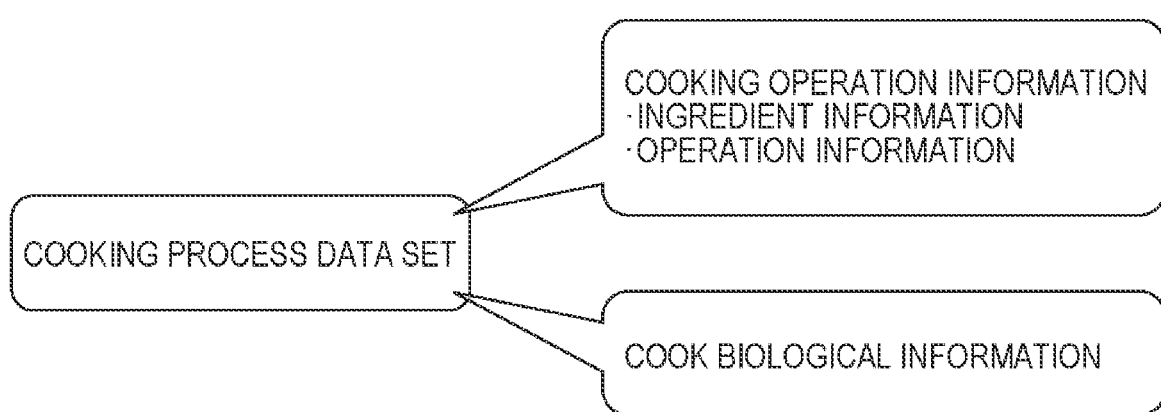
FIG. 4 is a diagram illustrating an example of information included in a cooking process data set.

FIG. 4 is a diagram illustrating an example of information included in a cooking process data set.

As illustrated in a balloon of FIG. 4, the cooking process data set includes cooking operation information that is information regarding a cooking operation for achieving the cooking process, and cook biological information indicating the biological reaction of the chef.

1. Cooking Operation Information

The cooking operation information includes ingredient information and operation information.

1-1. Ingredient Information

The ingredient information is information regarding ingredients used by the chef in the cooking process. The information regarding ingredients includes information indicating a type of ingredient, an amount of ingredient, a size of ingredient, and the like.

For example, in a case where the chef performs cooking using a carrot in a certain cooking process, information indicating that the carrot is used is included in the ingredient information. The ingredient information also includes information indicating various foods used by the chef as ingredients of the dish, such as water and seasoning, and the like. Foods are various things that can be eaten by a person.

Note that the ingredients include not only an ingredient that has not been cooked at all but also a cooked (pre-processed) ingredient obtained by performing certain cooking. The ingredient information included in the cooking operation information of a certain cooking process includes information of cooked ingredients having undergone a previous cooking process.

The ingredients used by the chef are recognized, for example, by analyzing an image captured by a camera of the chef who is cooking. The ingredient information is generated on the basis of a recognition result of the ingredients. The image captured by the camera may be a moving image or a still image.

At the time of generating the recipe data, the ingredient information may be registered by the chef or by another person such as a staff supporting the chef.

1-2. Operation Information

The operation information is information regarding movement of the chef in the cooking process. The information regarding the movement of the chef includes information indicating the type of a cooking tool used by the chef, the movement of the body of the chef at each time including movement of the hands, the standing position of the chef at each time, and the like.

For example, in a case where the chef cuts a certain ingredient by using a kitchen knife, information indicating that the kitchen knife is used as a cooking tool, and information indicating a cutting position, the number of times of cutting, a force level of a cutting method, an angle, a speed, and the like are included in the operation information.

Furthermore, in a case where the chef stirs a pot containing a liquid as an ingredient using a ladle, the operation information includes information indicating that the ladle has been used as a cooking tool, and information indicating a force level, an angle, a speed, a time, and the like of the manner of stirring.

In a case where a certain ingredient is baked by a chef using an oven, information indicating that the oven is used as a cooking tool, information indicating heating power of the oven, baking time, and the like are included in the operation information.

In a case where the chef performs serving, the operation information includes information of serving manners indicating a dish used for serving, how to arrange the ingredients, the color of the ingredients, and the like.

The movement of the chef is recognized, for example, by analyzing an image of the chef who is cooking captured by a camera, or by analyzing sensor data measured by a sensor worn by the chef. The operation information is generated on the basis of a recognition result of the movement of the chef.

2. Cook Biological Information

Figure 5:
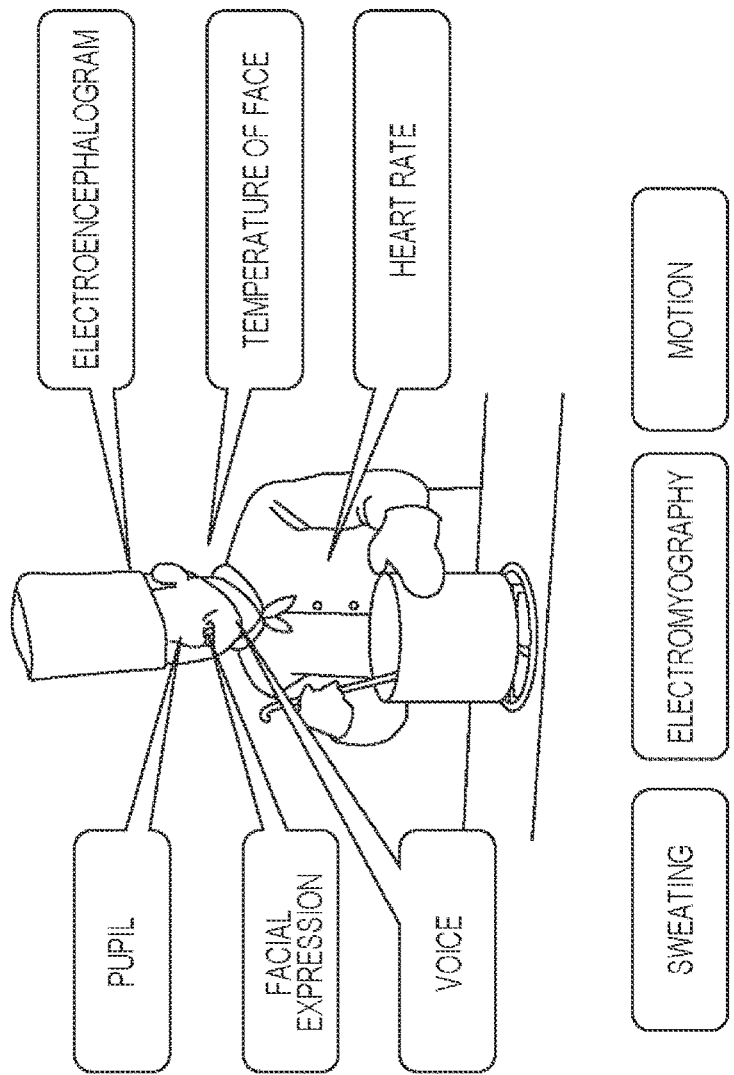
FIG. 5 is a diagram illustrating an example of a biological reaction to be measured.

FIG. 5 is a diagram illustrating an example of a biological reaction to be measured.

As illustrated in FIG. 5, for example, electroencephalogram, pupil, sweating, electromyogram of four limbs, temperature of the entire face, facial expression, motion of the entire body, heart rate, and voice sound are measured as the biological reaction of the chef.

(1) Electroencephalogram (EEG)

An electroencephalogram of the chef is measured using an electroencephalograph. The electroencephalogram when the chef performs tasting includes signals from a taste receptor and an olfactory receptor. By analyzing the electroencephalogram, it is possible to specify how the chef feels a taste, how the chef feels an aroma, and the like.

(2) Pupil

A change in a pupil of the chef is measured by analyzing an image captured by a camera. Emotions can be specified from the opening and closing degree of the pupil such that the pupil opens when the person is happy or surprised. For example, in a case where the opening and closing degree of a pupil of the chef who has performed tasting is higher than a threshold, it can be estimated that the chef is feeling delicious.

(3) Sweating

The change in the amount of sweating of the chef is measured by analyzing an image captured by a camera or by analyzing a measurement result by a skin sensor that measures a moisture content of the skin. For example, eating warm or hot food may increase blood flow and increase the amount of sweating.

(4) Electromyogram of Four Limbs

A change in the electromyogram of the chef is measured using an electromyograph. It is possible to specify the emotion from changes in the electromyogram such that when there is a pleasant thing, force is instantaneously applied to the limbs and changes in the electromyogram can be observed. For example, in a case where the electromyogram greatly changes when tasting is performed, it can be estimated that the chef is feeling delicious.

(5) Temperature of Entire Face

The temperature of the entire face of the chef is measured using an infrared sensor. For example, eating warm or hot food may increase blood flow and increase the temperature of the entire face.

(6) Facial Expression

The facial expression of the chef is measured by analyzing an image captured by the camera. For example, in a case where an expression of the chef at the time of tasting is a happy expression, it can be estimated that the chef is feeling delicious, and conversely, in a case of a sad expression, it can be estimated that the chef is not feeling that the taste is good.

(7) Overall Body Motion

A motion (movement) of the entire body of the chef is measured by analyzing an image captured by the camera or sensor data representing a measurement result of a motion sensor attached to the body of the chef. It can be said that the motion of the entire body represents how the flavor is felt because there are not many people who remain still when eating delicious food.

(8) Heart Rate

The heart rate of the chef is measured using a wearable activity meter. For example, in a case where the heart rate increases when tasting is performed, it can be estimated that the chef is feeling delicious.

(9) Voice Sound

The voice sound of the chef is measured by analyzing a voice collected by the microphone. For example, in a case where the frequency of the voice of the chef uttered when performing tasting is higher than the frequency of the voice uttered before performing tasting, it can be estimated that the chef is feeling delicious.

The meaning of an utterance of the chef may be analyzed, and whether or not the chef is feeling delicious may be estimated on the basis of a result of the semantic analysis. For example, in a case where an utterance for affirming a flavor, such as "tasty", "delicious", "OK", or "yes", is made, it can be estimated that the chef is feeling delicious.

The cook biological information is generated on the basis of the measurement result of the biological reaction of the chef as described above and included in the recipe data. The cook biological information includes, as data indicating how the chef feels the flavor, data indicating the state of the electroencephalogram of the chef, data indicating the states of pupils, data indicating the state of sweating, data indicating the state of electromyogram of the four limbs, data indicating the state of temperature of the entire face, data indicating the state of the facial expression, data indicating the state of motion of the entire body, data indicating the state of the heart rate, and data indicating the state of voice sound.

Rather than measuring all of the electroencephalogram, the pupils, the sweating, the electromyogram of the four limbs, the temperature of the entire face, the facial expression, the motion of the entire body, the heart rate, and the voice sound are measured, information indicating at least one of the biological reactions may be generated as the cook biological information.

Here, the flavor will be described.

FIG. 6 is a diagram illustrating examples of components of flavor.

As illustrated in FIG. 6, deliciousness sensed by a human brain, that is, "flavor" is mainly formed by combining a taste obtained by human's sense of taste, an aroma obtained by human's sense of smell, and a texture obtained by human's sense of touch.

How the taste is felt also varies depending on the sensible temperature and the color of the ingredient, and thus the flavor includes the sensible temperature and the color.

Each component of flavor will be described.

(1) Taste

Taste includes five types of tastes (saltiness, sourness, bitterness, sweetness, and umami) that can be sensed by taste receptor cells in the tongue and oral cavity. The saltiness, sourness, bitterness, sweetness, and umami are called basic five tastes.

Furthermore, the taste includes, in addition to the basic five tastes, a pungency felt by vanilloid receptors belonging to the transient receptor potential (TRP) channel family, and the like, which is a pain sensation not only in the oral cavity but also in the whole body. Depending on the concentration, the taste overlaps with the bitterness, but astringency is also a kind of taste.

Each taste will be described.

Saltiness

Substances that cause a feeling of saltiness include minerals (Na, K, Fe, Mg, Ca, Cu, Mn, Al, Zn, and the like) that produce a salt by ionic bonding.

Sourness

As substances that cause a feeling of sourness, there are acids such as citric acid and acetic acid. In general, sourness is felt depending on a decrease in pH (for example, about pH 3).

Sweetness

As substances that cause a feeling of sweetness, there are saccharides such as sucrose and glucose, lipids, amino acids such as glycine, and artificial sweeteners.

Umami

As substances that cause a feeling of umami, there are amino acids such as glutamic acid and aspartic acid, nucleic acid derivatives such as inosinic acid, guanylic acid, and xanthylic acid, organic acids such as succinic acid, and salts.

Bitterness

As substances that cause a feeling of bitterness, there are alkaloids such as caffeine, theobromine, nicotine, catechin, humulones such as terpenoid, limonin, cucurbitacin, naringin of a flavanone glycoside, a bitter amino acid, a bitter peptide, a bile acid, and inorganic salts such as a calcium salt and a magnesium salt.

Astringency

As substances that cause a feeling of astringency, there are polyphenols, tannin, catechin, polyvalent ions (Al, Zn, Cr), ethanol, and acetone. The astringency is recognized or measured as part of the bitterness.

Pungency

As a substance that causes a feeling of pungency, there is a capsaicinoid. Capsaicin, which is a component of hot capsicum and various spices, and menthol, which is a component of peppermint that gives a cool sensation, are recognized as a pain sensation rather than a sense of taste by a temperature sensitive receptor of the TRP channel family.

(2) Aroma

An aroma is perceived by a volatile low molecular weight organic compound having a molecular weight of 300 or less that is recognized (bound) by olfactory receptors expressed in the nasal cavity and the nasopharynx.

(3) Texture

Texture is an index that is what is called palate feeling, and is represented by hardness, stickiness, viscosity, cohesiveness, polymer content, moisture content (moisture), oil content (greasiness), and the like.

(4) Sensible Temperature (Apparent Temperature)

The sensible temperature is a temperature felt by human skin. The sensible temperature includes not only the temperature of food itself but temperature sensation that can also be sensed by superficial part of the skin in response to components of food, such as feeling cool by food containing a volatile substance like mint or feeling warm by food containing a pungent component like capsicum.

(5) Color

The color of food reflects pigments and components of bitterness and astringency contained in food. For example, plant-derived foods include pigments produced by photosynthesis and components related to bitterness and astringency of polyphenols. An optical measurement method makes it possible to estimate components contained in food from the color of food.

Example of Generating Recipe Data

Figure 7:
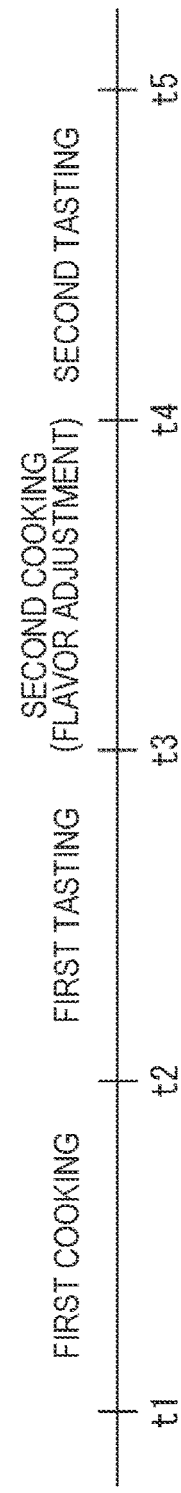
FIG. 7 is a diagram illustrating an example of a cooking process.

FIG. 7 is a diagram illustrating an example of a cooking process.

Usually, cooking by a chef is performed by repeating cooking using an ingredient, tasting the cooked ingredient, and adjusting the flavor for each cooking process.

The flavor is adjusted by adding, with respect to the taste, for example, a process such as adding salt in a case where saltiness is insufficient, or squeezing lemon juice in a case where sourness is insufficient. With respect to the aroma, for example, a process such as chopping and adding herbs or cooking the ingredient is added. With respect to the texture, for example, in a case where the ingredient is hard, a process such as softening by hitting or increasing the time for boiling is added.

In the cooking process #1 of FIG. 7, cooking using an ingredient is performed as first cooking between time t1 and time t2, and tasting of the cooked ingredient is performed as first tasting between time t2 and time t3. Furthermore, adjustment of the flavor using an ingredient such as seasoning is performed as second cooking between time t3 and time t4, and tasting of the ingredient after the adjustment of the flavor is performed as second tasting between time t4 and time t5.

The adjustment of the flavor performed as the second cooking between time t3 and time t4 is a process performed on the basis of a result of the first tasting performed before the adjustment. The second tasting performed between time t4 and time t5 is a process performed to check a result of the previous adjustment of the flavor.

In the example of FIG. 7, one cooking process includes four processes of the chef, but the number of processes of the chef included in one cooking process is arbitrary. It is also possible that one cooking process is formed by one process of the chef.

Furthermore, in the example of FIG. 7, one cooking process includes two tasting processes, but the tasting process included in one cooking process may be one, or no tasting processes may be included. The fact that the chef is tasting is recognized, for example, by analyzing an image captured by the camera. On the basis of the biological reaction of the chef, it may be recognized that the chef is performing tasting.

Figure 8:
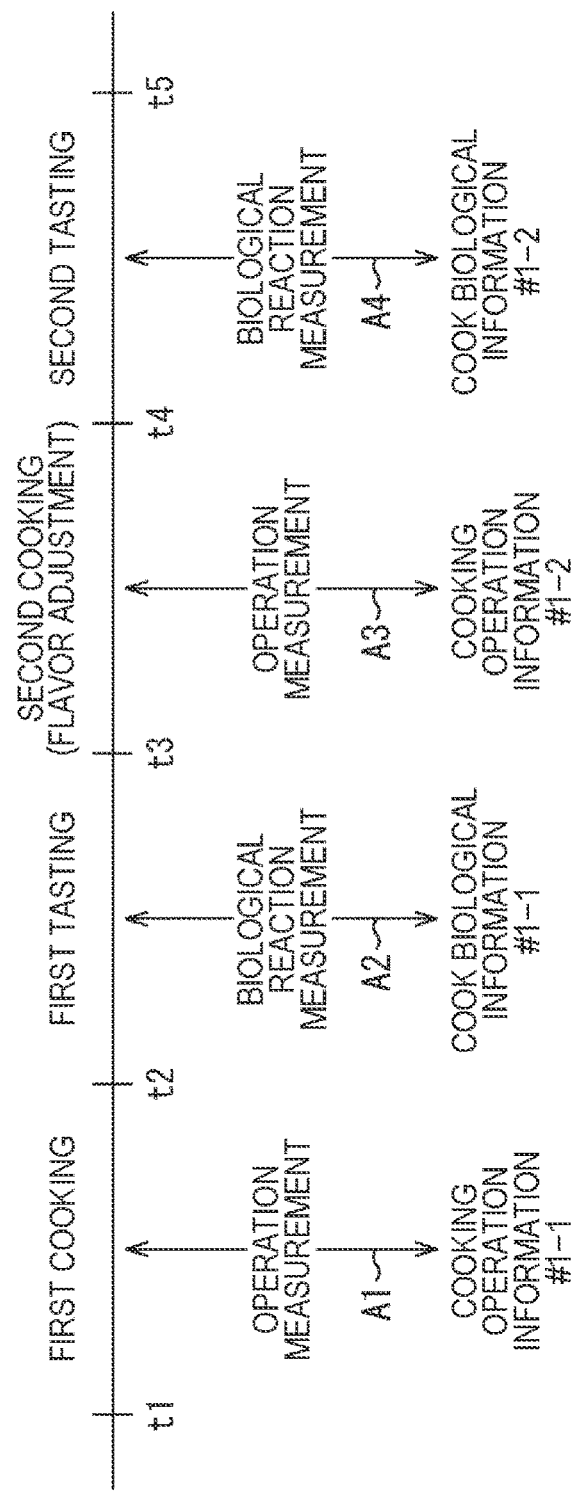
FIG. 8 is a diagram illustrating an example of generating information.

FIG. 8 is a diagram illustrating an example of generating information.

As illustrated in FIG. 8, during the period from time t1 to time t2 when the first cooking is performed, operation of the chef is measured, and ingredients used by the chef and movement of the chef are recognized. Cooking operation information #1-1 is generated as indicated ahead of an arrow A1 on the basis of a recognition result between time t1 and time t2.

Furthermore, in a case where it is recognized that the chef has started tasting at time t2, measurement of the biological reaction of the chef is started. The measurement of the biological reaction is continued, for example, until time t3 when it is recognized that the chef has finished tasting. On the basis of a measurement result between time t2 and time t3, cook biological information #1-1 is generated as indicated ahead of an arrow A2.

Similarly, during the period from time t3 to time t4 when the second cooking is performed, operation of the chef is measured, and the ingredients used by the chef and movement of the chef are recognized. Cooking operation information #1-2 is generated as indicated ahead of an arrow A3 on the basis of a recognition result between time t3 and time t4.

In a case where it is recognized that the chef has started tasting at time t4, measurement of the biological reaction of the chef is started. The measurement of the biological reaction is continued, for example, until time t5 when it is recognized that the chef has finished tasting. On the basis of a measurement result between time t4 and time t5, cook biological information #1-2 is generated as indicated ahead of an arrow A4.

For example, by integrating the cooking operation information #1-1 and the cooking operation information #1-2, cooking operation information constituting a cooking process data set of the cooking process #1 is generated.

Furthermore, by integrating the cook biological information #1-1 and the cook biological information #1-2, the cook biological information constituting a cooking process data set of the cooking process #1 is generated. The cook biological information also includes information indicating that it is generated on the basis of the biological reaction of the chef in tasting, and at which timing the tasting is performed. The cook biological information is linked to the tasting process.

Figure 9:
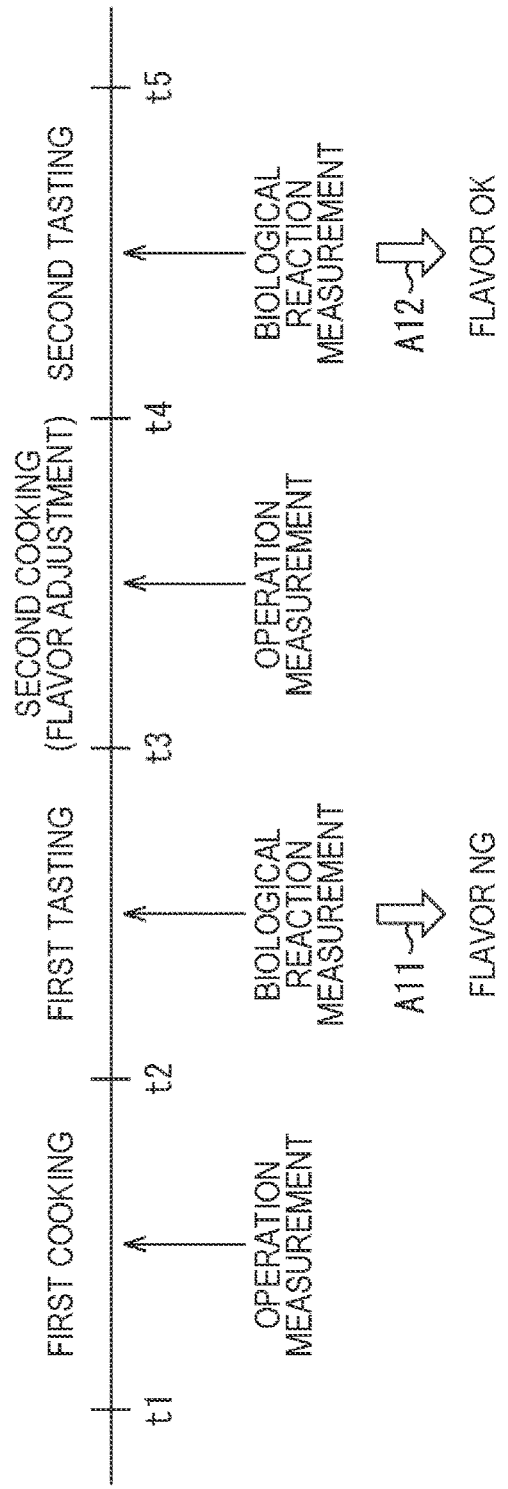
FIG. 9 is a diagram illustrating another example of generating information.

FIG. 9 is a diagram illustrating another example of generating information.

In the example of FIG. 9, the recipe data does not include the cook biological information indicating all the measured biological reactions, and for example, the recipe data includes only the cook biological information indicating the biological reaction in a case where the tasting result is OK, that is, in a case where the chef determines that it is delicious.

Whether or not the chef has determined that the ingredient that has been eaten is delicious is directly input by the chef by, for example, pressing a button provided in the kitchen, or the like.

Furthermore, whether or not the chef has determined that the eaten ingredient is delicious may be determined on the basis of the biological reaction of the chef.

Figure 10:
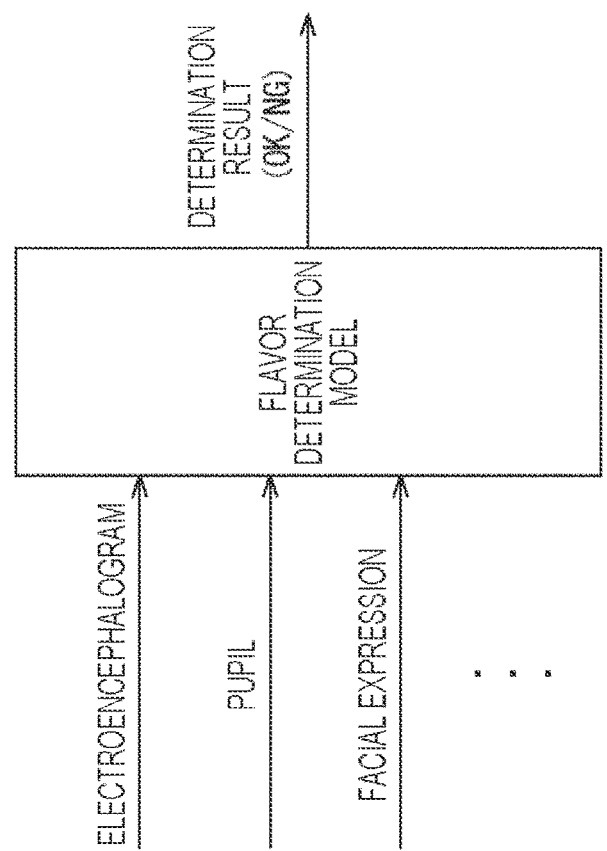
FIG. 10 is a diagram illustrating an example of a determination model used for determining flavor.

FIG. 10 is a diagram illustrating an example of a determination model used for determining flavor.

As illustrated in FIG. 10, whether or not the chef has determined that the eaten ingredient is delicious is determined by using a flavor determination model that is a model of a neural network generated by deep learning or the like. The flavor determination model is generated in advance, for example, by performing learning using a measurement result of the biological reaction when a certain ingredient is eaten by the chef and information indicating how the flavor is felt as to whether the ingredient is delicious or not.

For example, in a case where a measurement result of the biological reaction when a certain ingredient is tasted is input, a determination result of the flavor is output from the flavor determination model. The determination result of the flavor indicates whether the tasted ingredient is delicious (OK) or not delicious (NG).

In the example of FIG. 9, as indicated ahead of an arrow A11, it is not determined to be delicious as a result of the first tasting performed between time t2 and time t3. On the other hand, as indicated ahead of an arrow A12, it is determined to be delicious as a result of the second tasting performed between time t4 and time t5.

In this case, the cook biological information #1-2 generated on the basis of a measurement result between time t4 and time t5 is included in the cooking process data set of the cooking process #1 together with the cooking operation information generated as described with reference to FIG. 8.

In this manner, only the cook biological information indicating the biological reaction satisfying the predetermined condition, which is considered to be determined to be delicious by the chef, may be included in the recipe data.

As described with reference to FIG. 8, in a case where all pieces of the cook biological information are included in the recipe data, a flavor OK flag may be set to the cook biological information #1-2 indicating the biological reaction when the chef has determined that the eaten ingredient is delicious. The flavor OK flag is a flag indicating that the chef has determined that the eaten ingredient is delicious.

By referring to the flavor OK flag, the reproduction side can specify the timing of tasting in which the chef determines that it is delicious.

Note that, in the examples of FIGS. 8 and 9, although the biological reaction is measured only while the chef is tasting, the biological reaction may be constantly measured while the chef is cooking. In this case, the recipe data includes, as the cook biological information, time-series data of the biological reaction from the start to the end of cooking by the chef.

As described above, the recipe data is configured by linking (associating) the cooking operation information, which is information regarding the cooking operation for achieving the cooking process, and the cook biological information, which is information indicating the biological reaction of the chef and measured in conjunction with the progress of the cooking process.

Figure 11:
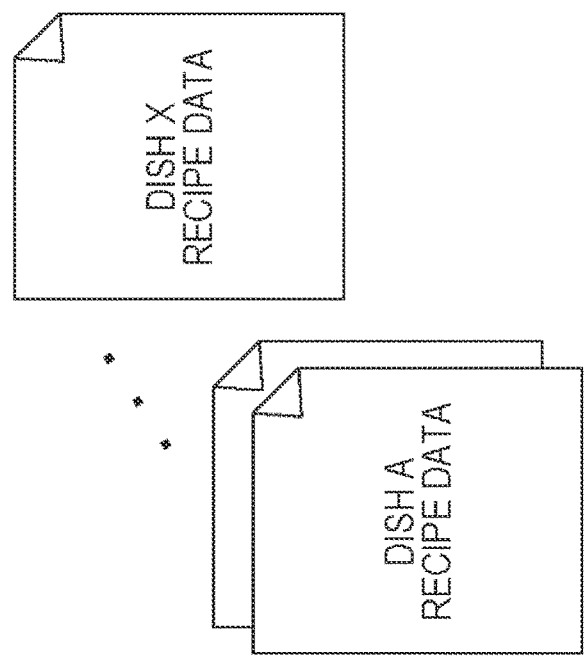
FIG. 11 is a diagram illustrating an example of recipe data.

The recipe data including each piece of information as described above is prepared for each dish as illustrated in FIG. 11. Which recipe data on the basis of which the dish is to be reproduced is selected by, for example, an eating person in a place where the cooking robot 1 is installed.

Example of Flows of Generation of Recipe Data and Reproduction of Dish

Figure 12:
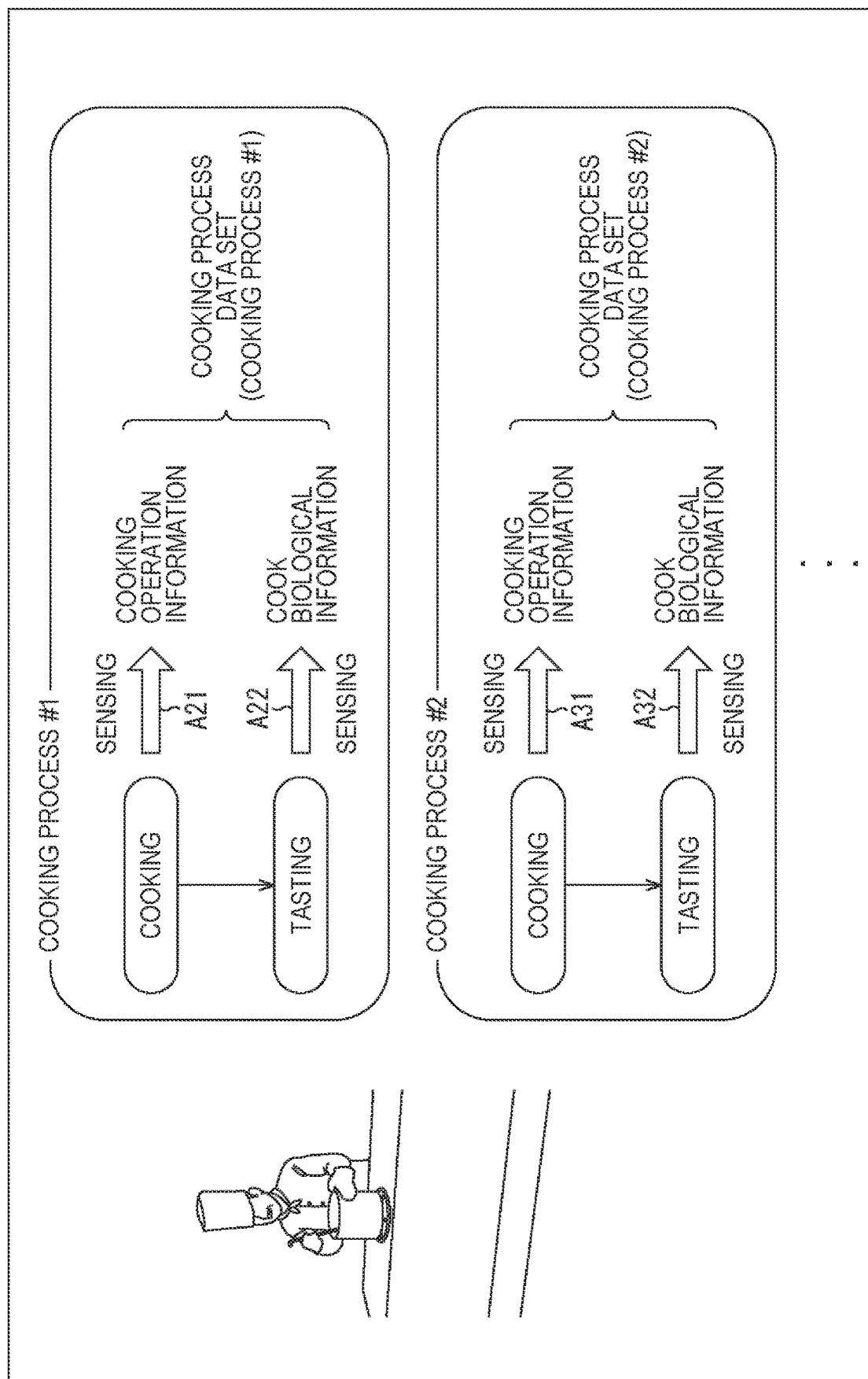
FIG. 12 is a diagram illustrating an example of a flow of generating the recipe data.

FIG. 12 is a diagram illustrating an example of a flow of generating the recipe data.

As described above, the cooking operation information constituting the cooking process data set is generated on the basis of a sensing result by sensing (measuring) operation of the chef who performs cooking.

Furthermore, the cook biological information is generated on the basis of a sensing result obtained by sensing the biological reaction of the chef performing tasting.

In the example of FIG. 12, as indicated by an arrow A21, the cooking operation information constituting the cooking process data set of the cooking process #1 is generated on the basis of a sensing result of the cooking operation performed by the chef as the cooking process #1.

Furthermore, as indicated by an arrow A22, the cook biological information constituting the cooking process data set of the cooking process #1 is generated on the basis of a sensing result of the biological reaction of the chef performing tasting of the cooked ingredient.

After the cooking process #1 is finished, the cooking process #2, which is the next cooking process, is performed.

Similarly, as indicated by an arrow A31, the cooking operation information constituting the cooking process data set of the cooking process #2 is generated on the basis of a sensing result of the cooking operation performed by the chef as the cooking process #2.

Furthermore, as indicated by an arrow A32, the cook biological information constituting the cooking process data set of the cooking process #2 is generated on the basis of a sensing result of the biological reaction of the chef performing tasting of the cooked ingredient.

One dish is completed through such a plurality of cooking processes. Furthermore, the recipe data describing the cooking process data sets of the respective cooking processes is generated as the dish is completed.

Figure 13:
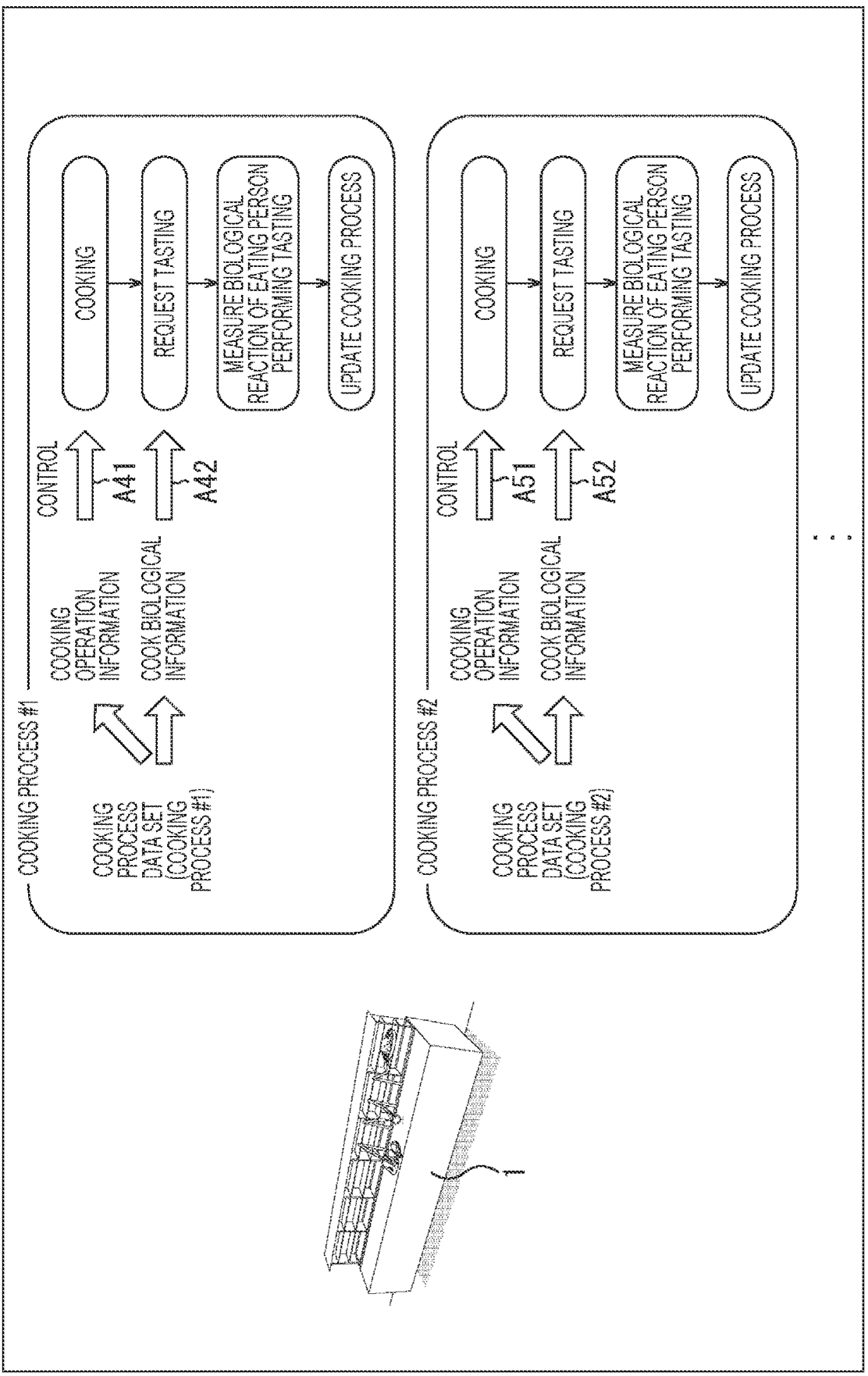
FIG. 13 is a diagram illustrating an example of a flow of reproduction of a dish based on the recipe data.

FIG. 13 is a diagram illustrating an example of a flow of reproduction of a dish based on the recipe data.

As illustrated in FIG. 13, the reproduction of the dish by the cooking robot 1 is performed by repeating, for each cooking process, performing cooking on the basis of the cooking operation information included in the cooking process data set described in the recipe data and updating the cooking process according to the biological reaction of the eating person who has tasted the cooked ingredient.

The tasting of the cooked ingredient is performed by the eating person in response to a request for performing tasting from the cooking robot 1 to the eating person, for example. The eating person is present around the cooking robot 1 that is cooking on the basis of the recipe data so that the eating person can perform tasting in response to the request of the cooking robot 1.

The tasting request is made, for example, by outputting a synthesized voice from a speaker of the cooking robot 1 or by blinking a light emitting unit such as an LED provided in the cooking robot 1. The tasting request may be made by transmitting a message to a portable terminal such as a smartphone of the eating person.

The timing at which the tasting is requested is determined according to the timing of tasting in which the chef determines that it is delicious, for example, on the basis of the cook biological information included in the cooking process data set.

In the example of FIG. 13, as indicated by an arrow A41, the cooking operation of the cooking robot 1 is controlled on the basis of the cooking operation information constituting the cooking process data set of the cooking process #1, and the same operation as the operation of the cooking process #1 of the chef is performed by the cooking robot 1.

After the cooking robot 1 performs the same operation as the operation of the cooking process #1 of the chef, tasting of the cooked ingredients is requested to the eating person as indicated by an arrow A42. This tasting request is made on the basis of the cook biological information indicating the biological reaction at the time of tasting in which the chef determines that it is delicious.

The biological reaction of the eating person performing tasting in response to the request from the cooking robot 1 is measured, and the cooking process is updated on the basis of the measurement result. As will be described in detail later, in a case where the eating person does not feel that the cooked ingredients are delicious, the cooking process is updated so that the eating person feels that the cooked ingredients are delicious.

When the cooking according to the updated cooking process is performed by the cooking robot 1, the cooking process #1 ends. After the cooking process #1 is finished, the cooking process #2, which is the next cooking process, is performed.

Similarly, as indicated by an arrow A51, the cooking operation of the cooking robot 1 is controlled on the basis of the cooking operation information constituting the cooking process data set of the cooking process #2, and the same operation as the operation of the cooking process #2 of the chef is performed by the cooking robot 1.

After the cooking robot 1 performs the same operation as the operation of the cooking process #2 of the chef, tasting of the cooked ingredients is requested to the eating person as indicated by an arrow A52. This tasting request is made on the basis of the cook biological information indicating the biological reaction at the time of tasting in which the chef determines that it is delicious.

The biological reaction of the eating person performing tasting in response to the request from the cooking robot 1 is measured, and the cooking process is updated on the basis of the measurement result.

When the cooking according to the updated cooking process is performed by the cooking robot 1, the cooking process #2 ends.

Through such a plurality of cooking processes, the dish made by the chef is reproduced by the cooking robot 1.

Figure 14:
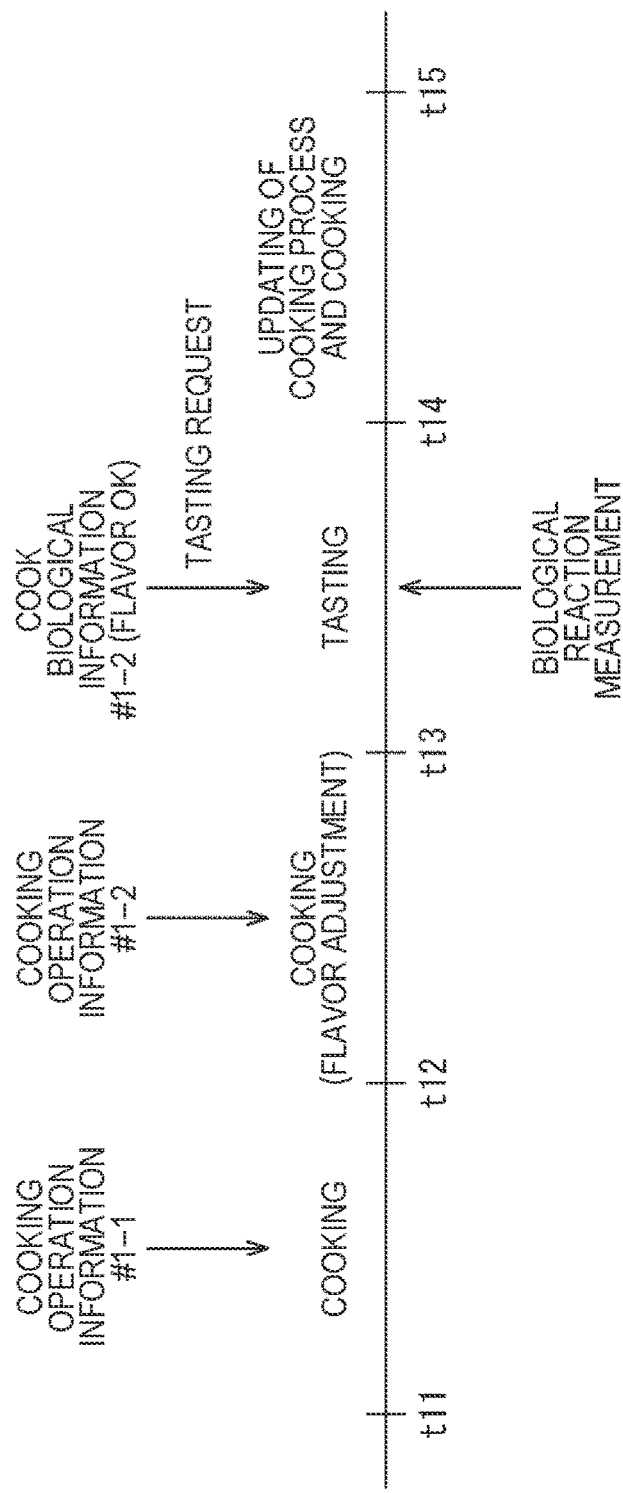
FIG. 14 is a diagram illustrating an example of the cooking process at a time of reproduction.

FIG. 14 is a diagram illustrating an example of the cooking process at the time of reproduction.

It is assumed that the cooking process #1 described with reference to FIG. 8 has been performed by the chef, and the above-described cooking process data set has been generated.

As illustrated in FIG. 14, between time t1/ and time t12, the cooking robot 1 performs the same cooking as the first cooking performed by the chef between time t1 and time t2 (FIG. 8) on the basis of the cooking operation information #1-1 included in the cooking process data set.

Furthermore, between time t12 and time t13, the cooking robot 1 performs the same cooking as the second cooking performed by the chef between time t3 and time t4 on the basis of the cooking operation information #1-2 included in the cooking process data set.

Thus, it becomes a state in which two times of cooking having the same contents as the two times of cooking performed by the chef are also performed in the cooking robot 1.

At time t13 when the cooking based on the cooking operation information #1-2 is finished, an ingredient whose flavor has been adjusted by the chef, that is, an ingredient having the same flavor as the ingredient obtained at time t4 in FIG. 8 is also prepared as a cooked ingredient on the cooking robot 1 side.

The chef side has determined that it is delicious by the second tasting performed after the second cooking, and thus the reproduction side also requires the eating person to perform tasting at the corresponding timing after the second cooking. It is determined on the basis of the cook biological information #1-2 that it is determined to be delicious by the chef by the second tasting. As described above, the cook biological information #1-2 is information generated on the basis of the biological reaction at the time of tasting in which the chef determines that it is delicious.

In the example of FIG. 14, at time t13, the eating person is requested to perform tasting. The eating person tastes the ingredient in response to the request from the cooking robot 1.

In a case where it is recognized that the eating person has started tasting, measurement of the biological reaction of the eating person is started. The biological reaction of the eating person to be measured is similar to the biological reaction of the chef. The electroencephalogram, the pupil, the sweating, the electromyogram of the four limbs, the temperature of the entire face, the facial expression, the motion of the entire body, the heart rate, and the voice sound of the eating person are measured. The measurement of the biological reactions is continued, for example, until time t14 when it is recognized that the eating person has finished tasting.

On the basis of the measurement result between the time t13 and the time t14, it is determined whether or not the eating person has determined that it is delicious. That is, it is determined whether or not the cooked ingredient that is determined to be delicious by the chef is also determined to be delicious by the eating person.

Whether or not the eating person has determined that the eaten ingredient is delicious is directly input by the eating person by pressing a button provided on the cooking robot 1 or the like.

Whether or not the eating person has determined that the eaten ingredient is delicious may be determined on the basis of the biological reaction of the eating person.

Whether or not the eating person has determined that the eaten ingredient is delicious is also determined using the flavor determination model as described with reference to FIG. 10. The flavor determination model prepared on the reproduction side is a model generated by learning using the measurement result of the biological reaction when the eating person eats a certain ingredient.

In a case where the eating person has determined that the eaten ingredient is delicious, the cooking process #1 ends.

On the other hand, in a case where the eating person has not determined that the eaten ingredient is delicious, the cooking process is updated from time t14 to time t15, and cooking according to the cooking process after the update is performed by the cooking robot 1. Update of the cooking process is performed on the basis of the biological reaction of the eating person who has performed tasting.

Figure 15:
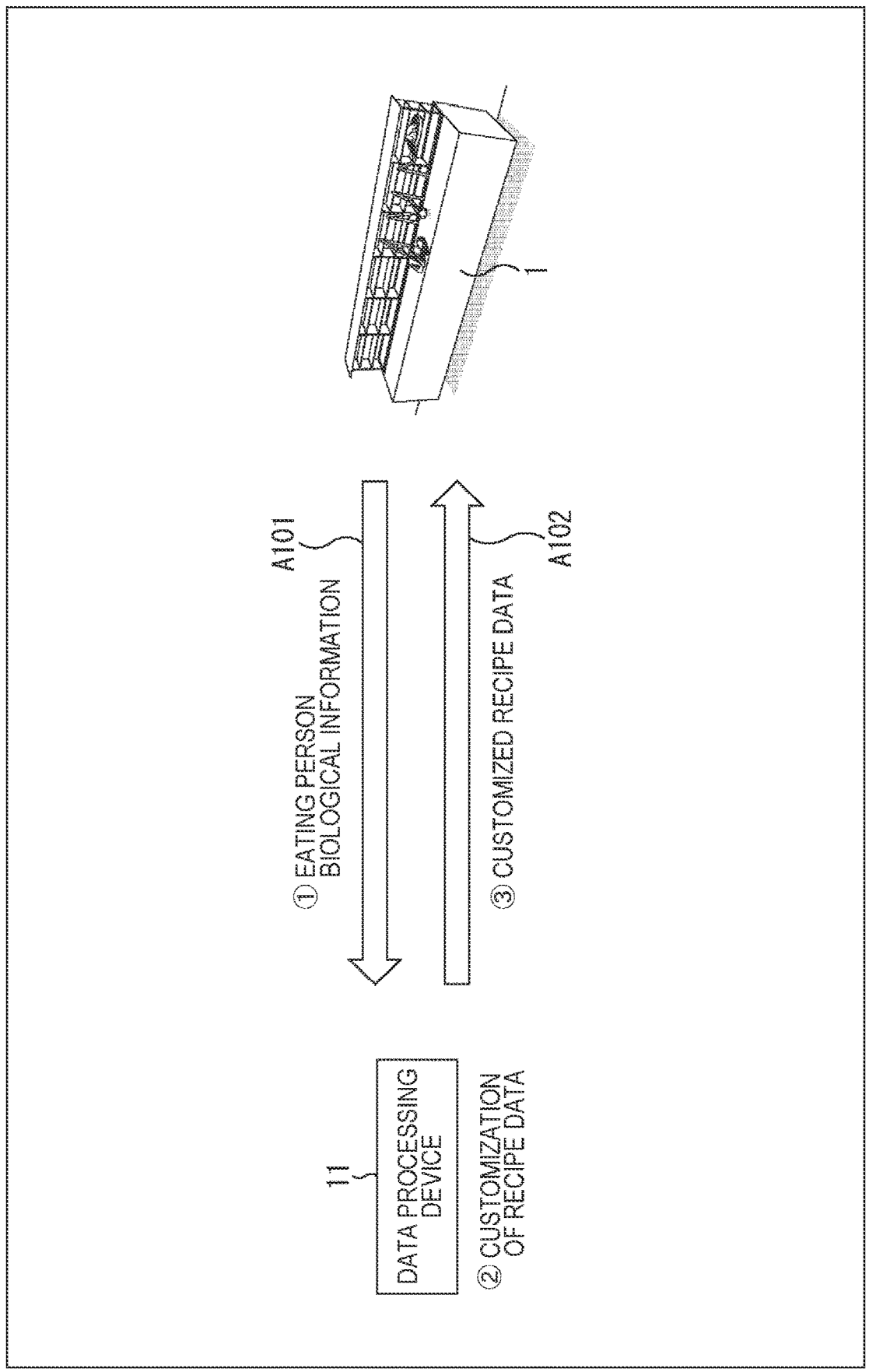
FIG. 15 is a diagram illustrating an example of a flow of customization of the recipe data.

FIG. 15 is a diagram illustrating an example of a flow of customization of the recipe data including update of the cooking process.

As described later in detail, a data processing device 11 illustrated in FIG. 15 is a device having a function of generating the recipe data and providing the recipe data to the reproduction side including the cooking robot 1.

As indicated by an arrow A101, the eating person biological information indicating the biological reaction of the eating person who has performed tasting is transmitted from the cooking robot 1 to the data processing device 11.

In the data processing device 11, the recipe data is customized by updating the cooking process on the basis of the eating person biological information. For example, how the flavor of the ingredient to be tasted is sensed is analyzed on the basis of the eating person biological information.

Figure 16:
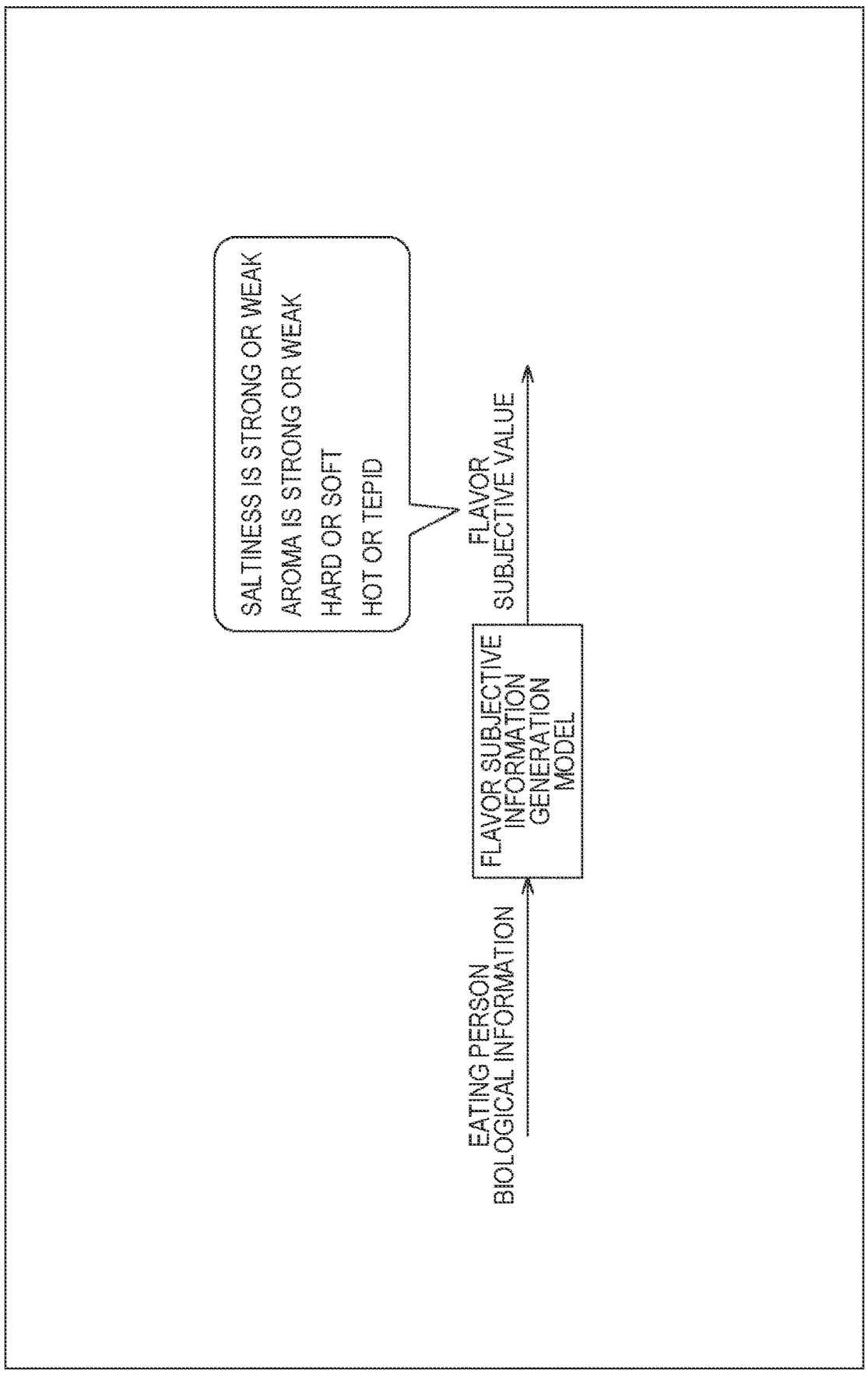
FIG. 16 is a diagram illustrating an example of analysis of how an eating person feels flavor.

FIG. 16 is a diagram illustrating an example of analysis of how the eating person feels flavor.

As illustrated in FIG. 16, a flavor subjective value, which indicates how the eating person feels the flavor, is calculated by inputting the eating person biological information into the flavor subjective information generation model prepared in the data processing device 11. The flavor subjective information generation model is a model generated in advance by learning using the biological reaction of the eating person and information indicating how the flavor is felt.

According to the flavor subjective value calculated on the basis of the eating person biological information, for example, subjective feelings of the eating person regarding the flavor such as delicious or not delicious, saltiness being strong or weak, sweetness being strong or weak, aroma being strong or weak, hard or soft, and hot or tepid are expressed.

For example, in a case where the eating person feels that the saltiness is weak, the data processing device 11 updates the cooking process so as to add an operation of shaking salt to the ingredients in order to increase the saltiness.

Furthermore, in a case where the eating person feels that the ingredients are hard, the data processing device 11 updates the cooking process so as to add an operation of boiling the ingredients for a predetermined time in order to soften the ingredients.

Furthermore, in a case where the eating person feels that the ingredients are tepid, the data processing device 11 updates the cooking process so as to add an operation of heating the ingredients for a predetermined time in order to heat the ingredients.

The customized recipe data including the description of the cooking process after update is provided to the cooking robot 1 as indicated by an arrow A102 in FIG. 15. In the cooking robot 1, the ingredients are cooked according to the updated cooking process.

Such tasting request and update of the cooking process are repeated, for example, until the eating person determines that the cooked ingredients are delicious.

As described above, on the reproduction side including the cooking robot 1, cooking proceeds while checking, for each cooking process, whether or not the eating person has determined that the cooked ingredients obtained by performing the same operation as the operation of the chef are delicious.

Figure 17:
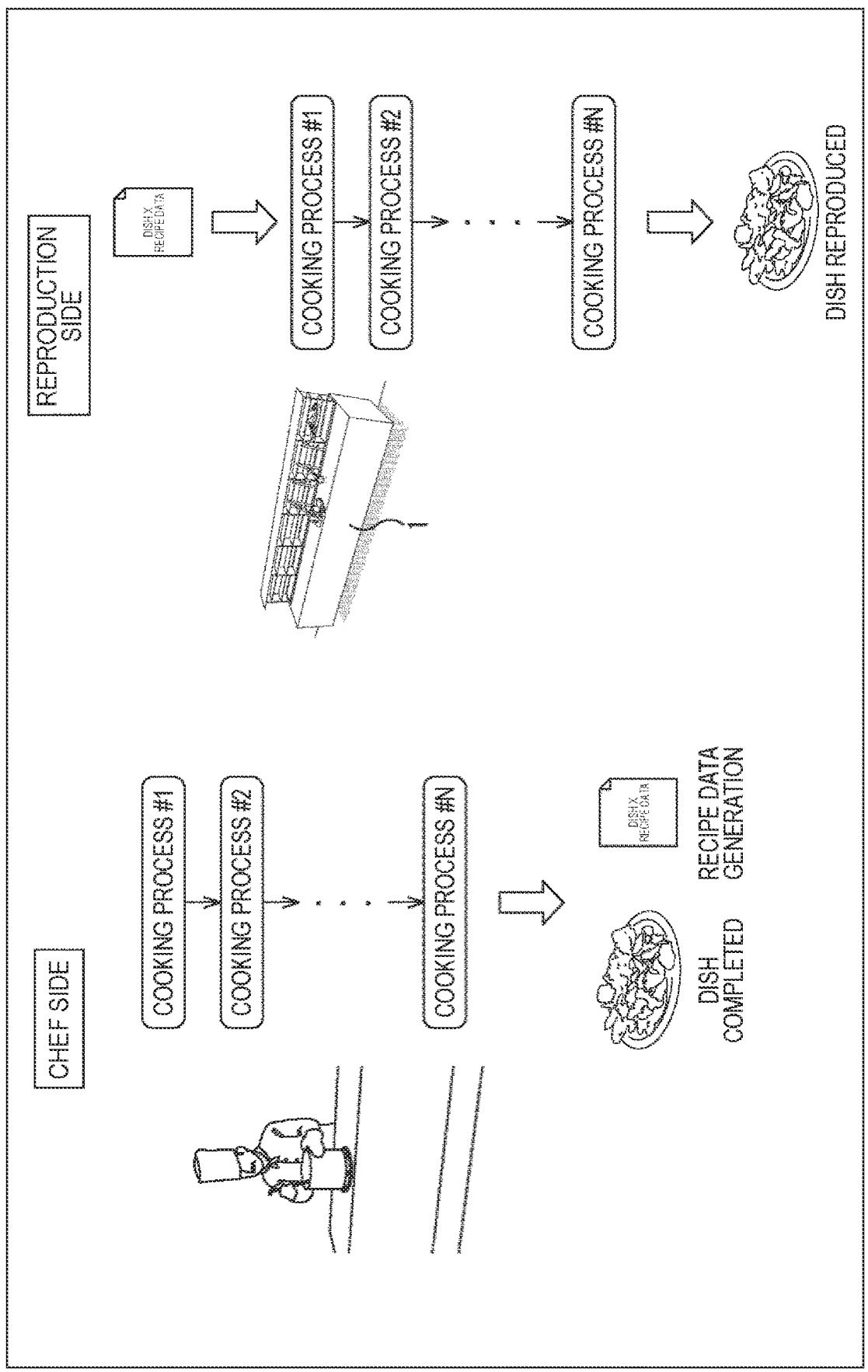
FIG. 17 is a diagram collectively illustrating a flow on a chef side and a flow on a reproduction side.

FIG. 17 is a diagram collectively illustrating the flow on the chef side and the flow on the reproduction side.

As illustrated on the left side of FIG. 17, one dish is completed through a plurality of cooking processes of cooking processes #1 to #N, and the recipe data describing the cooking process data sets of the respective cooking processes is generated.

On the other hand, on the reproduction side, one dish is reproduced through a plurality of cooking processes of cooking processes #1 to #N, which are the same as the cooking processes performed on the chef side, on the basis of the recipe data generated by cooking by the chef.

Whether or not the eating person feels that cooking by the cooking robot 1 is delicious similarly to how the chef feels is checked for each cooking process, and the cooking process proceeds by performing update so that the eating person feels delicious, and thus the dish that is finally completed is a dish that the eating person feels delicious.

Basically, the dish is completed through the same cooking as that of the chef, and thus the dish finally finished is a dish in which the flavor is customized according to a preference of the eating person although it is a reproduction of the dish made by the chef.

For example, the chef can provide the same dish as the dish that he or she has made to a person who cannot visit the restaurant that he or she manages. Furthermore, the chef can leave the dish that he or she makes as the recipe data in a reproducible form.

On the other hand, the eating person who eats the dish reproduced by the cooking robot 1 can customize and eat the same dish as the dish made by the chef according to his or her preference.

Modification Example of Description of Recipe Data

Figure 18:
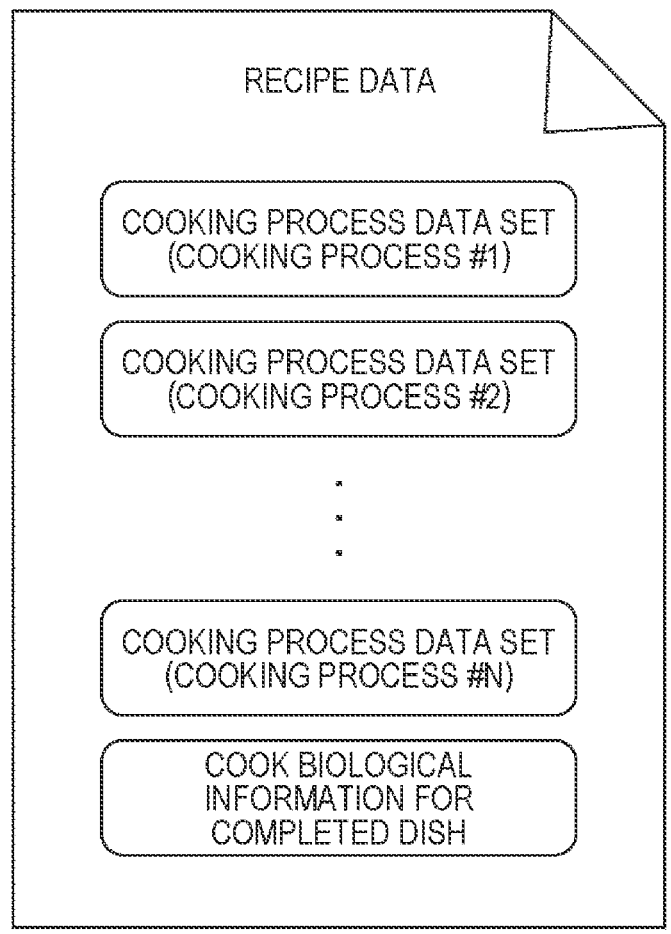
FIG. 18 is a diagram illustrating an example of other description contents of the recipe data.

FIG. 18 is a diagram illustrating an example of other description contents of the recipe data.

As illustrated in FIG. 18, the cook biological information indicating the biological reaction of the chef who has tasted the completed dish may be included in the recipe data. In this case, the cook biological information is linked to the entire cooking operation information.

Thus, the association relationship between the cooking operation information and the cook biological information does not need to be one-to-one.

For example, in a case where the recipe data includes the cook biological information indicating the biological reaction of the chef who has tasted the completed dish, the recipe data is customized at a timing after a meal or the like on the basis of the biological reaction of the eating person who is eating the reproduced dish after the reproduction of the dish by the cooking robot 1 is completed. The recipe data customized on the basis of the biological reaction measured during the meal is used again when the same dish is reproduced in the cooking robot 1.

Figure 19:
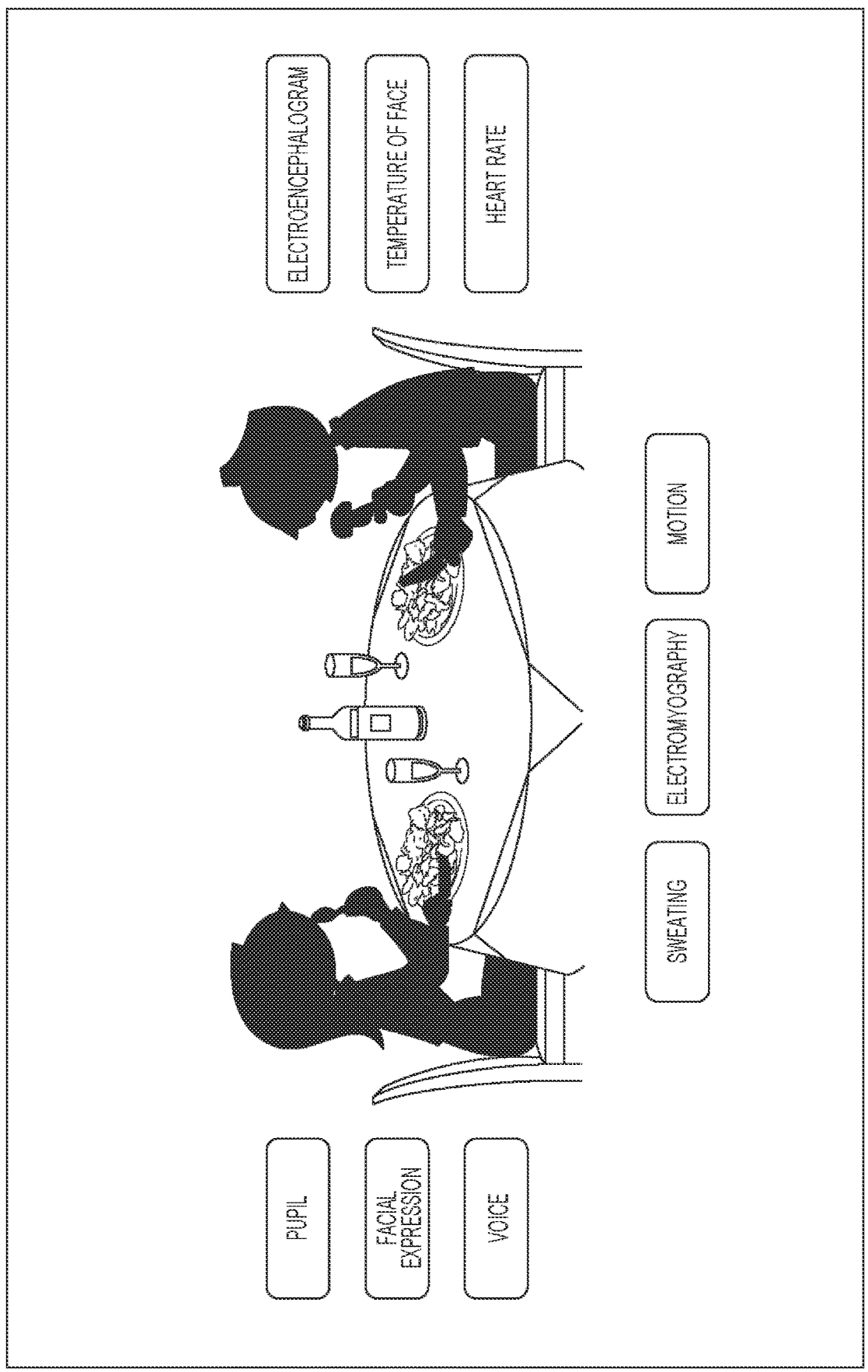
FIG. 19 is a diagram illustrating an example of a biological reaction to be measured.

FIG. 19 is a diagram illustrating an example of a biological reaction to be measured.

Two persons illustrated in FIG. 19 are eating persons who are eating the dish reproduced by the cooking robot 1. As illustrated in FIG. 19, the electroencephalogram, the pupil, the sweating, the electromyogram of the four limbs, the temperature of the entire face, the facial expression, the motion of the entire body, the heart rate, and the voice sound of the eating person are measured, and the eating person biological information is generated.

The eating person biological information measured during the meal is information indicating how the eating person feels the flavor of the dish reproduced by the cooking robot 1.

Figure 20:
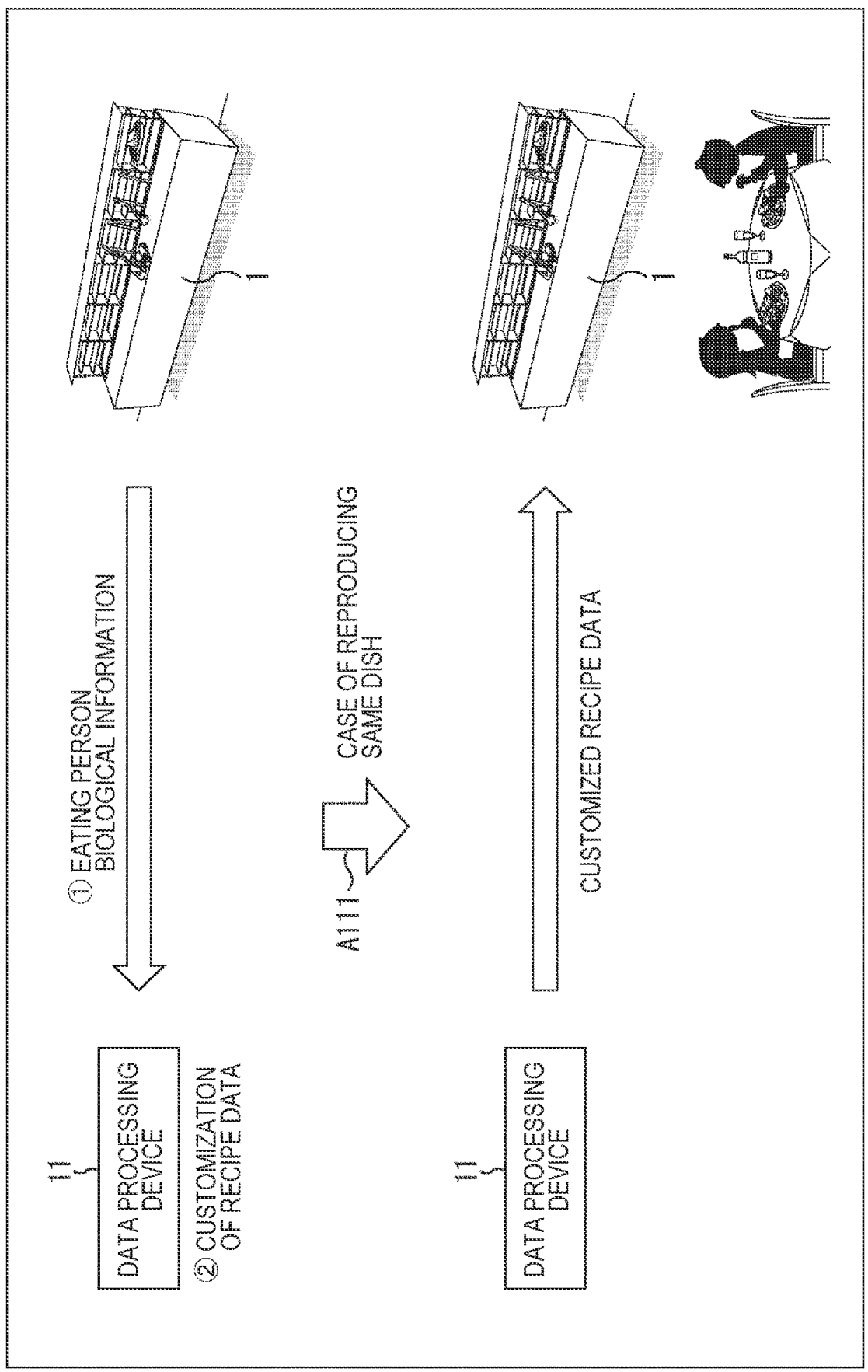
FIG. 20 is a diagram illustrating an example of a flow of customization of the recipe data.

FIG. 20 is a diagram illustrating an example of a flow of customization of the recipe data.

As illustrated in an upper part of FIG. 20, the eating person biological information indicating the biological reaction of the eating person during the meal is transmitted from the cooking robot 1 to the data processing device 11.

In the data processing device 11, the recipe data is customized by updating the cooking process on the basis of the eating person biological information. As described above, how the eating person feels the flavor of the dish is analyzed on the basis of the eating person biological information, and the customization of the recipe data is performed on the basis of the flavor subjective value indicating how the eating person feels the flavor.

For example, in a case where the eating person feels that the saltiness is weak, the data processing device 11 updates the cooking process so as to add an operation of shaking salt to the ingredients at a predetermined timing in order to increase the saltiness.

Furthermore, in a case where the eating person feels that the dish is hard, the data processing device 11 updates the cooking process so as to add an operation of boiling the ingredients for a predetermined time at a predetermined timing in order to soften the dish.

Furthermore, in a case where the eating person feels that the dish is tepid, the data processing device 11 updates the cooking process so as to add an operation of heating the ingredients for a predetermined time at a predetermined timing in order to heat the dish.

In a case where making the same dish is selected by the eating person, the customized recipe data including the description of the cooking process after the update is provided to the cooking robot 1 as indicated ahead of an arrow A111. In the cooking robot 1, cooking is performed according to the updated cooking process.

The flavor of the dish reproduced on the basis of the customized recipe data is a flavor according to a preference of the eating person.

Figure 21:
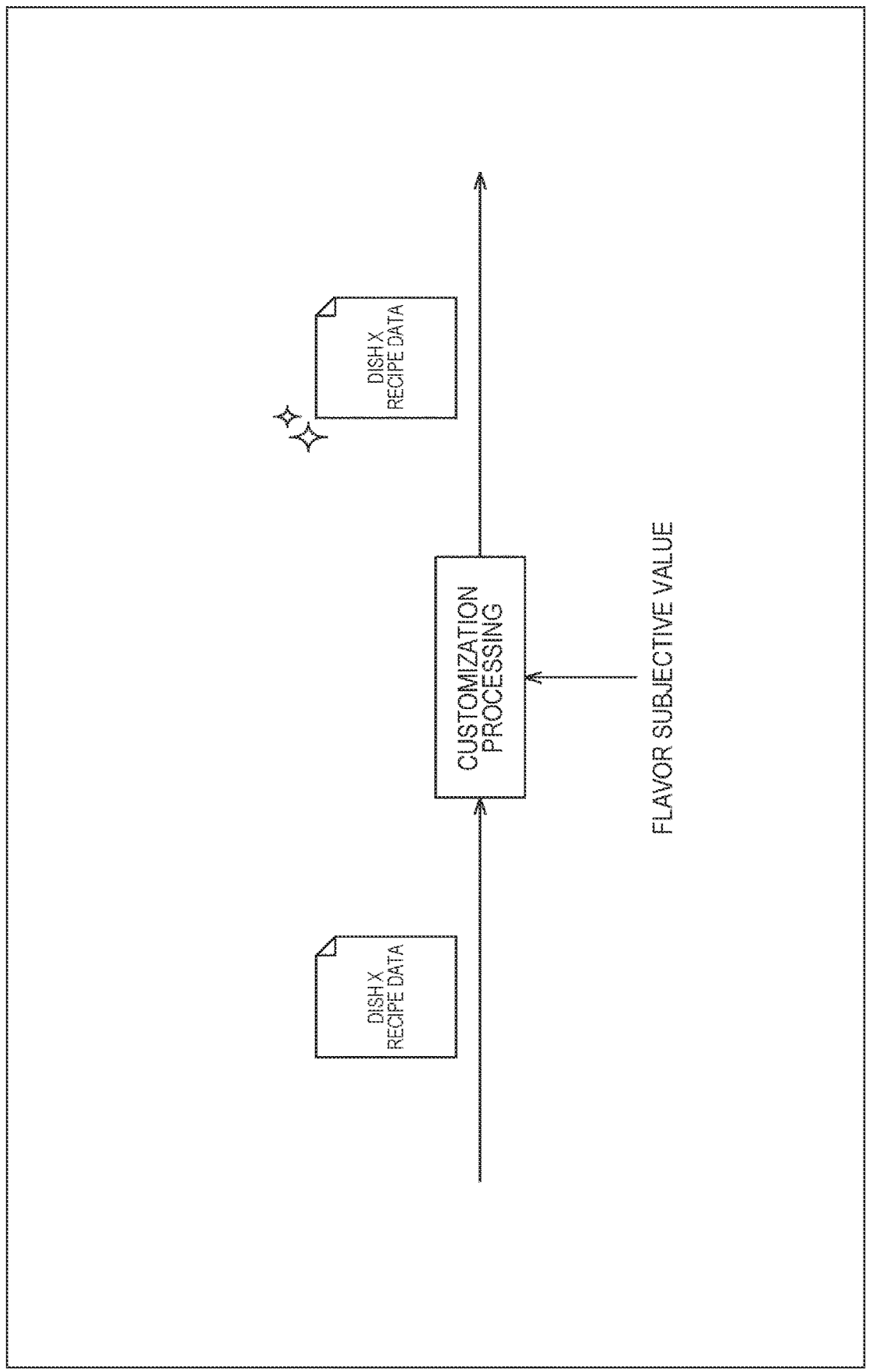
FIG. 21 is a diagram illustrating an example of customization.

As illustrated in FIG. 21, the cooking system illustrated in FIG. 20 is a system that customizes and provides certain recipe data on the basis of the flavor subjective value indicating how the eating person who has once eaten the dish reproduced on the basis of this recipe data feels the flavor.

Figure 22:
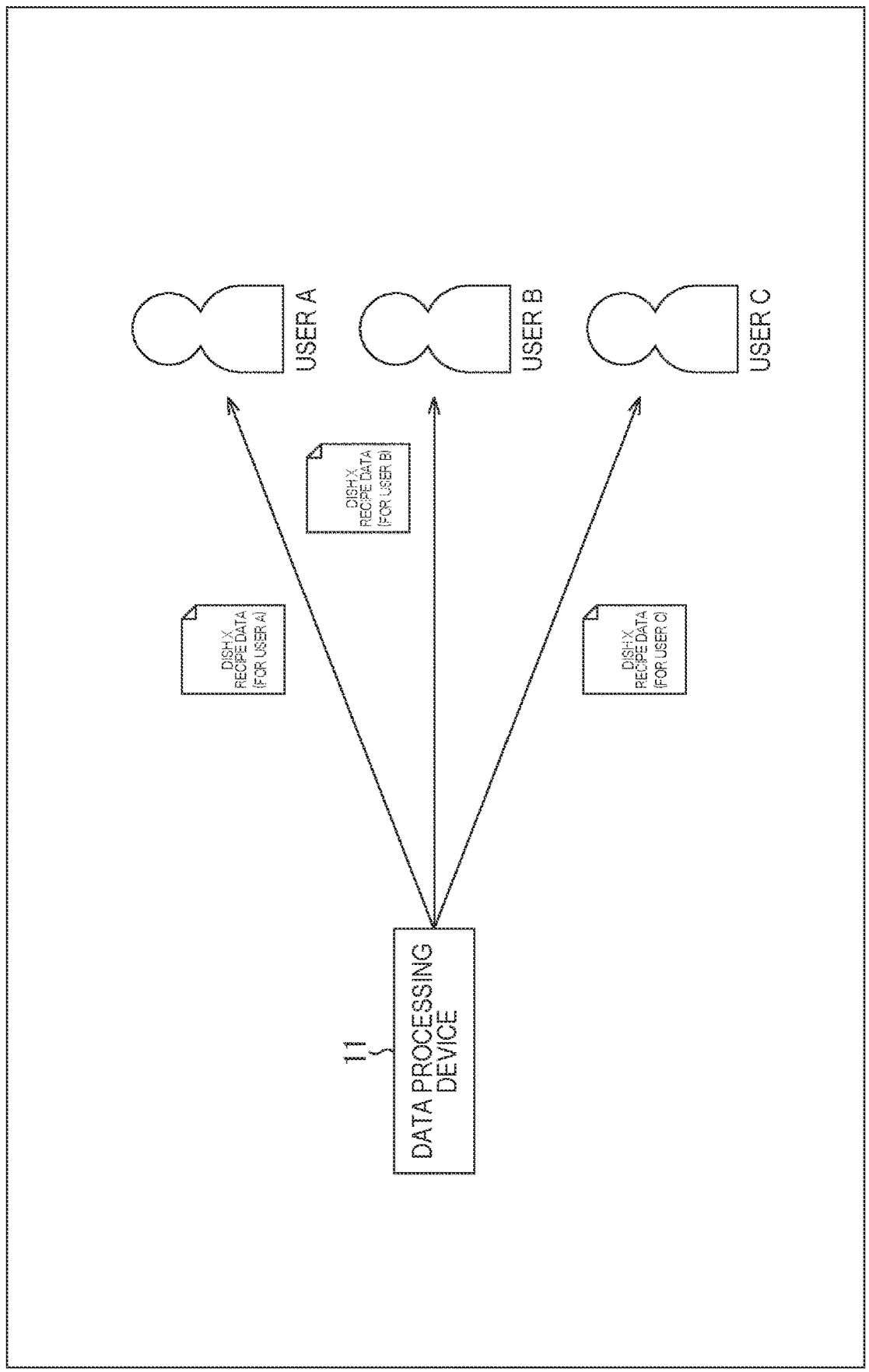
FIG. 22 is a diagram illustrating an application example of the cooking system.

FIG. 22 is a diagram illustrating an application example of the cooking system.

As illustrated in FIG. 22, the data processing device 11 can generate a plurality of pieces of recipe data by customizing according to a preference of each of a plurality of eating persons on the basis of one piece of recipe data, and can provide the plurality of pieces of recipe data to the respective eating persons.

In the example of FIG. 22, the recipe data is customized on the basis of a flavor subjective value indicating how each of users A to C who are eating persons who have once eaten the dish reproduced on the basis of certain recipe data feels the flavor.

The recipe data for the user A customized according to a preference of the user A is provided to the user A, and the recipe data for the user B customized according to a preference of the user B is provided to the user B. The recipe data for the user C customized according to a preference of the user C is provided to the user C.

Thus, the above-described technique can be applied to the cooking system that provides recipe data customized for each eating person.

Figure 23:
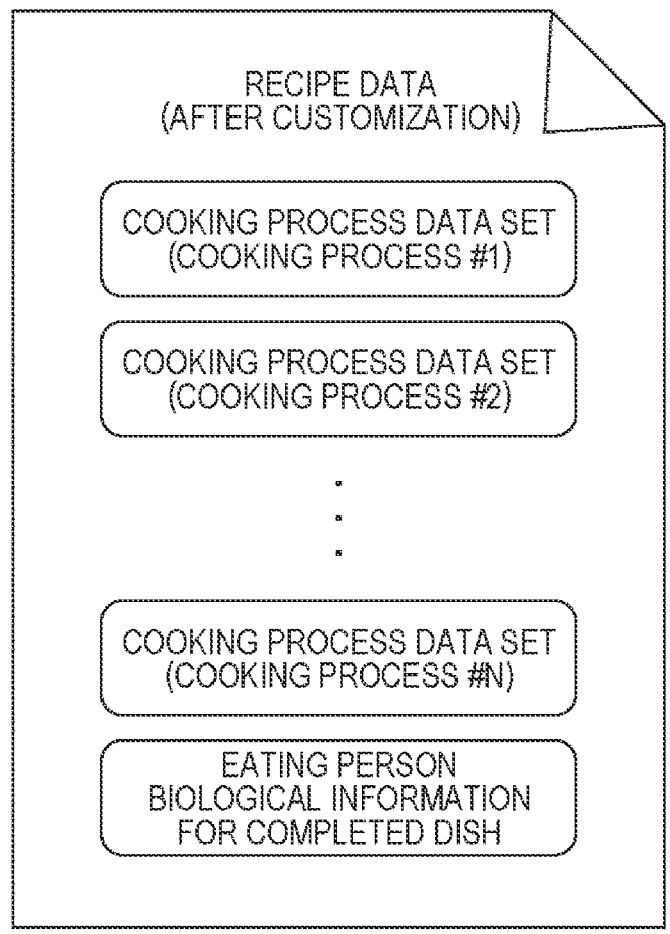
FIG. 23 is a diagram illustrating an example of other description contents of the recipe data.

FIG. 23 is a diagram illustrating an example of other description contents of the recipe data.

As illustrated in FIG. 23, in place of the cook biological information, the eating person biological information may be included in the recipe data after customization. The eating person biological information included in the recipe data is information transmitted from the reproduction side as described above as being measured during the meal.

In a case where the dish is reproduced on the basis of the customized recipe data, the cooking proceeds by appropriately using the eating person biological information included in the recipe data.

Instead of including the eating person biological information in place of the cook biological information, both biological information of the cook biological information and the eating person biological information may be included in the recipe data.

Configuration Example of Cooking System (1) Overall Configuration

Figure 24:
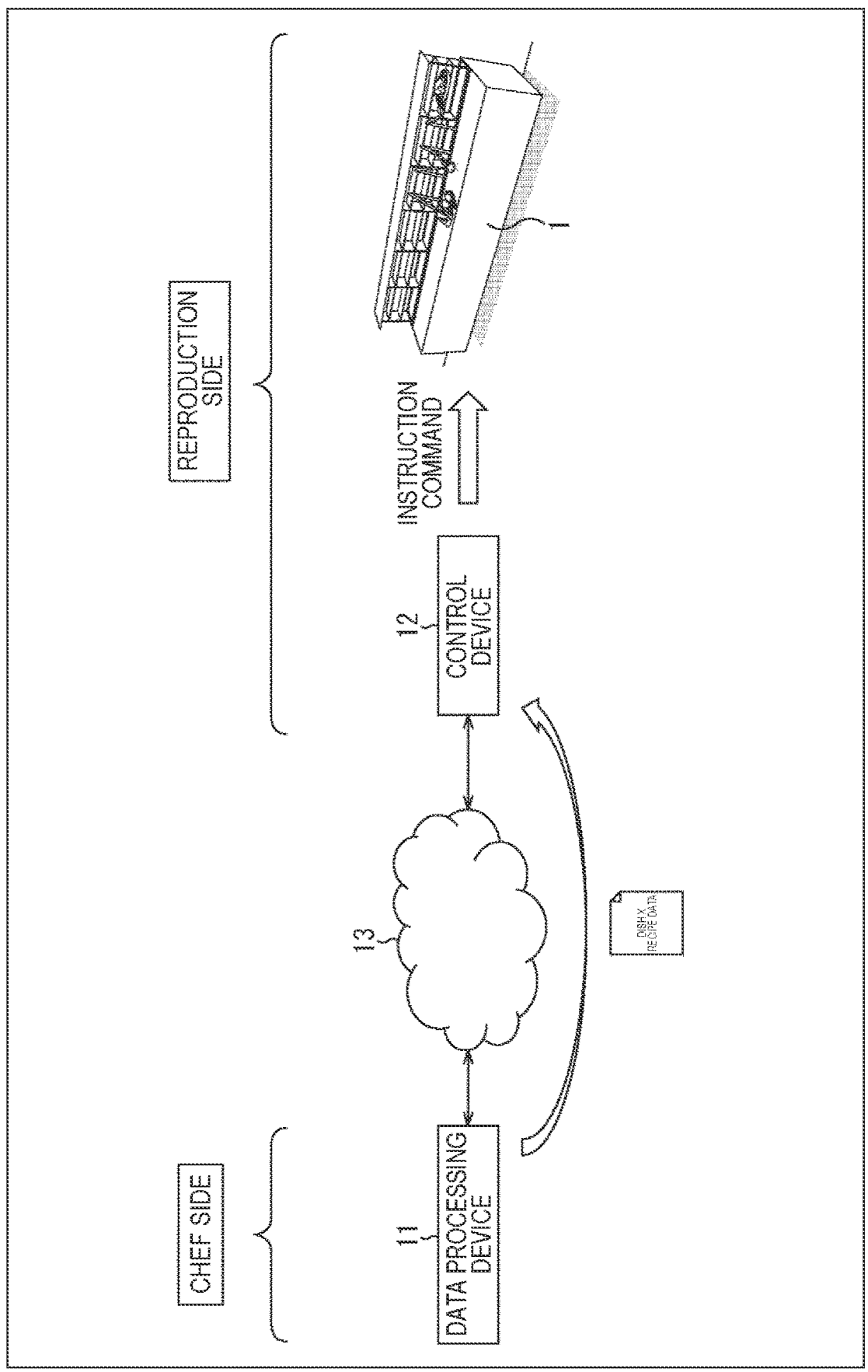
FIG. 24 is a diagram illustrating a configuration example of the cooking system according to the one embodiment of the present technology.

FIG. 24 is a diagram illustrating a configuration example of the cooking system according to the one embodiment of the present technology.

As illustrated in FIG. 24, the cooking system is configured by connecting the data processing device 11 provided as a configuration on the chef side and the control device 12 provided as a configuration on the reproduction side via a network 13 such as the Internet. As described above, the cooking system is provided with a plurality of such configurations on the chef side and a plurality of such configurations on the reproduction side.

The data processing device 11 is a device that generates the above-described recipe data. The data processing device 11 includes a computer or the like. The data processing device 11 transmits, for example, the recipe data of a dish selected by an eating person who eats the reproduced dish to the control device 12 via the network 13.

The control device 12 is a device that controls the cooking robot 1. The control device 12 also includes a computer or the like. The control device 12 receives the recipe data provided from the data processing device 11 and outputs an instruction command on the basis of the description of the recipe data, thereby controlling the cooking operation of the cooking robot 1.

The cooking robot 1 drives each unit such as a cooking arm according to the instruction command supplied from the control device 12, and performs the cooking operation of each cooking process. The instruction command includes information for controlling torque, a driving direction, and a driving amount of a motor provided in the cooking arm, and the like.

Until the dish is completed, instruction commands are sequentially output from the control device 12 to the cooking robot 1. The cooking robot 1 performs an operation corresponding to the instruction command, and the dish is finally completed.

Figure 25:
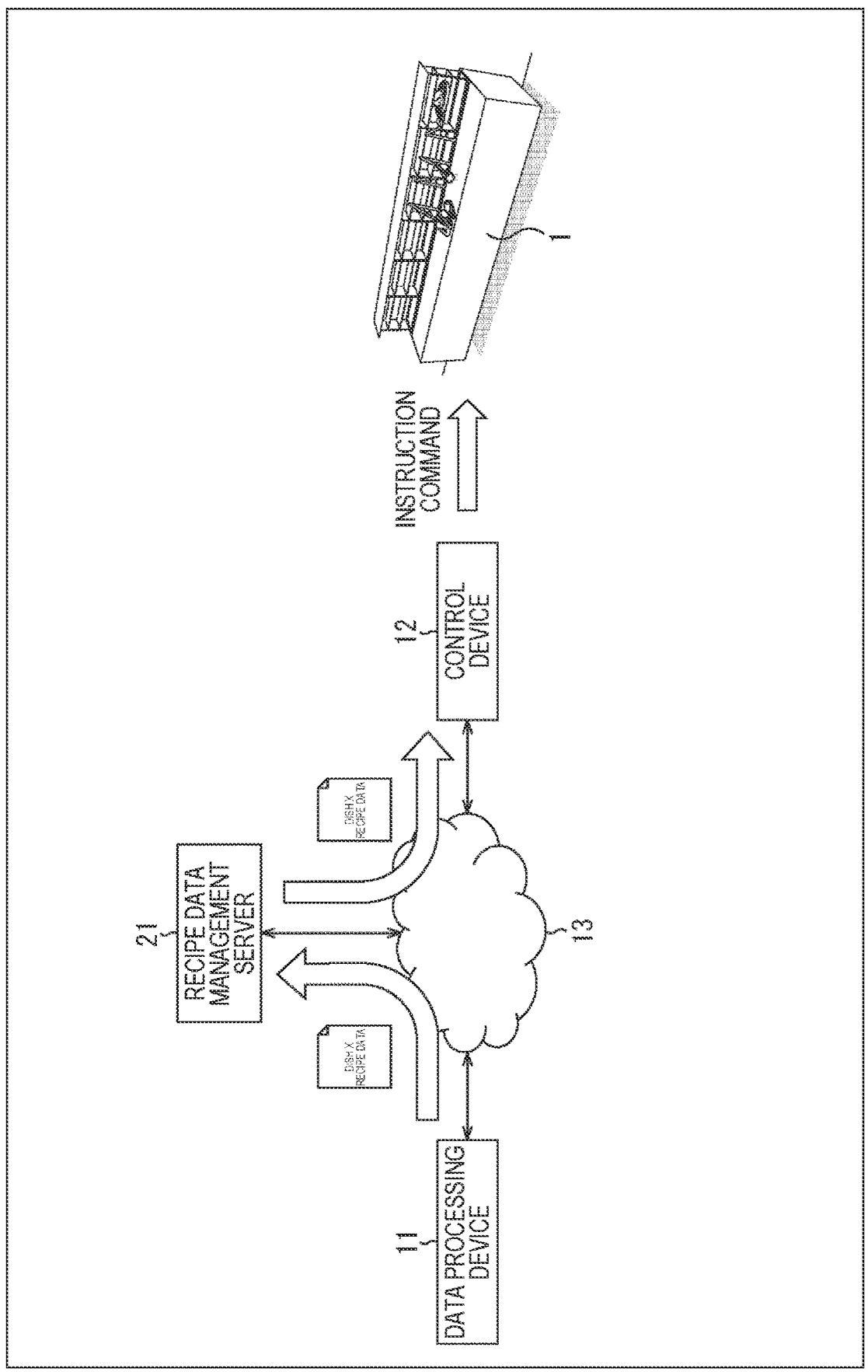
FIG. 25 is a diagram illustrating another configuration example of the cooking system.

FIG. 25 is a diagram illustrating another configuration example of the cooking system.

As illustrated in FIG. 25, the recipe data may be provided from the chef side to the reproduction side via a server on the network.

A recipe data management server 21 illustrated in FIG. 25 receives the recipe data transmitted from each of the data processing devices 11, and manages the recipe data by storing in a database, and the like. The recipe data management server 21 transmits predetermined recipe data to the control device 12 in response to a request from the control device 12 made via the network 13.

The recipe data management server 21 has a function of centrally managing recipe data of dishes made by chefs of various restaurants and delivering the recipe data in response to a request from the reproduction side.

Figure 26:
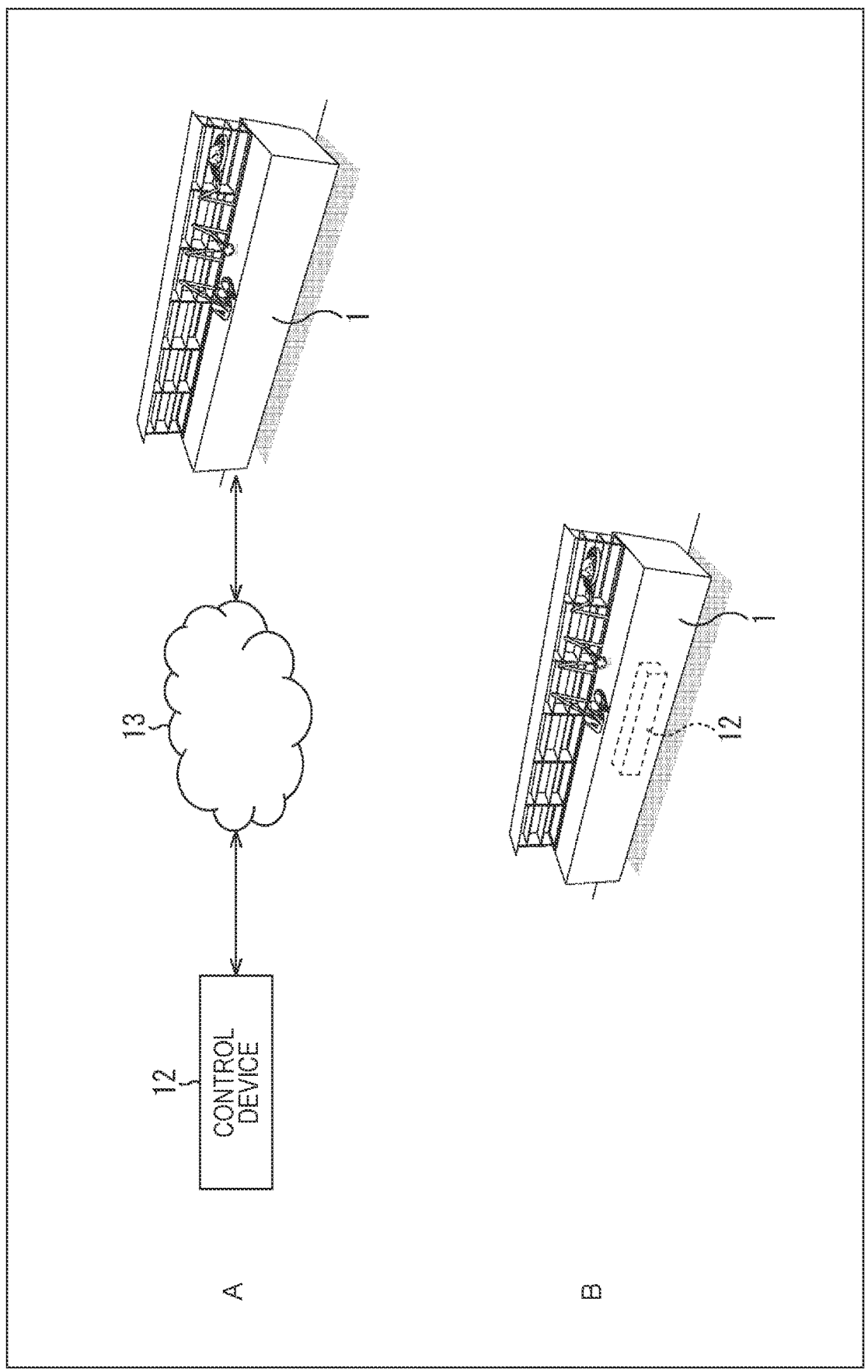
FIG. 26 is a diagram illustrating an arrangement example of a control device.

FIG. 26 is a diagram illustrating an arrangement example of the control device 12.

As illustrated in A of FIG. 26, the control device 12 is provided as, for example, a device outside the cooking robot 1. In the example of A of FIG. 26, the control device 12 and the cooking robot 1 are connected via the network 13.

The instruction command transmitted from the control device 12 is received by the cooking robot 1 via the network 13. Various kinds of data such as an image captured by the camera of the cooking robot 1 and sensor data measured by the sensor provided in the cooking robot 1 are transmitted from the cooking robot 1 to the control device 12 via the network 13.

Instead of connecting one cooking robot 1 to one control device 12, a plurality of cooking robots 1 may be connected to one control device 12.

As illustrated in B of FIG. 26, the control device 12 may be provided inside a housing of the cooking robot 1. In this case, operation of each unit of the cooking robot 1 is controlled according to an instruction command generated by the control device 12.

Hereinafter, it is mainly described that the control device 12 is provided as a device outside the cooking robot 1.

(2) Configuration on Chef Side

Figure 27:
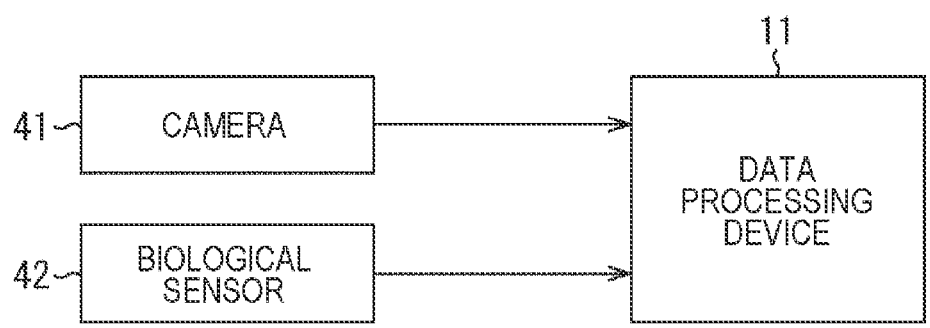
FIG. 27 is a block diagram illustrating a configuration example on the chef side.

FIG. 27 is a block diagram illustrating a configuration example on the chef side.

As illustrated in FIG. 27, a camera 41 and a biological sensor 42 are connected to the data processing device 11. The same components as those described above are denoted by the same reference numerals. Duplicate descriptions will be omitted as appropriate.

The camera 41 captures images of the state of the chef who is cooking and the state on a top board of the kitchen, and transmits the images obtained by the capturing to the data processing device 11.

The camera 41 includes a plurality of cameras. Some of the cameras constituting the camera 41 are attached to the head of the chef, for example. The camera attached to the head of the chef captures images of the state of the hands of the chef who is cooking, the state of an ingredient to be cooked, and the state on the top board of the kitchen, and transmits the images obtained by the capturing to the data processing device 11.

The biological sensor 42 is a sensor that measures a biological reaction of the chef. The biological sensor 42 includes an electroencephalograph, a skin sensor, an electromyograph, an infrared sensor, a motion sensor, a wearable activity meter, a microphone, and the like that measure each biological reaction described above. For measurement of the biological reaction of the chef, an image captured by the camera 41 is also appropriately used.

The biological sensor 42 transmits data indicating a measurement result of the biological reaction of the chef to the data processing device 11.

In addition to the camera 41 and the biological sensor 42, various sensors for recognizing operation of the chef, such as a gyro sensor attached to the body of the chef and an infrared sensor for capturing an image of the chef, are connected to the data processing device 11.

Figure 28:
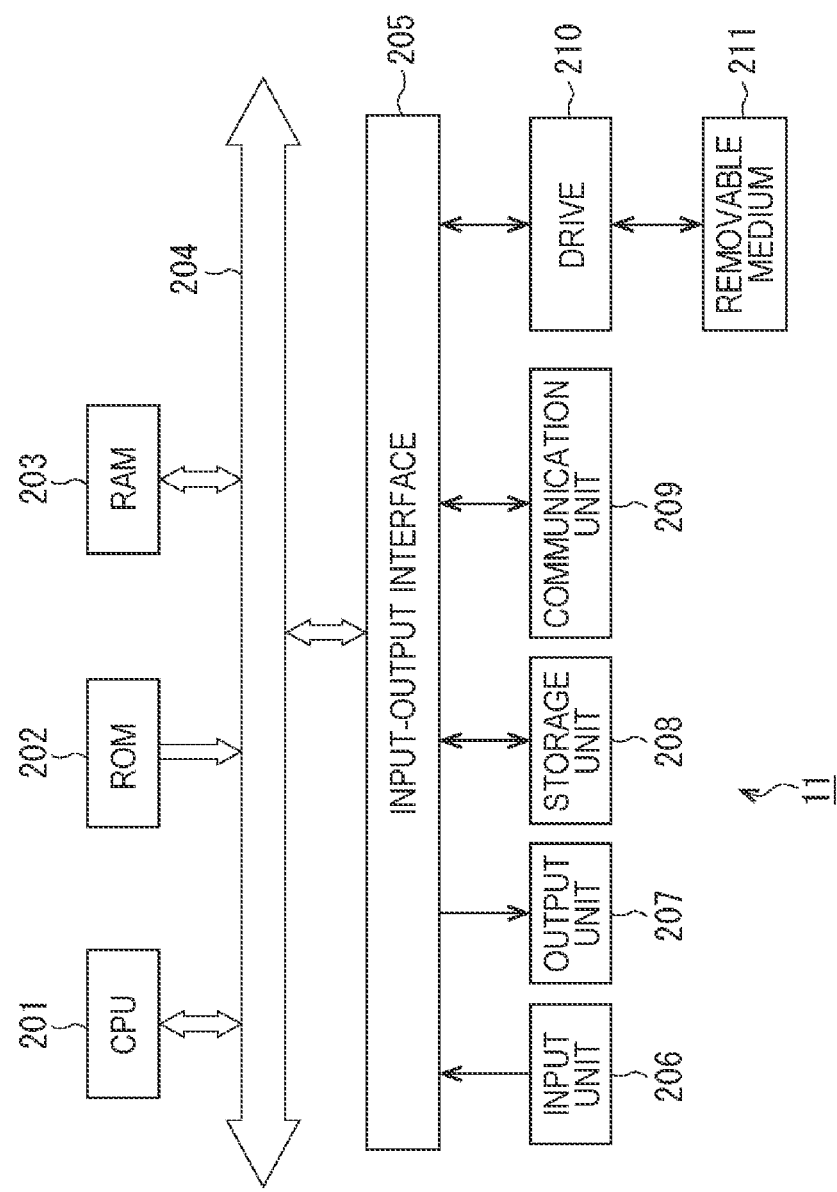
FIG. 28 is a block diagram illustrating a configuration example of hardware of a data processing device.

FIG. 28 is a block diagram illustrating a configuration example of hardware of the data processing device 11.

As illustrated in FIG. 28, the data processing device 11 includes a computer. A central processing unit (CPU) 201, a read only memory (ROM) 202, and a random access memory (RAM) 203 are interconnected via a bus 204.

An input-output interface 205 is further connected to the bus 204. An input unit 206 including a keyboard, a mouse, and the like, and an output unit 207 including a display, a speaker, and the like are connected to the input-output interface 205.

Furthermore, the input-output interface 205 is connected to a storage unit 208 including a hard disk and a non-volatile memory and the like, a communication unit 209 including a network interface and the like, and a drive 210 that drives a removable medium 211.

In the computer configured as described above, for example, the CPU 201 loads a program stored in the storage unit 208 into the RAM 203 via the input-output interface 205 and the bus 204 and executes the program, to thereby perform various processes.

Figure 29:
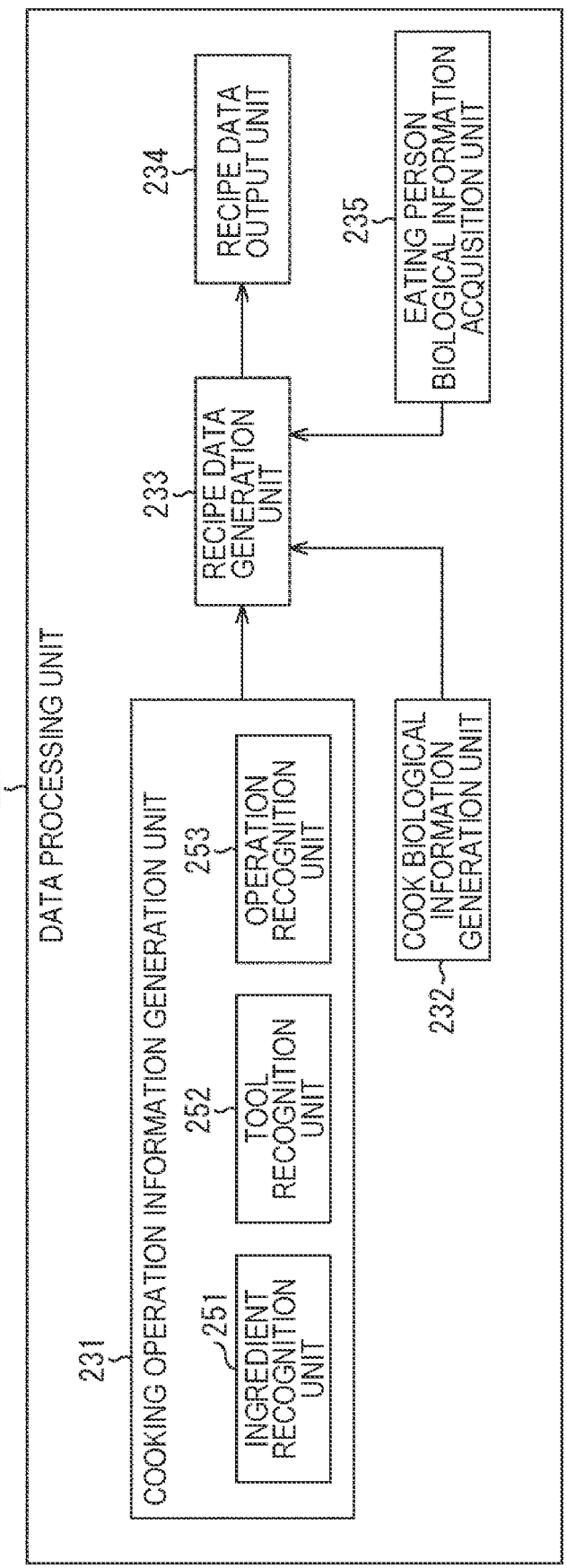
FIG. 29 is a block diagram illustrating a functional configuration example of the data processing device.

FIG. 29 is a block diagram illustrating a functional configuration example of the data processing device 11.

At least a part of the functional units illustrated in FIG. 29 is implemented by executing a predetermined program by the CPU 201 in FIG. 28.

As illustrated in FIG. 29, a data processing unit 221 is implemented in the data processing device 11. The data processing unit 221 includes a cooking operation information generation unit 231, a cook biological information generation unit 232, a recipe data generation unit 233, a recipe data output unit 234, and an eating person biological information acquisition unit 235.

The cooking operation information generation unit 231 includes an ingredient recognition unit 251, a tool recognition unit 252, and an operation recognition unit 253.

The ingredient recognition unit 251 analyzes an image captured by the camera 41 and recognizes the type of ingredient used by the chef for cooking. Recognition information for use in recognition of types of various ingredients such as feature information is given to the ingredient recognition unit 251.

The tool recognition unit 252 analyzes the image captured by the camera 41 and recognizes the type of cooking tool used by the chef for cooking. Recognition information for use in recognition of types of various cooking tools is given to the tool recognition unit 252.

The operation recognition unit 253 analyzes an image captured by the camera 41, sensor data representing a measurement result of a sensor attached to the body of the chef, and the like, and recognizes the operation of the chef who performs cooking.

Information indicating a recognition result by each unit of the cooking operation information generation unit 231 is supplied to the recipe data generation unit 233.

The cook biological information generation unit 232 controls the biological sensor 42 to measure the biological reaction of the chef. As described above, the biological reaction of the chef performing tasting is measured. The cook biological information generation unit 232 acquires sensor data indicating a measurement result of the biological reaction of the chef transmitted from the biological sensor 42, and outputs the sensor data to the recipe data generation unit 233.

The recipe data generation unit 233 generates cooking operation information on the basis of information supplied from each unit of the cooking operation information generation unit 231. That is, the recipe data generation unit 233 generates the ingredient information on the basis of a recognition result by the ingredient recognition unit 251, and generates the operation information on the basis of recognition results by the tool recognition unit 252 and the operation recognition unit 253. The recipe data generation unit 233 generates the cooking operation information including the ingredient information and the operation information.

Furthermore, the recipe data generation unit 233 generates the cook biological information on the basis of the sensor data supplied from the cook biological information generation unit 232. The recipe data generation unit 233 appropriately specifies whether or not the chef has determined that it is delicious on the basis of the flavor determination model or the like, and sets the flavor OK flag.

In a case where all pieces of the cook biological information indicating the biological reaction measured when the chef has performed tasting is included in the recipe data, the flavor OK flag is set to the cook biological information indicating the biological reaction of the chef determining to be delicious among all the pieces of the cook biological information.

In a case where the recipe data includes not all the pieces of the cook biological information but only the cook biological information indicating the biological reaction of the chef determining to be delicious, the flavor OK flag may be set to the cook biological information.

The recipe data generation unit 233 generates the cooking process data set by, for example, associating the cooking operation information with the cook biological information for each cooking process of the chef. The recipe data generation unit 233 generates the recipe data describing a plurality of cooking process data sets by integrating cooking process data sets associated with respective cooking processes from a first cooking process to a last cooking process of a certain dish.

The recipe data generation unit 233 outputs the recipe data generated in this manner to the recipe data output unit 234.

Furthermore, the recipe data generation unit 233 customizes the recipe data by updating the cooking process on the basis of the eating person biological information in a case where the eating person biological information indicating the biological reaction of the eating person is supplied from the eating person biological information acquisition unit 235. The eating person biological information supplied from the eating person biological information acquisition unit 235 includes information indicating which recipe data is used on the reproduction side, and the like.

The recipe data generation unit 233 outputs the customized recipe data to the recipe data output unit 234.

The recipe data output unit 234 controls the communication unit 209 (FIG. 28) and outputs the recipe data generated by the recipe data generation unit 233. The recipe data output from the recipe data output unit 234 is supplied to the control device 12 or the recipe data management server 21 via the network 13.

(3) Configuration on Reproduction Side
(3-1) Configuration of Cooking Robot 1
Appearance of Cooking Robot 1

Figure 30:
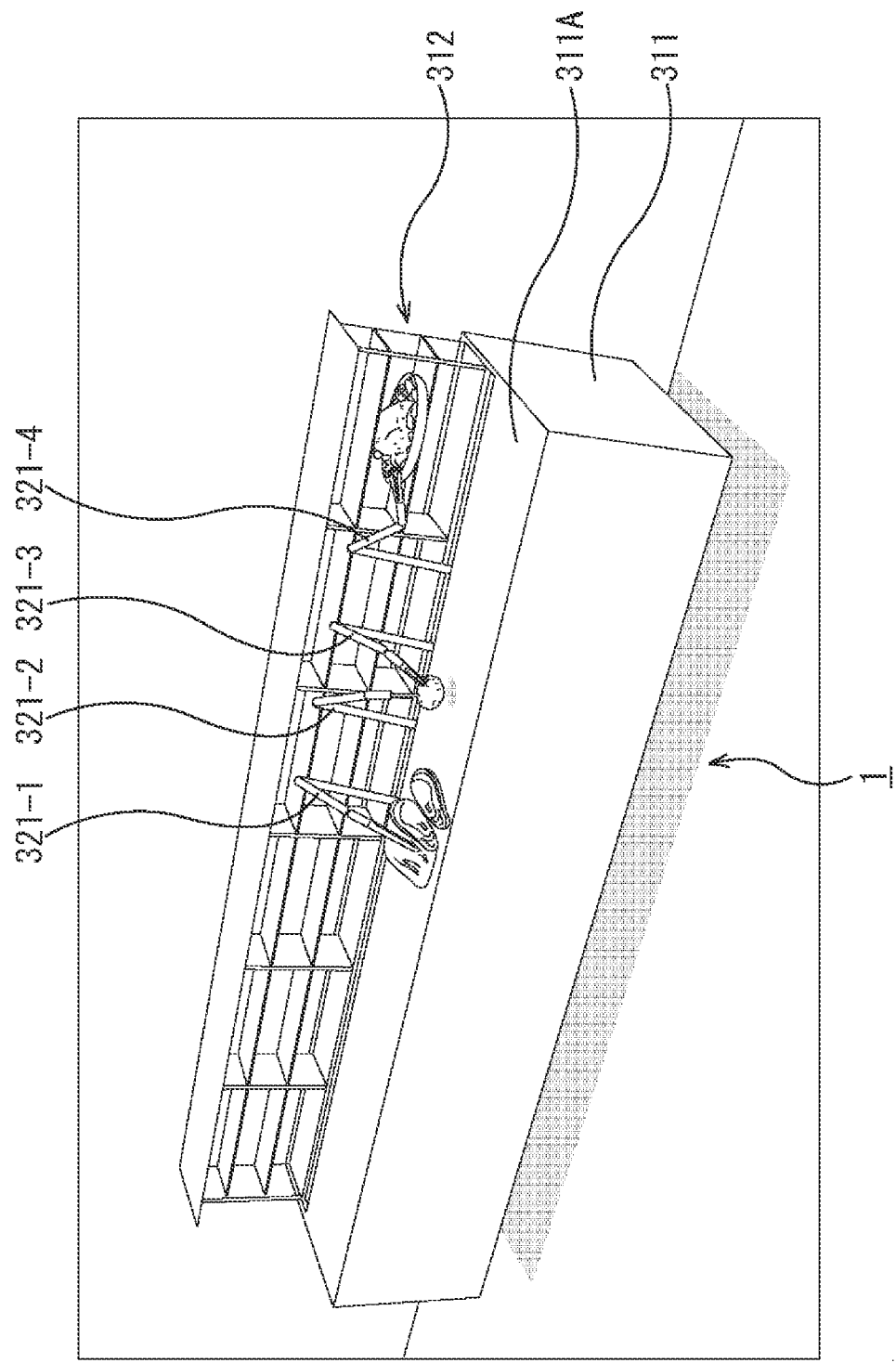
FIG. 30 is a perspective view illustrating an appearance of a cooking robot.

FIG. 30 is a perspective view illustrating an appearance of the cooking robot 1.

As illustrated in FIG. 30, the cooking robot 1 is a kitchen type robot having a housing 311 having a horizontally long rectangular parallelepiped shape. Various configurations are provided inside the housing 311 which is a main body of the cooking robot 1.

A cooking assistance system 312 is provided on the back side of the housing 311 so as to stand upright from the upper surface of the housing 311. Each space formed in the cooking assistance system 312 by being divided by a thin plate-shaped member has a function for assisting cooking by cooking arms 321-1 to 321-4, such as a refrigerator, an oven range, and storage.

A rail is provided on the top board 311A in a longitudinal direction, and the cooking arms 321-1 to 321-4 are provided on the rail. The cooking arms 321-1 to 321-4 can be changed in position along the rail as a movement mechanism.

The cooking arms 321-1 to 321-4 are robot arms formed by connecting cylindrical members by joint parts. Various operations related to cooking are performed by the cooking arms 321-1 to 321-4.

A space above the top board 311A is a cooking space in which the cooking arms 321-1 to 321-4 perform cooking.

Although four cooking arms are illustrated in FIG. 30, the number of cooking arms is not limited to four. Hereinafter, in a case where it is not necessary to distinguish each of the cooking arms 321-1 to 321-4 as appropriate, they are collectively referred to as a cooking arm 321.

Figure 31:
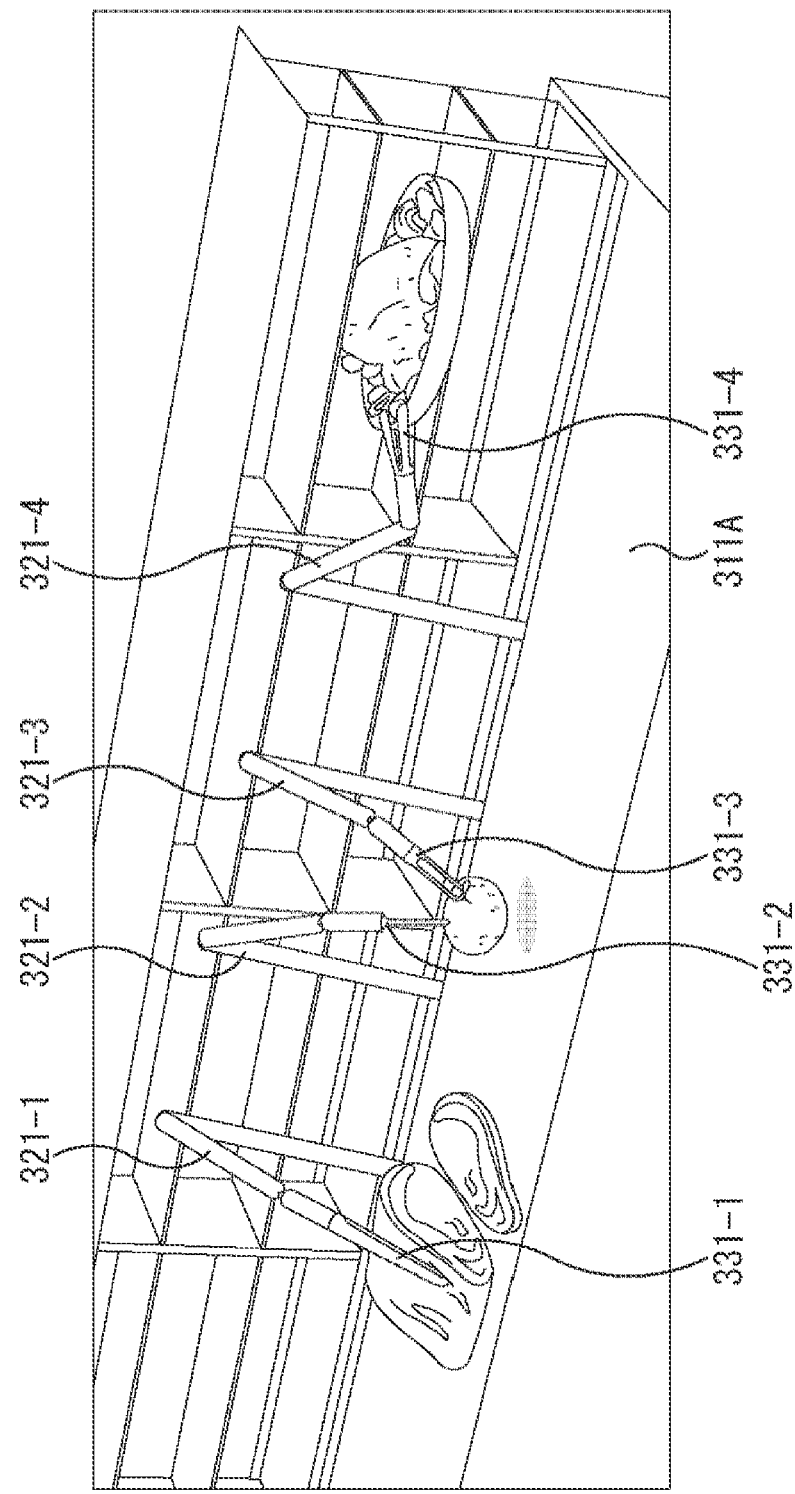
FIG. 31 is an enlarged view illustrating a state of cooking arms.

FIG. 31 is an enlarged view illustrating a state of the cooking arms 321.

As illustrated in FIG. 31, an attachment having various cooking functions is attached to the distal end of the cooking arm 321. As the attachment for the cooking arm 321, various attachments such as an attachment having a manipulator function (hand function) of gripping an ingredient, a dish, or the like, and an attachment having a knife function of cutting an ingredient are prepared.

In the example of FIG. 31, a knife attachment 331-1, which is an attachment having a knife function, is attached to the cooking arm 321-1. A lump of meat placed on the top board 311A is cut using the knife attachment 331-1.

A spindle attachment 331-2, which is an attachment used to fix the ingredient or rotate the ingredient, is attached to the cooking arm 321-2.

A peeler attachment 331-3, which is an attachment having a peeler function of peeling off the skin of the ingredient, is attached to the cooking arm 321-3.

The skin of a potato lifted by the cooking arm 321-2 using the spindle attachment 331-2 is peeled off by the cooking arm 321-3 using the peeler attachment 331-3. In this manner, the plurality of cooking arms 321 can cooperate to perform one operation.

A manipulator attachment 331-4, which is an attachment having a manipulator function, is attached to the cooking arm 321-4. A frying pan with chicken is brought into a space of the cooking assistance system 312 having an oven function by using the manipulator attachment 331-4.

Such cooking by the cooking arm 321 proceeds by appropriately replacing the attachment according to the content of operation. The attachment is automatically replaced by, for example, the cooking robot 1.

It is also possible to attach the same attachment to the plurality of cooking arms 321, such as attaching the manipulator attachment 331-4 to each of the four cooking arms 321.

The cooking by the cooking robot 1 is not only performed using the attachment as described above prepared as a tool for the cooking arm, but also appropriately performed using the same tool as a tool used by a person for cooking. For example, a knife used by a person is grasped by the manipulator attachment 331-4, and cooking such as cutting of an ingredient is performed using the knife.

Configuration of Cooking Arm

Figure 32:
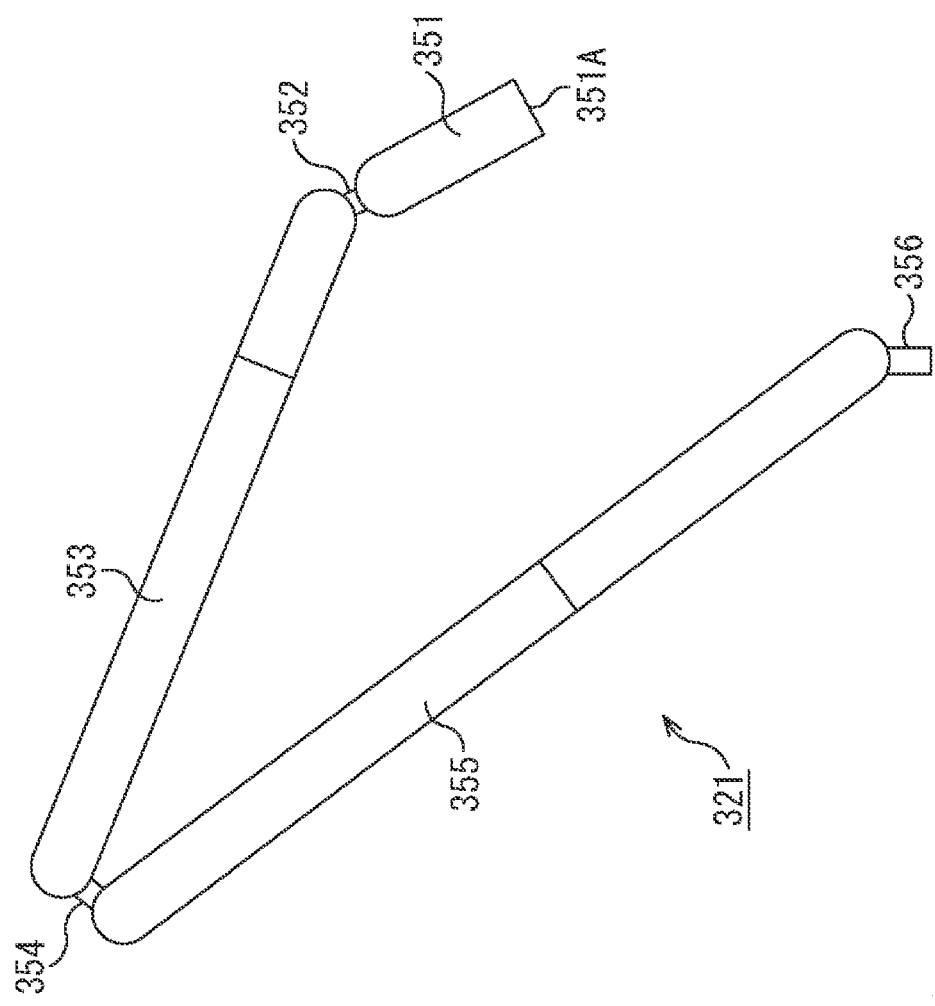
FIG. 32 is a view illustrating an appearance of a cooking arm.

FIG. 32 is a view illustrating an appearance of the cooking arm 321.

As illustrated in FIG. 32, the cooking arm 321 is generally formed by connecting thin cylindrical members with hinge parts serving as joint parts. Each hinge part is provided with a motor or the like that generates a force for driving each member.

As the cylindrical member, an attachment-detachment member 351, a relay member 353, and a base member 355 are provided in order from the distal end. The attachment-detachment member 351 is a member having a length of approximately ⅕ of the length of the relay member 353. The total length of the attachment-detachment member 351 and the relay member 353 is substantially the same as the length of the base member 355.

The attachment-detachment member 351 and the relay member 353 are connected by a hinge part 352, and the relay member 353 and the base member 355 are connected by a hinge part 354. The hinge part 352 and the hinge part 354 are provided at both ends of the relay member 353.

In this example, the cooking arm 321 includes three cylindrical members, but may include four or more cylindrical members. In this case, a plurality of relay members 353 is provided.

An attachment-detachment part 351A to and from which an attachment is attached or detached is provided at a distal end of the attachment-detachment member 351. The attachment-detachment member 351 has the attachment-detachment part 351A to and from which one of various attachments is attached or detached, and functions as a cooking function arm unit that performs cooking by operating the attachment.

An attachment-detachment part 356 to be attached to the rail is provided at a rear end of the base member 355. The base member 355 functions as a moving function arm unit that achieves movement of the cooking arm 321.

Figure 33:
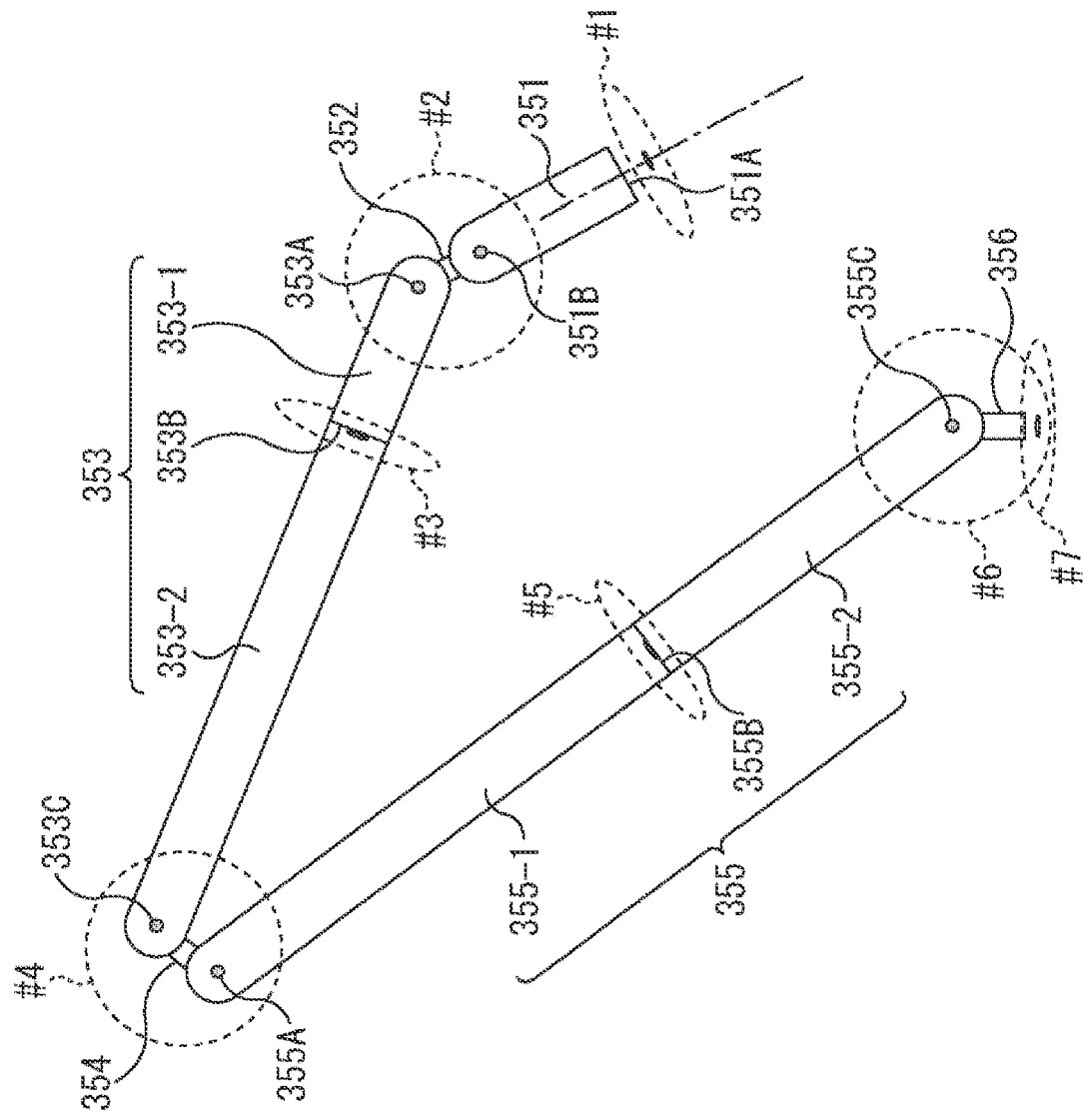
FIG. 33 is a diagram illustrating an example of a movable range of each part of the cooking arm.

FIG. 33 is a diagram illustrating an example of a movable range of each part of the cooking arm 321.

As indicated by an ellipse #1, the attachment-detachment member 351 is rotatable about a central axis of a circular cross section. A flat small circle illustrated at the center of the ellipse #1 indicates a direction of a rotation axis of an alternate long and short dash line.

As indicated by a circle #2, the attachment-detachment member 351 is rotatable about an axis passing through a fitting part 351B with the hinge part 352. Further, the relay member 353 is rotatable about an axis passing through a fitting part 353A with the hinge part 352.

Two small circles illustrated inside the circle #2 indicate directions of respective rotation axes (directions perpendicular to the paper surface). Each of the movable range of the attachment-detachment member 351 about the axis passing through the fitting part 351B and the movable range of the relay member 353 about the axis passing through the fitting part 353A is, for example, a range of 90 degrees.

The relay member 353 is configured separately by a member 353-1 on a distal end side and a member 353-2 on the rear end side. As indicated by an ellipse #3, the relay member 353 is rotatable about a central axis of a circular cross section in a connecting part 353B between the member 353-1 and the member 353-2.

The other movable parts basically have similar movable ranges.

That is, as indicated by a circle #4, the relay member 353 is rotatable about an axis passing through a fitting part 353C with the hinge part 354. Furthermore, the base member 355 is rotatable about an axis passing through a fitting part 355A with the hinge part 354.

The base member 355 is configured to be separated by a member 355-1 on the distal end side and a member 355-2 on the rear end side. As indicated by an ellipse #5, the base member 355 is rotatable about a central axis of a circular cross section in a connecting part 355B between the member 355-1 and the member 355-2.

As indicated by a circle #6, the base member 355 is rotatable about an axis passing through a fitting part 355C with the attachment-detachment part 356.

As indicated by an ellipse #7, the attachment-detachment part 356 is attached to the rail so as to be rotatable about the central axis of the circular cross section.

Thus, each of the attachment-detachment member 351 having the attachment-detachment part 351A at the distal end, the relay member 353 connecting the attachment-detachment member 351 and the base member 355, and the base member 355 to which the attachment-detachment part 356 is connected at the rear end is rotatably connected by the hinge parts. The movement of each movable part is controlled by a controller in the cooking robot 1 according to an instruction command.

Figure 34:
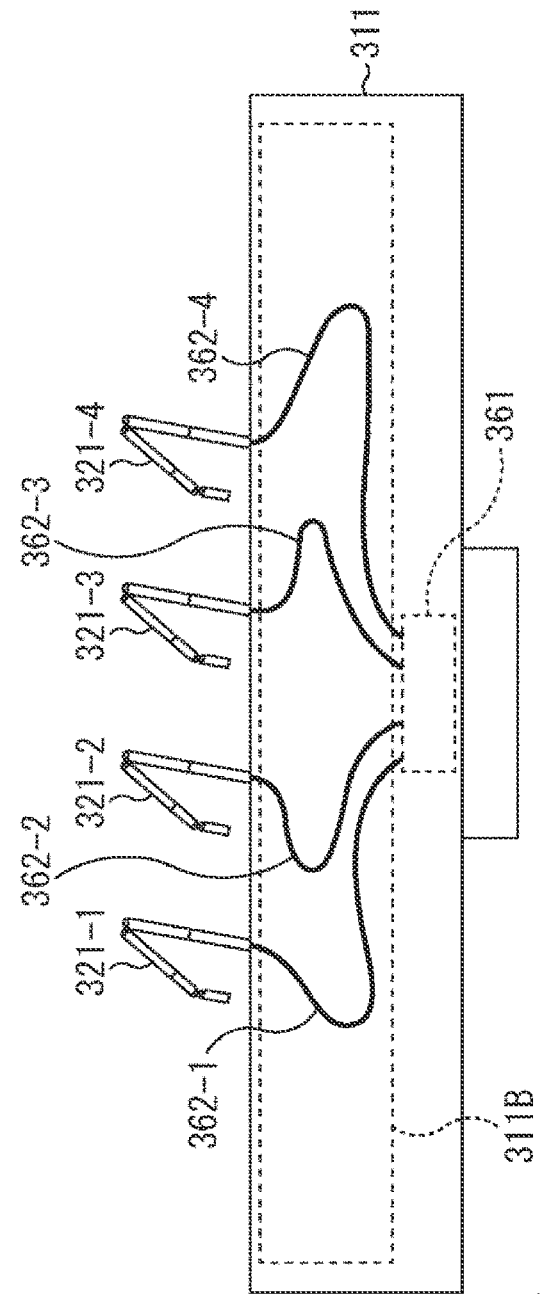
FIG. 34 is a diagram illustrating an example of connection between the cooking arms and a controller.

FIG. 34 is a diagram illustrating an example of connection between the cooking arms and the controller.

As illustrated in FIG. 34, the cooking arm 321 and a controller 361 are connected via wirings in a space 311B formed inside the housing 311. In the example of FIG. 34, the cooking arms 321-1 to 321-4 and the controller 361 are connected via wirings 362-1 to 362-4, respectively. The wirings 362-1 to 362-4 having flexibility are appropriately bent according to positions of the cooking arms 321-1 to 321-4.

Thus, the cooking robot 1 is a robot capable of performing various operations related to cooking by driving the cooking arms 321.

Configuration Around Cooking Robot 1

Figure 35:
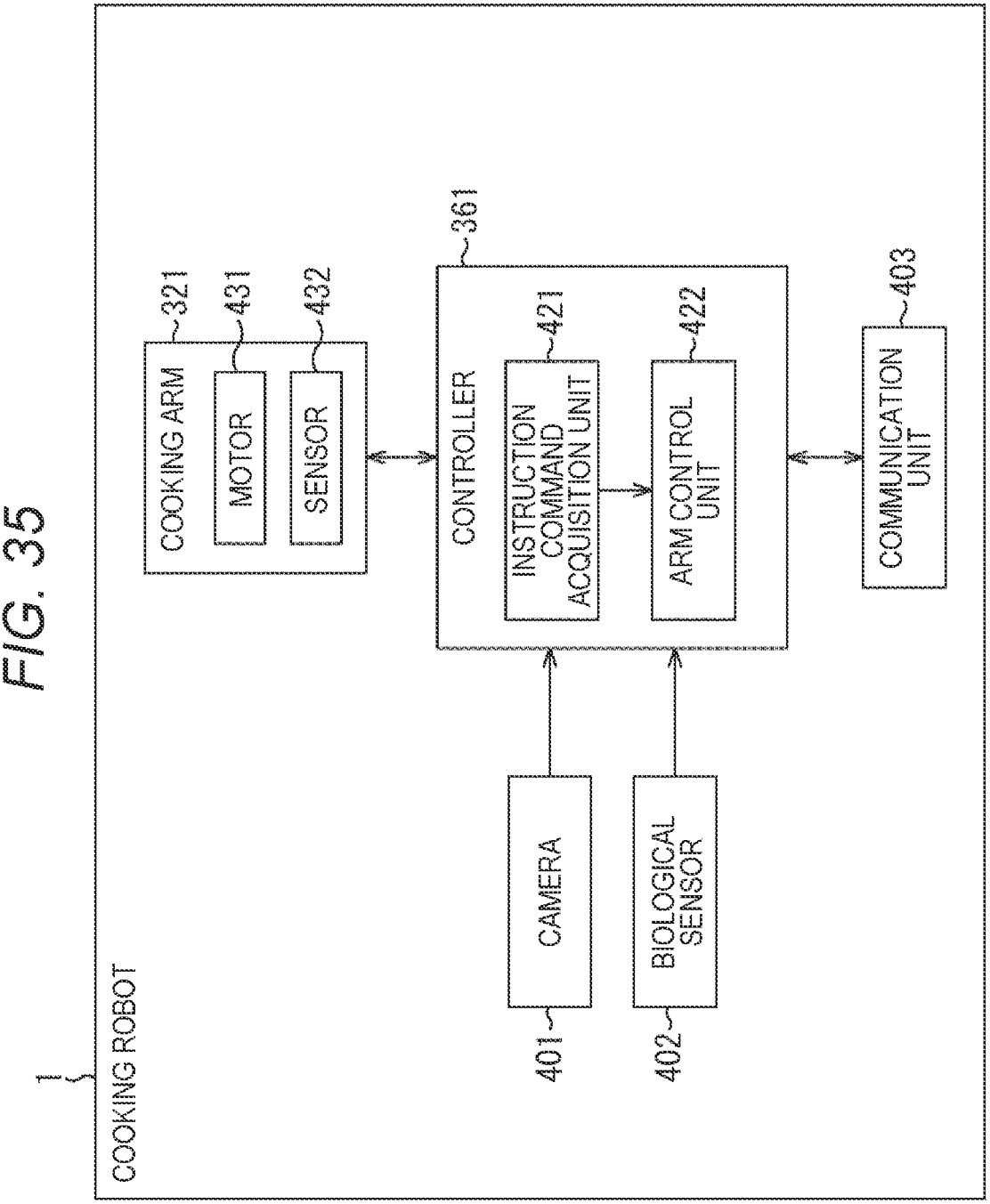
FIG. 35 is a block diagram illustrating an example of a configuration of the cooking robot and surroundings.

FIG. 35 is a block diagram illustrating an example of a configuration of the cooking robot 1 and surroundings.

The cooking robot 1 is configured by connecting each unit to the controller 361. Among components illustrated in FIG. 35, the same components as those described above are denoted by the same reference numerals. Duplicate descriptions will be omitted as appropriate.

In addition to the cooking arm 321, a camera 401, a biological sensor 402, and a communication unit 403 are connected to the controller 361.

Although not illustrated in FIG. 30 and the like, the same sensors as the sensors provided on the chef side are provided at predetermined positions of the cooking robot 1 itself or around the cooking robot 1. The camera 401 and the biological sensor 402 have functions similar to those of the camera 41 and the biological sensor 42, respectively, on the chef side.

The controller 361 includes a computer including a CPU, a ROM, a RAM, a flash memory, and the like. The controller 361 functions as a control unit that executes a predetermined program by the CPU to control an overall operation of the cooking robot 1.

In the controller 361, a predetermined program is executed to implement an instruction command acquisition unit 421 and an arm control unit 422.

The instruction command acquisition unit 421 acquires the instruction command transmitted from the control device 12 and received by the communication unit 403. The instruction command acquired by the instruction command acquisition unit 421 is supplied to the arm control unit 422.

The arm control unit 422 controls operation of the cooking arm 321 according to the instruction command acquired by the instruction command acquisition unit 421.

The camera 401 captures an image of a state of the cooking arm 321 performing the cooking operation, a state of an ingredient to be cooked, and a state on the top board 311A of the cooking robot 1, and outputs an image obtained by the capturing to the controller 361. The camera 401 is provided at various positions such as the front of the cooking assistance system 312 and the distal end of the cooking arm 321.

Furthermore, the camera 401 captures images of the state of the eating person performing tasting and the state of the eating person eating the dish, and outputs the images obtained by the capturing to the controller 361.

The biological sensor 402 is a sensor that measures the biological reaction of the eating person. The biological sensor 402 includes an electroencephalograph, a skin sensor, an electromyograph, an infrared sensor, a motion sensor, a wearable activity meter, a microphone, and the like that measure each biological reaction described above.

The biological sensor 42 transmits data indicating a measurement result of the biological reaction of the eating person to the controller 361.

The communication unit 403 is a wireless communication module such as a wireless LAN module or a portable communication module compatible with long term evolution (LTE). The communication unit 403 communicates with the control device 12 and an external device such as the recipe data management server 21 on the Internet.

Furthermore, the communication unit 403 communicates with a mobile terminal such as a smartphone or a tablet terminal used by the user. The user is a person who eats the dish reproduced by the cooking robot 1. An operation by the user on the cooking robot 1, such as selection of a dish, may be input by an operation on the mobile terminal.

As illustrated in FIG. 35, the cooking arm 321 is provided with a motor 431 and a sensor 432.

The motor 431 is provided at each joint part of the cooking arm 321. The motor 431 performs a rotational operation around an axis under control of the arm control unit 422. An encoder that measures a rotation amount of the motor 431, a driver that adaptively controls rotation of the motor 431 on the basis of a measurement result by the encoder, and the like are also provided in each joint part.

The sensor 432 includes, for example, a gyro sensor, an acceleration sensor, a touch sensor, and the like. The sensor 432 measures angular velocity, acceleration, and the like of each joint part during the operation of the cooking arm 321, and outputs information indicating a measurement result to the controller 361. Sensor data indicating a measurement result of the sensor 432 is also appropriately transmitted from the cooking robot 1 to the control device 12.

Information regarding specifications of the cooking robot 1, such as the number of cooking arms 321, is provided from the cooking robot 1 to the control device 12 at a predetermined timing. In the control device 12, planning of operation is performed according to the specifications of the cooking robot 1. The instruction command generated by the control device 12 corresponds to the specifications of the cooking robot 1.

(3-2) Configuration of Control Device 12

The control device 12 that controls the operation of the cooking robot 1 includes a computer as illustrated in FIG. 28 similarly to the data processing device 11. Hereinafter, the configuration of the data processing device 11 illustrated in FIG. 28 will be appropriately described as the configuration of the control device 12.

Figure 36:
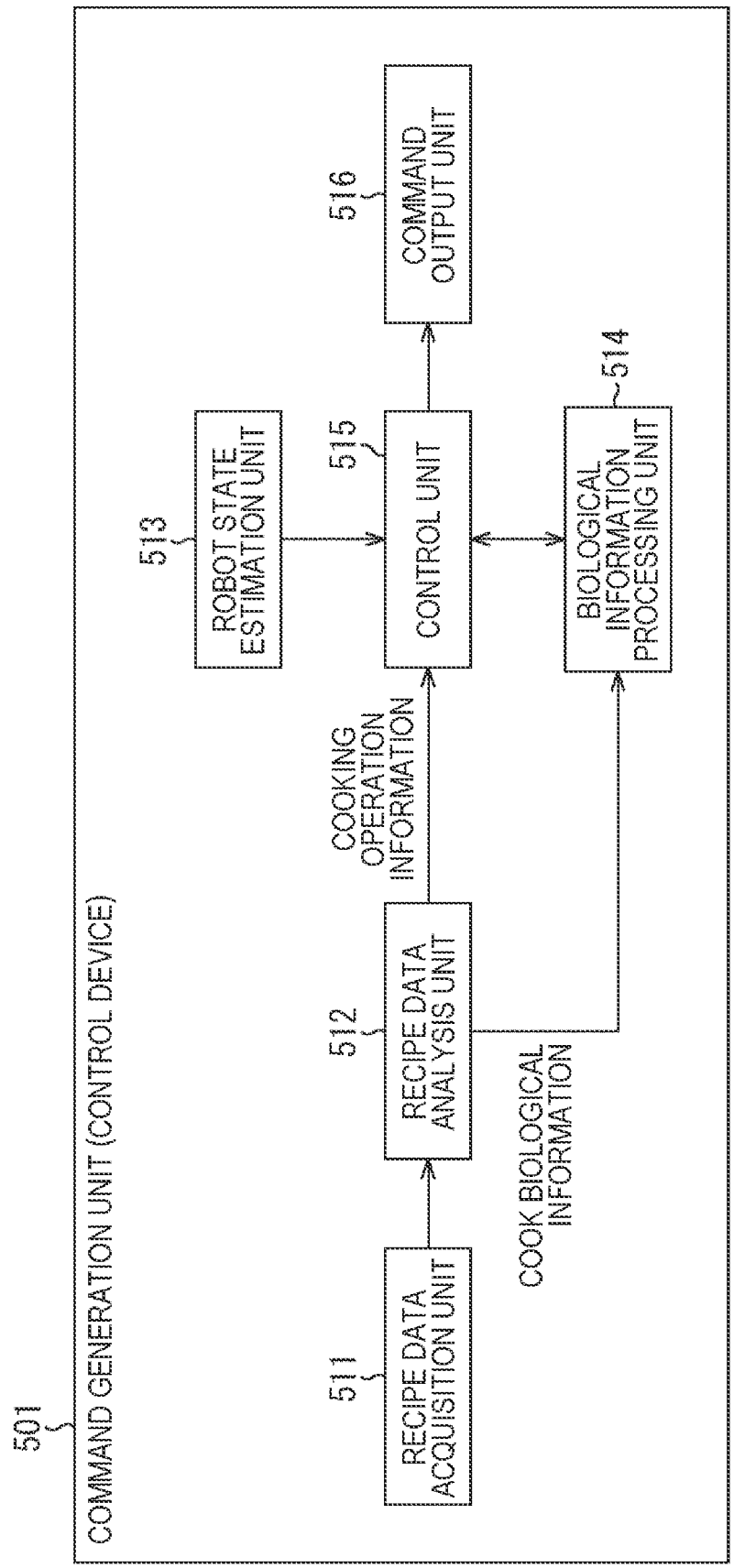
FIG. 36 is a block diagram illustrating a functional configuration example of the control device.

FIG. 36 is a block diagram illustrating a functional configuration example of the control device 12.

At least a part of the functional units illustrated in FIG. 36 is implemented by executing a predetermined program by the CPU 201 (FIG. 28) of the control device 12.

As illustrated in FIG. 36, a command generation unit 501 is implemented in the control device 12. The command generation unit 501 includes a recipe data acquisition unit 511, a recipe data analysis unit 512, a robot state estimation unit 513, a biological information processing unit 514, a control unit 515, and a command output unit 516.

The recipe data acquisition unit 511 controls the communication unit 209, and acquires the recipe data by receiving the recipe data transmitted from the data processing device 11 or by communicating with the recipe data management server 21, or the like. The recipe data acquired by the recipe data acquisition unit 511 is, for example, recipe data of a dish selected by the eating person.

Similarly, in a case where the customized recipe data is transmitted from the data processing device 11, the customized recipe data is acquired by the recipe data acquisition unit 511.

A database of recipe data may be provided in the storage unit 208. In this case, the recipe data is acquired from the database provided in the storage unit 208. The recipe data acquired by the recipe data acquisition unit 511 is supplied to the recipe data analysis unit 512.

The recipe data analysis unit 512 analyzes the recipe data acquired by the recipe data acquisition unit 511. When a timing of a certain cooking process has come, the recipe data analysis unit 512 analyzes the cooking process data set associated with the cooking process and extracts the cooking operation information and coordinator biological information. The cooking operation information extracted from the cooking process data set is supplied to the control unit 515, and the coordinator biological information is supplied to the biological information processing unit 514.

The robot state estimation unit 513 controls the communication unit 209 to receive the image and the sensor data transmitted from the cooking robot 1. The image captured by the camera of the cooking robot 1 and sensor data measured by the sensors provided at the predetermined positions of the cooking robot 1 are transmitted from the cooking robot 1 at predetermined cycles. The image captured by the camera of the cooking robot 1 illustrates the situation around the cooking robot 1.

The robot state estimation unit 513 estimates a state around the cooking robot 1 such as a state of the cooking arm 321 and a state of ingredients by analyzing the image and the sensor data transmitted from the cooking robot 1. Information indicating the state around the cooking robot 1 estimated by the robot state estimation unit 513 is supplied to the control unit 515.

The biological information processing unit 514 cooperates with the control unit 515 to control the operation of the cooking robot 1 on the basis of the cook biological information supplied from the recipe data analysis unit 512.

For example, in a case where the cook biological information to which the flavor OK flag is set is present, the biological information processing unit 514 requests the eating person to taste at a timing corresponding to the timing of tasting by the chef. As described above, in a case where tasting is performed by the chef after a certain cooking is performed, and the biological reaction of the chef at the time of tasting is determining to be delicious, the tasting is requested to the eating person at a timing after the same cooking is performed by the cooking robot 1.

In a case where the sensor data representing the biological reaction when the eating person is performing tasting is transmitted from the cooking robot 1 and received by the communication unit 209, the biological information processing unit 514 acquires the sensor data. The biological information processing unit 514 generates the eating person biological information on the basis of the acquired sensor data and transmits the eating person biological information to the data processing device 11.

The control unit 515 generates an instruction command and transmits the instruction command from the command output unit 516, to thereby control the operation of the cooking robot 1. The control of the operation of the cooking robot 1 by the control unit 515 is performed on the basis of the cooking operation information supplied from the recipe data analysis unit 512.

For example, the control unit 515 specifies an ingredient to be used in a cooking process to be executed on the basis of the ingredient information included in the cooking operation information. Furthermore, the control unit 515 specifies the cooking tool used in the cooking process and the operation to be executed by cooking arm 321 on the basis of the operation information included in the cooking operation information.

The control unit 515 sets the state in which the ingredient is ready as the goal state, and sets the operation sequence from a current state, which is a current state of the cooking robot 1, to a goal state. The control unit 515 generates an instruction command for causing each operation constituting an operation sequence to be performed, and outputs the instruction command to the command output unit 516.

In the cooking robot 1, the cooking arm 321 is controlled according to the instruction command generated by the control unit 515, and ingredients are prepared. Information indicating the state of the cooking robot 1 at each timing including the state of the cooking arm 321 is transmitted from the cooking robot 1 to the control device 12.

Furthermore, in a case where the ingredients are ready, the control unit 515 sets a state in which cooking using the prepared ingredients (cooking of one cooking process to be executed) is finished completed as the goal state, and sets an operation sequence from the current state to the goal state. The control unit 515 generates an instruction command for causing each operation constituting an operation sequence to be performed, and outputs the instruction command to the command output unit 516.

In the cooking robot 1, the cooking arm 321 is controlled according to the instruction command generated by the control unit 515, and cooking using the ingredients is performed.

The control of the operation of the cooking robot 1 by the control unit 515 is performed using, for example, the above instruction command. The control unit 515 has a function as a generation unit that generates an instruction command.

Note that the instruction command generated by the control unit 515 may be a command for giving an instruction on execution of the entire action for causing a certain state shift, or may be a command for giving an instruction on execution of a part of the action. That is, one action may be executed according to one instruction command, or may be executed according to a plurality of instruction commands.

The command output unit 516 controls the communication unit 209 and transmits the instruction command generated by the control unit 515 to the cooking robot 1.

<Operation of Cooking System>

Here, operations of the cooking system having the above configuration will be described. In the recipe data, it is assumed that the cook biological information indicating the biological reaction of the chef is associated for each cooking process.

(1) Operation on Chef Side

First, recipe data generation processing of the data processing device 11 will be described with reference to a flowchart of FIG. 37.

Figure 37:
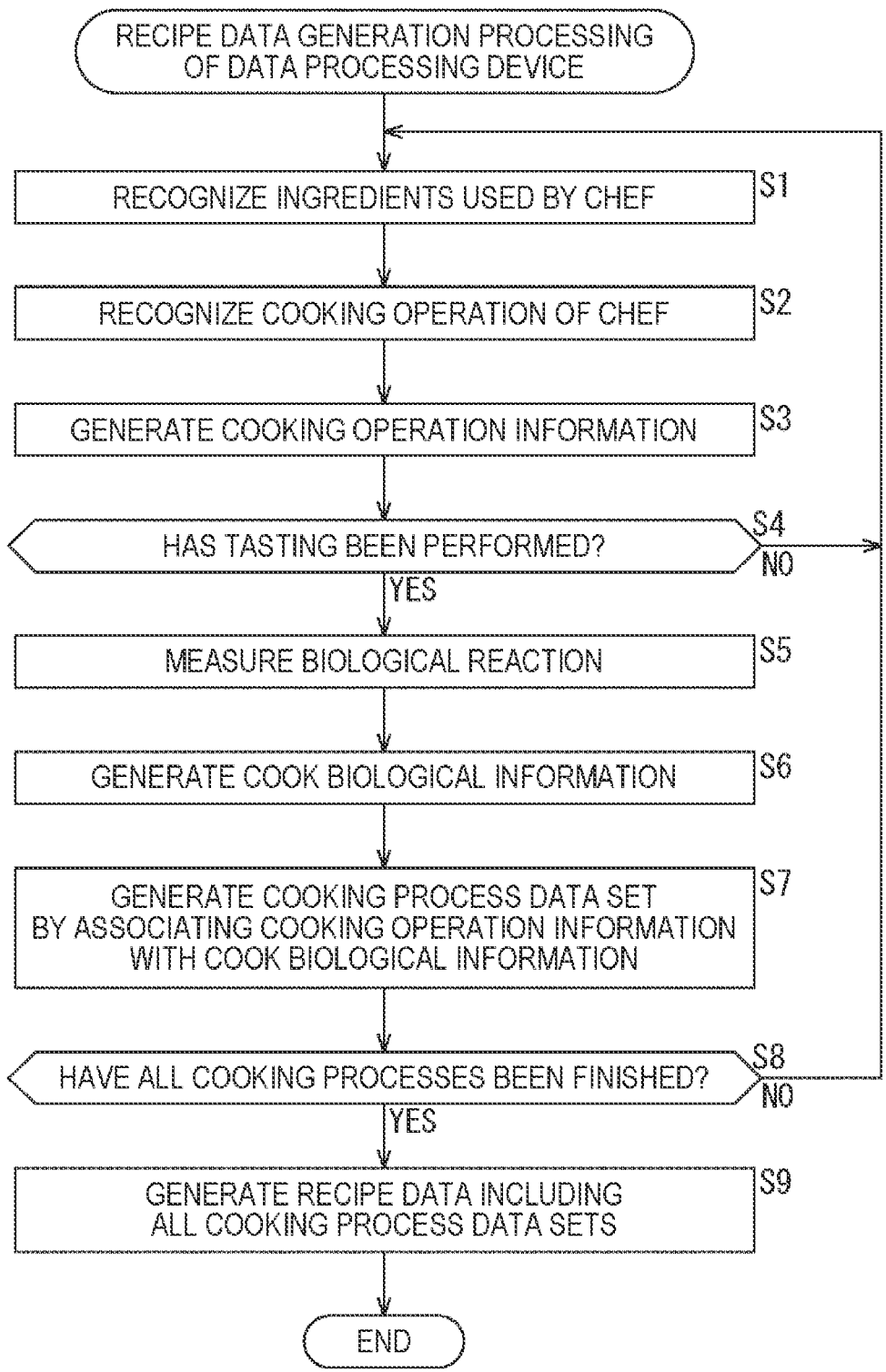
FIG. 37 is a flowchart describing recipe data generation processing of the data processing device.

The processing of FIG. 37 is started when preparation of ingredients and cooking tools is finished and the chef starts cooking. Image capturing by the camera 41, sensing by a sensor attached to the body of the chef, and the like are also started.

In step S1, the ingredient recognition unit 251 in FIG. 29 analyzes the image captured by the camera 41 and recognizes the ingredients used by the chef.

In step S2, the operation recognition unit 253 analyzes an image captured by the camera 41, sensor data representing a measurement result of the sensor attached to the body of the chef, and the like, and recognizes the cooking operation of the chef.

In step S3, the recipe data generation unit 233 generates the cooking operation information on the basis of the ingredient information generated on the basis of the recognition result by the ingredient recognition unit 251 and the operation information generated on the basis of the recognition result by the operation recognition unit 253.

In step S4, the recipe data generation unit 233 determines whether or not tasting has been performed, in a case where it is determined that tasting has not been performed, the processing returns to step S1 and repeats the above-described processing.

In a case where it is determined in step S4 that tasting has been performed, the processing proceeds to step S5.

In step S5, the cook biological information generation unit 232 controls the biological sensor 42 to measure the biological reaction of the chef. The sensor data representing a measurement result of the biological reaction of the chef is acquired by the cook biological information generation unit 232 and supplied to the recipe data generation unit 233.

In step S6, the recipe data generation unit 233 generates the cook biological information on the basis of the sensor data supplied from the cook biological information generation unit 232.

In step S7, the recipe data generation unit 233 generates the cooking process data set by associating the cooking operation information with the cook biological information.

In step S8, the recipe data generation unit 233 determines whether or not all cooking processes have been finished, and in a case where it is determined that all the cooking processes have not been finished yet, the processing returns to step S1 and repeats the above-described processing. Similar processing is repeated for the next cooking process.

In a case where it is determined in step S8 that all cooking processes have been finished, the processing proceeds to step S9.

In step S9, the recipe data generation unit 233 generates the recipe data including all the cooking process data sets.

Next, processing of the data processing device 11 for customizing recipe data will be described with reference to a flowchart of FIG. 38.

Figure 38:
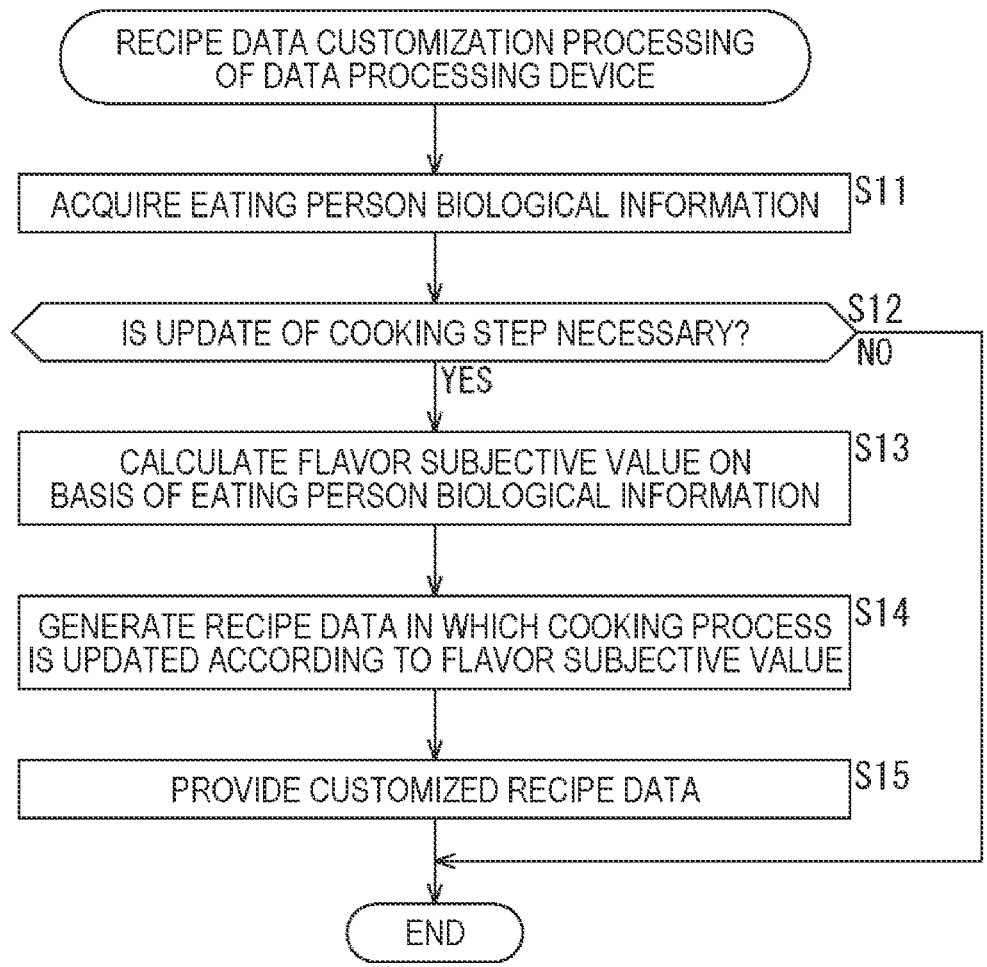
FIG. 38 is a flowchart describing recipe data customization processing of the data processing device.

The processing of FIG. 38 is started when the cooking process proceeds on the reproduction side, tasting is performed at a predetermined timing, and thereby the eating person biological information is transmitted from the control device 12.

In step S11, the eating person biological information acquisition unit 235 acquires the eating person biological information transmitted from the control device 12.

In step S12, the eating person biological information acquisition unit 235 determines whether or not it is necessary to update the cooking process on the basis of the eating person biological information.

In a case where it is determined in step S12 that the cooking process does not need to be updated because the eating person has determined that the cooked ingredients are delicious, the processing ends. In this case, the recipe data is not customized.

On the other hand, in a case where it is determined in step S12 that the cooking process needs to be updated because the eating person has not determined that the cooked ingredients are delicious, the processing proceeds to step S13.

In step S13, the recipe data generation unit 233 inputs the eating person biological information acquired by the eating person biological information acquisition unit 235 to the flavor subjective information generation model, and calculates the flavor subjective value.

In step S14, the recipe data generation unit 233 generates the recipe data in which the cooking process is updated according to how the eating person feels the flavor that is represented by the flavor subjective value.

In step S15, the recipe data generation unit 233 outputs the recipe data customized by updating the cooking process to the recipe data output unit 234 and provides the recipe data to the control device 12. In the control device 12, cooking is performed on the basis of the customized recipe data.

(2) Operation on Reproduction Side

Figure 39:
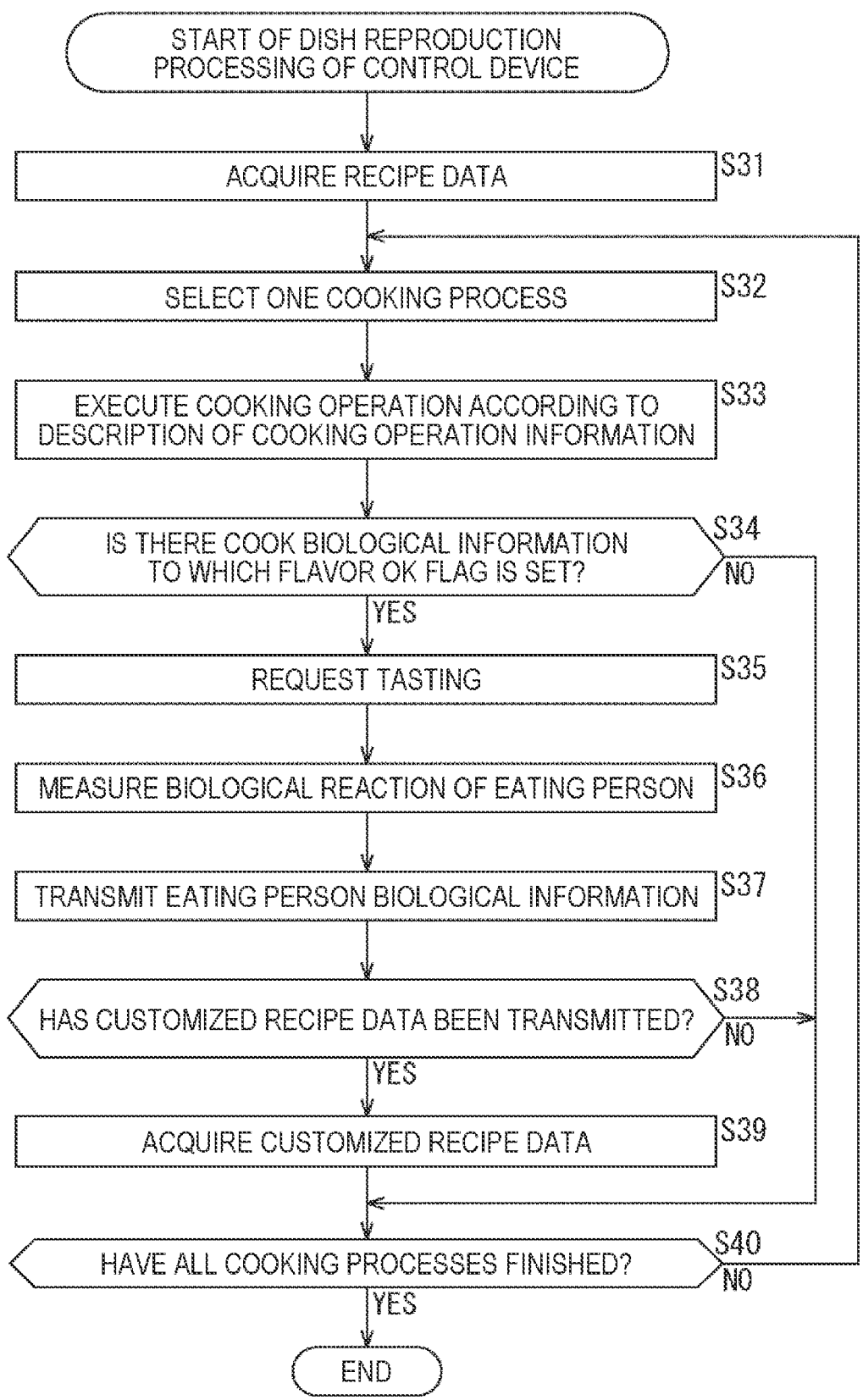
FIG. 39 is a flowchart describing dish reproduction processing of the control device.

Dish reproduction processing of the control device 12 will be described with reference to a flowchart of FIG. 39.

In step S31, the recipe data acquisition unit 511 in FIG. 36 acquires the recipe data transmitted from the data processing device 11. The recipe data acquired by the recipe data acquisition unit 511 is analyzed by the recipe data analysis unit 512, and the cooking operation information and the cook biological information are extracted. The cooking operation information is supplied to the control unit 515, and the cook biological information is supplied to the biological information processing unit 514.

In step S32, the control unit 515 selects one cooking process as an execution target. Selection as the execution target is made sequentially from the cooking process data set associated with the first cooking process.

In step S33, the control unit 515 generates an instruction command on the basis of the description of the cooking operation information and transmits the instruction command to the cooking robot 1, thereby causing the cooking arm 321 to execute the cooking operation.

In step S34, the biological information processing unit 514 determines whether or not the cook biological information to which the flavor OK flag is set is present.

In a case where it is determined in step S34 that the cook biological information to which the flavor OK flag is set is present, in step S35, the biological information processing unit 514 requests the eating person to perform tasting.

In step S36, by transmitting an instruction command, the control unit 515 causes the cooking robot 1 to measure the biological reaction when the eating person is performing tasting.

In step S37, the biological information processing unit 514 generates the eating person biological information on the basis of the sensor data transmitted from the cooking robot 1, and transmits the eating person biological information to the data processing device 11.

In the data processing device 11, the processing described with reference to FIG. 38 is performed, and the recipe data is customized as necessary. In a case where the recipe data is customized, the customized recipe data is transmitted from the data processing device 11.

In step S38, the recipe data acquisition unit 511 determines whether or not the customized recipe data has been transmitted from the data processing device 11.

In a case where it is determined in step S38 that the customized recipe data has been transmitted, in step S39, the recipe data acquisition unit 511 acquires the customized recipe data transmitted from the data processing device 11. In a case where the recipe data is customized, the subsequent processing is performed on the basis of the customized recipe data.

On the other hand, in a case where it is determined in step S34 that there is no cook biological information to which the flavor OK flag is set, the processing in steps S35 to S39 is skipped. Furthermore, in a case where it is determined in step S38 that the customized recipe data has not been transmitted, the processing in step S39 is skipped.

In step S40, the control unit 515 determines whether or not all the cooking processes have been finished, and in a case where it is determined that all the cooking processes have not been finished yet, the processing returns to step S32 and repeats the above-described processing. Similar processing is repeated for the next cooking process.

On the other hand, in a case where it is determined in step S40 that all the cooking processes have been finished, the dish is completed, and the dish reproduction processing is terminated.

By the above series of processing, a dish that is the same as the dish made by the chef and has flavor customized according to a preference of the eating person is reproduced.

The eating person can customize, according to his or her preference, the same dish as the dish made by the chef, and eat the dish.

Furthermore, the chef can customize and provide the dish that he or she has made to various people according to a preference of each person.

<Recipe Data Including Flavor Information>

Figure 40:
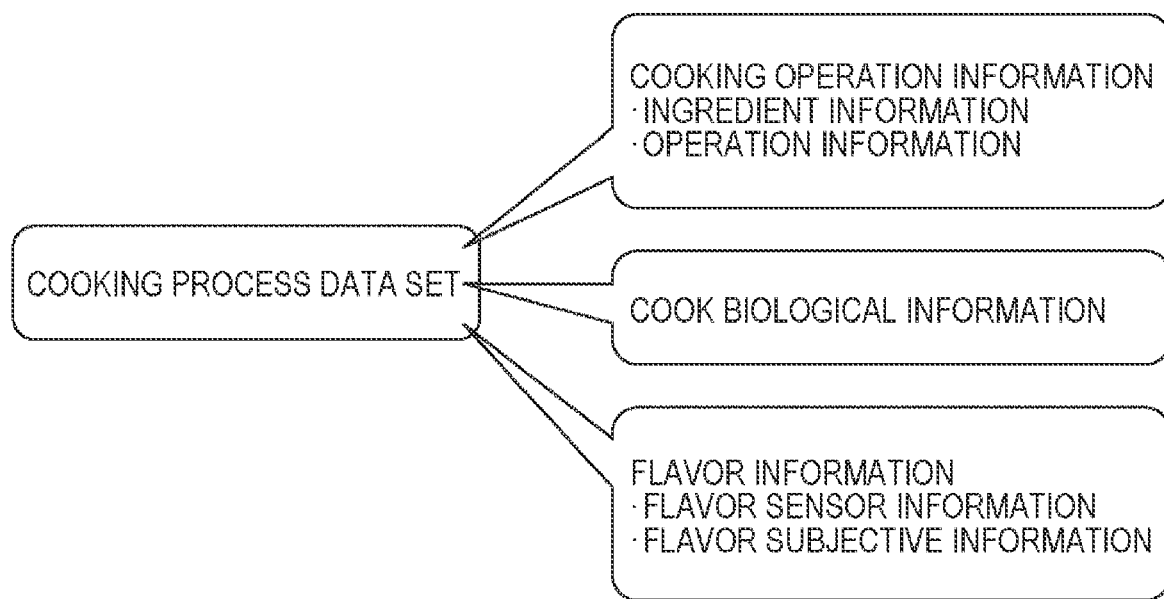
FIG. 40 is a diagram illustrating an example of information included in a cooking process data set.

FIG. 40 is a diagram illustrating an example of information included in the cooking process data set.

As illustrated in a balloon of FIG. 40, flavor information that is information regarding the flavor of ingredients may be included in the cooking process data set in addition to the cooking operation information and the cook biological information described above. Description overlapping with the above description will be appropriately omitted.

The flavor information is sensation data obtained by converting the flavor obtained as a sensation by the chef when making the dish into data. The flavor information will be described below.

As illustrated in FIG. 40, the flavor information includes flavor sensor information and flavor subjective information.

(1) Flavor Sensor Information

The flavor sensor information constituting the flavor information is sensor data obtained by measuring the flavor of an ingredient by a sensor. The sensor data obtained by measuring, with a sensor, the flavor of an ingredient that has not been cooked at all may be included in the flavor information as the flavor sensor information.

The flavor is formed by a taste, an aroma, a texture, a sensible temperature, and a color, and thus the flavor sensor information includes sensor data related to taste, sensor data related to aroma, sensor data related to texture, sensor data related to sensible temperature, and sensor data related to color. All sensor data may be included in the flavor sensor information, or any sensor data may not be included in the flavor sensor information.

The respective pieces of sensor data constituting the flavor sensor information are referred to as taste sensor data, olfactory sensor data, texture sensor data, sensible temperature sensor data, and color sensor data.

The taste sensor data is sensor data measured by the taste sensor. The taste sensor data includes at least one parameter of a saltiness sensor value, a sourness sensor value, a bitterness sensor value, a sweetness sensor value, an umami sensor value, a pungency sensor value, or an astringency sensor value.

Examples of the taste sensor include an artificial lipid membrane type taste sensor using an artificial lipid membrane as a sensor unit. The artificial lipid membrane type taste sensor is a sensor that detects a change in membrane potential caused by electrostatic interaction or hydrophobic interaction of a lipid membrane with a taste substance, which is a substance causing a taste to be sensed, and outputs the change as a sensor value.

Instead of the artificial lipid membrane type taste sensor, various devices such as a taste sensor using a polymer membrane can be used as the taste sensor as long as the device can convert each element of saltiness, sourness, bitterness, sweetness, umami, pungency, and astringency constituting the taste of food into data and output the data.

The olfactory sensor data is sensor data measured by an olfactory sensor. The olfactory sensor data includes values for each element expressing an aroma, such as a hot aroma, a fruity aroma, a grassy smell, a musty smell (cheesy), a citrus aroma, and a rose aroma.

As the olfactory sensor, for example, there is a sensor provided with an innumerable number of sensors such as crystal oscillators. The crystal oscillators will be used instead of human nose receptors. An olfactory sensor using crystal oscillators detects a change in a vibration frequency of a crystal oscillator when an aroma component collides with the crystal oscillator, and outputs a value expressing the above-described aroma on the basis of a pattern of the change in the vibration frequency.

As long as it is a device capable of outputting a value expressing an aroma instead of a sensor using a crystal vibrator, it is possible to use, as an olfactory sensor, various devices using sensors including various materials such as carbon instead of a human nose receptor.

The texture sensor data is sensor data specified by analyzing an image captured by a camera or sensor data measured by various sensors. The texture sensor data includes at least one parameter of information indicating stiffness (hardness), stickiness, viscosity (stress), cohesiveness, polymer content, moisture content, oil content, and the like.

The hardness, stickiness, viscosity, and cohesiveness are recognized, for example, by analyzing an image obtained by capturing an image of an ingredient being cooked by the chef with a camera. For example, it is possible to recognize values such as hardness, stickiness, viscosity, and cohesiveness by analyzing an image of a soup stirred by the chef. These values may be recognized by measuring stress when the chef cuts an ingredient with a kitchen knife.

The polymer content, the moisture content, and the oil content are measured by, for example, a sensor that irradiates an ingredient with light having a predetermined wavelength and analyzes reflected light to measure these values.

A database in which each ingredient is associated with each parameter of texture may be prepared, and the texture sensor data of each ingredient may be recognized with reference to the database.

The sensible temperature sensor data is sensor data obtained by measuring the temperature of the ingredient with the temperature sensor.

The color sensor data is data specified by analyzing the color of the ingredient from an image captured by a camera.

(2) Flavor Subjective Information

The flavor subjective information is information indicating how a person feels flavor subjectively, such as a chef who is cooking. The flavor subjective information is calculated on the basis of the flavor sensor information.

The flavor is formed by a taste, an aroma, a texture, a sensible temperature, and a color, and thus the flavor subjective information includes subjective information regarding a taste, subjective information regarding an aroma, subjective information regarding a texture, subjective information regarding a sensible temperature, and subjective information regarding a color. All of the subjective information regarding a taste, the subjective information regarding an aroma, the subjective information regarding a texture, the subjective information regarding a sensible temperature, and the subjective information regarding a color may be included in the flavor subjective information, or any of the subjective information may not be included in the flavor subjective information.

The respective pieces of subjective information constituting the flavor subjective information are referred to as taste subjective information, olfactory subjective information, texture subjective information, sensible temperature subjective information, and color subjective information.

Figure 41:
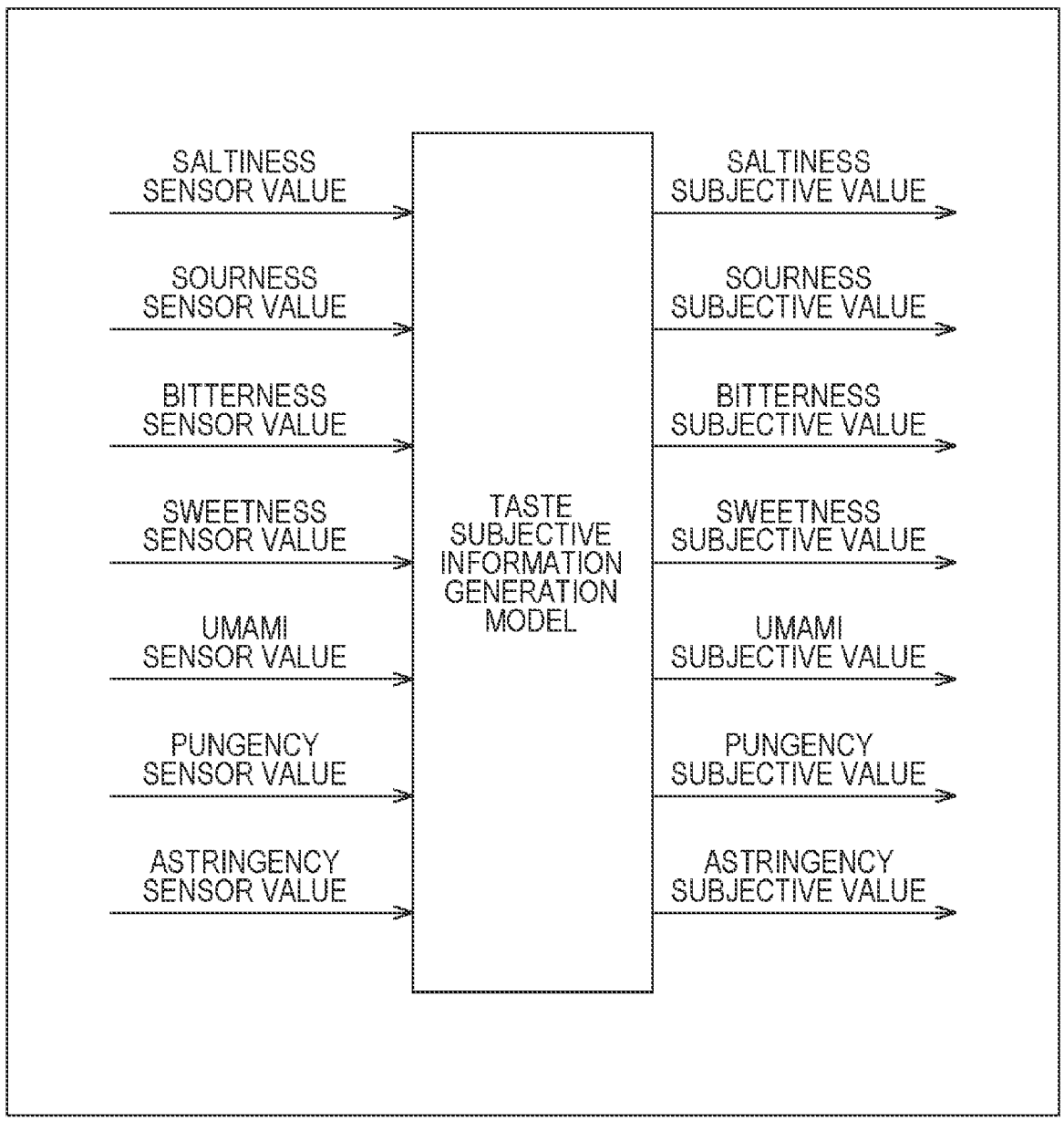
FIG. 41 is a diagram illustrating a calculation example of taste subjective information.

FIG. 41 is a diagram illustrating a calculation example of the taste subjective information.

As illustrated in FIG. 41, the taste subjective information is calculated using the taste subjective information generation model which is a model of a neural network generated by deep learning or the like. The taste subjective information generation model is generated in advance by performing learning using, for example, taste sensor data of a certain ingredient and information (numerical value) indicating how the chef who has eaten the ingredient feels a taste.

For example, as illustrated in FIG. 41, in a case where each of a saltiness sensor value, a sourness sensor value, a bitterness sensor value, a sweetness sensor value, an umami sensor value, a pungency sensor value, and an astringency sensor value, which are taste sensor data of a certain ingredient, is input, each of a saltiness subjective value, a sourness subjective value, a bitterness subjective value, a sweetness subjective value, an umami subjective value, a pungency subjective value, and an astringency subjective value is output from the taste subjective information generation model.

The saltiness subjective value is a value representing how the chef feels saltiness. The sourness subjective value is a value representing how the chef feels sourness. Similarly, the bitterness subjective value, the sweetness subjective value, the umami subjective value, the pungency subjective value, and the astringency subjective value are values representing how the chef feels bitterness, sweetness, umami, pungency, and astringency, respectively.

Similarly, other subjective information constituting the flavor subjective information is calculated using each model for generating subjective information.

That is, the olfactory subjective information is calculated by inputting olfactory sensor data to an olfactory subjective information generation model, and the texture subjective information is calculated by inputting the texture sensor data to a texture subjective information generation model. The sensible temperature subjective information is calculated by inputting sensible temperature subjective sensor data to a sensible temperature subjective information generation model, and the color subjective information is calculated by inputting the color sensor data to a color subjective information generation model.

Instead of using the neural network model, the taste subjective information may be calculated on the basis of table information in which the taste sensor data of a certain ingredient is associated with information indicating how the chef who has eaten the ingredient feels a taste. Various methods can be employed as a method of calculating the flavor subjective information using the flavor sensor information.

As described above, the recipe data is formed by linking (associating) cooking operation information, which is information regarding the cooking operation for achieving the cooking process, the cook biological information indicating the biological reaction of the cook, and the flavor information, which is information regarding the flavor of ingredients or a dish, measured in conjunction with the progress of the cooking process.

Example of Flow of Generation of Recipe Data and Reproduction of Dish

Figure 42:
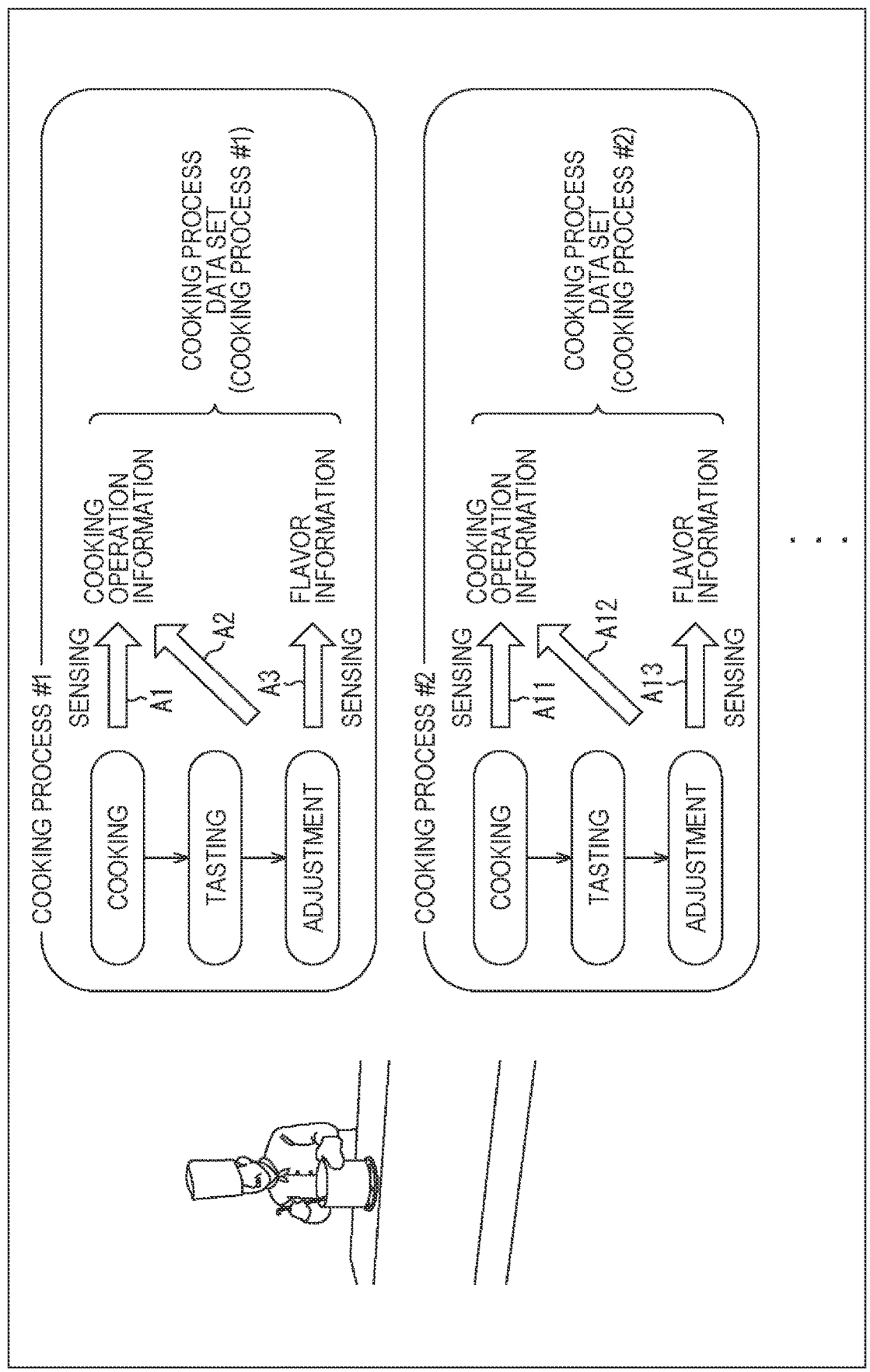
FIG. 42 is a diagram illustrating an example of a flow of generating the recipe data.

FIG. 42 is a diagram illustrating an example of a flow of generating the recipe data.

Note that in FIG. 42, illustration of processing related to the biological information is omitted. The same applies to FIG. 43.

As illustrated in FIG. 42, the cooking operation information constituting the cooking process data set is generated on the basis of sensing results obtained by sensing an operation of the chef to cook using the ingredients and an operation of the chef to adjust the flavor.

Furthermore, the flavor information is generated on the basis of a sensing result obtained by sensing the flavor of the ingredients after cooking. The above-described various sensors for measuring the flavor of the ingredients are prepared on the chef side.

In the example of FIG. 42, as indicated by arrows A1 and A2, the cooking operation information constituting the cooking process data set of the cooking process #1 is generated on the basis of sensing results of an operation of cooking performed by the chef as the cooking process #1 and an operation of the chef to adjust the flavor.

Furthermore, as indicated by an arrow A3, the flavor information constituting the cooking process data set of the cooking process #1 is generated on the basis of the sensing result of the flavor of the ingredient after cooking in the cooking process #1.

After the cooking process #1 is finished, the cooking process #2, which is the next cooking process, is performed.

Similarly, as indicated by arrows A11 and A12, the cooking operation information constituting the cooking process data set of the cooking process #2 is generated on the basis of sensing results of an operation of cooking performed by the chef as the cooking process #2 and an operation of the chef to adjust the flavor.

Furthermore, as indicated by an arrow A13, the flavor information constituting the cooking process data set of the cooking process #2 is generated on the basis of a sensing result of the flavor of the ingredient after cooking in the cooking process #2.

One dish is completed through such a plurality of cooking processes. Furthermore, the recipe data describing the cooking process data sets of the respective cooking processes is generated as the dish is completed.

Note that the unit of the cooking operation included in one cooking process can be arbitrarily set. One cooking process may include a cooking operation that does not involve tasting or adjustment of flavor after tasting, or may include only adjustment of flavor. In this case, similarly, the flavor is sensed for each cooking process, and the flavor information obtained on the basis of a sensing result is included in the cooking process data set.

The flavor sensing is not performed every time one cooking process is finished, and the timing of the flavor sensing can also be arbitrarily set. For example, the flavor sensing may be repeatedly performed during one cooking process. In this case, the cooking process data set includes time-series data of the flavor information.

Instead of including the flavor information in all the cooking process data sets, the flavor information may be included, every time the flavor is measured at an arbitrary timing, in the cooking process data set together with the information of a cooking operation performed at that timing.

Figure 43:
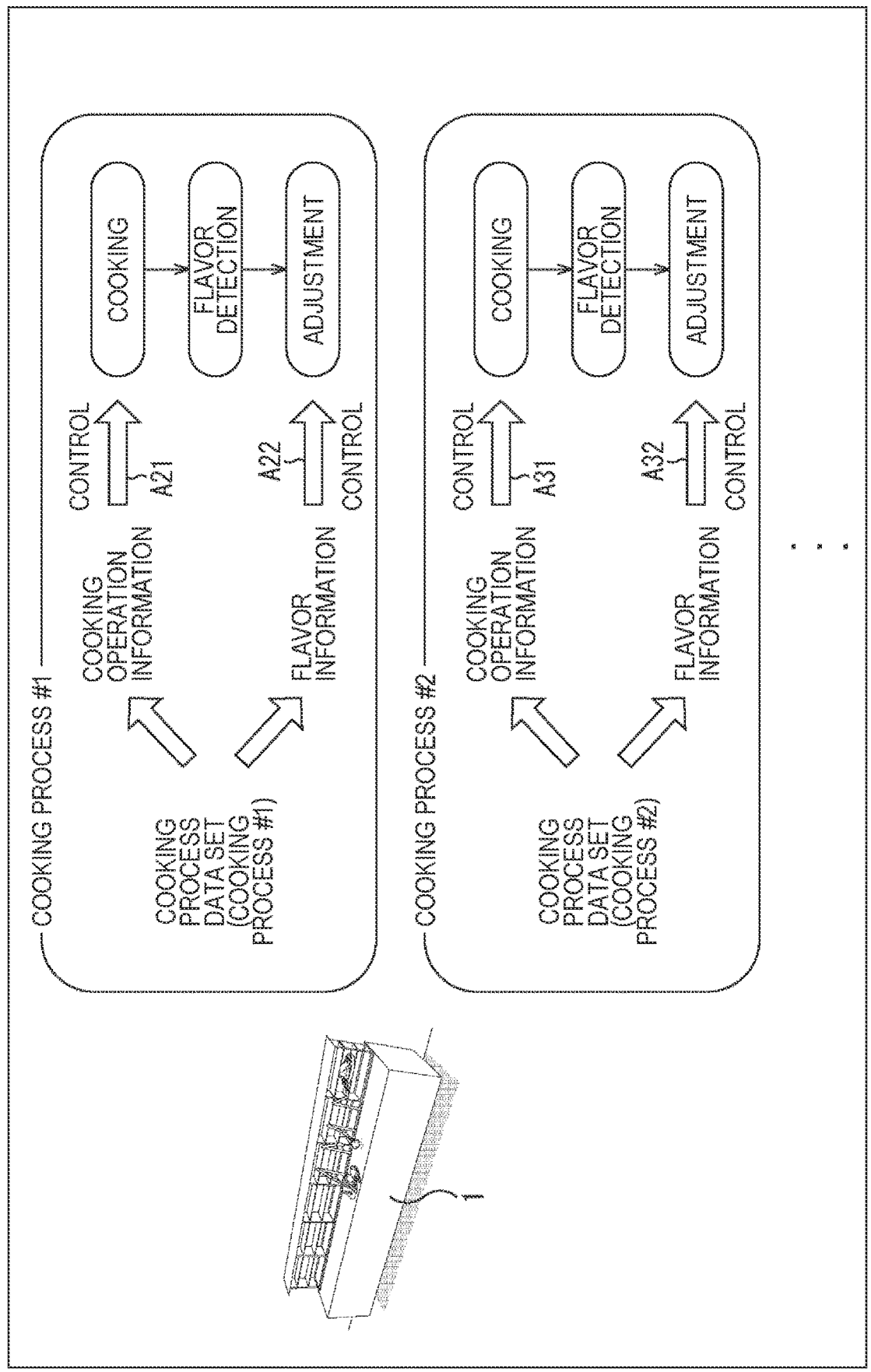
FIG. 43 is a diagram illustrating an example of a flow of reproduction of a dish based on the recipe data.

FIG. 43 is a diagram illustrating an example of a flow of reproduction of a dish based on the recipe data.

As illustrated in FIG. 43, reproduction of the dish by the cooking robot 1 is performed by repeating, for each cooking process, performing cooking on the basis of the cooking operation information included in the cooking process data set described in the recipe data, measuring the flavor of the ingredient after cooking, and adjusting the flavor. Various sensors for measuring the flavor of the ingredient are also prepared on the cooking robot 1 side.

The adjustment of the flavor is performed, for example, by applying an operation so that a flavor measured by a sensor prepared on the cooking robot 1 side approaches the flavor indicated by the flavor information.

The measurement and adjustment of the flavor may be repeated multiple times in one cooking process, for example. That is, every time the adjustment is performed, the flavor is measured for the ingredient after adjustment, and the flavor is adjusted on the basis of a measurement result.

In the example of FIG. 43, as indicated by an arrow A21, the cooking operation of the cooking robot 1 is controlled on the basis of the cooking operation information constituting the cooking process data set of the cooking process #1, and the same operation as the operation of the cooking process #1 of the chef is performed by the cooking robot 1.

After the cooking robot 1 performs the same operation as the operation of the cooking process #1 by the chef, the flavor of the ingredient after cooking is measured, and adjustment of the flavor of the cooking robot 1 is controlled on the basis of the flavor information constituting the cooking process data set of the cooking process #1 as indicated by an arrow A22.

In a case where the flavor measured by the sensor prepared on the cooking robot 1 side matches the flavor indicated by the flavor information, the adjustment of the flavor is ended, and the cooking process #1 is also ended. For example, not only in the case where the flavor completely matches, but also in a case where the flavor measured by the sensor prepared on the cooking robot 1 side and the flavor indicated by the flavor information are similar by a threshold or more, it is determined that the two match.

After the cooking process #1 is finished, the cooking process #2, which is the next cooking process, is performed.

Similarly, as indicated by an arrow A31, the cooking operation of the cooking robot 1 is controlled on the basis of the cooking operation information constituting the cooking process data set of the cooking process #2, and the same operation as the operation of the cooking process #2 of the chef is performed by the cooking robot 1.

After the cooking robot 1 performs the same operation as the operation of the cooking process #2 by the chef, the flavor of the ingredient after cooking is measured, and adjustment of the flavor of the cooking robot 1 is controlled on the basis of the flavor information constituting the cooking process data set of the cooking process #2 as indicated by an arrow A32.

In a case where the flavor measured by the sensor prepared on the cooking robot 1 side matches the flavor indicated by the flavor information, the adjustment of the flavor is ended, and the cooking process #2 is also ended.

Through such a plurality of cooking processes, the dish made by the chef is reproduced by the cooking robot 1.

Since the cooking by the cooking robot 1 is performed by adjusting the flavor for each cooking process, the finally completed dish is a dish having the same or close flavor as the dish made by the chef. In this manner, a dish having the same flavor as the dish made by the chef is reproduced on the basis of the recipe data.

For example, the chef can provide a dish having the same flavor as the dish that he or she has made to a person who cannot visit the restaurant that he or she manages. Furthermore, the chef can leave the dish that he or she makes as the recipe data in a reproducible form.

On the other hand, a person who eats the dish reproduced by the cooking robot 1 can eat a dish having the same flavor as the dish made by the chef.

Figure 44:
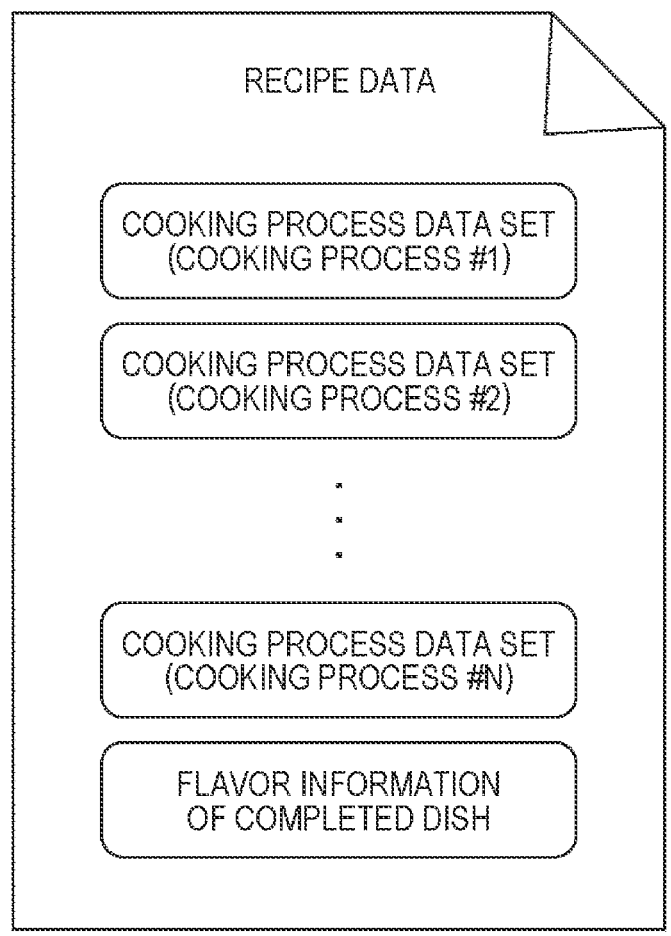
FIG. 44 is a diagram illustrating an example of description contents of the recipe data.

FIG. 44 is a diagram illustrating another example of description contents of the recipe data.

As illustrated in FIG. 44, the flavor information regarding the flavor of a completed dish may be included in the recipe data. In this case, the flavor information regarding the flavor of the completed dish is linked to the entire cooking operation information.

Thus, the association relationship between the cooking operation information and the flavor information does not need to be one-to-one.

Modification Example

Although the customization of the recipe data is performed on the basis of the biological reaction of the eating person, the customization may be performed on the basis of other information regarding the eating person.

For example, it is possible to customize the recipe data on the basis of the attribute of the eating person such as age, gender, nationality, and living area. In a case where the recipe data is customized on the basis of nationality, recipe data for each nationality is generated, such as recipe data for people of Japanese nationality, recipe data for people of American nationality, and recipe data for people of French nationality.

Information of sound related to cooking on the chef side may be included in the recipe data as the environment information. The sounds related to cooking include a sound when an ingredient is cut with a knife, a sound when ingredients are boiled in a pot, and the like.

Modification Example of Configuration

Although the cooking robot that reproduces a dish on the basis of the recipe data is the cooking robot 1 installed at home, the dish may be reproduced by the cooking robot provided in various places. For example, the above-described technique is also applicable to a case where a dish is reproduced by a cooking robot provided in a factory or a cooking robot provided in a restaurant.

Furthermore, the cooking robot that reproduces a dish on the basis of the recipe data is assumed to be the cooking robot 1 that operates the cooking arm to perform cooking, but the dish may be reproduced by various cooking robots that can cook ingredients by a configuration other than the cooking arm.

In the above description, control of the cooking robot 1 is performed by the control device 12, but may be directly performed by the data processing device 11 that generates the recipe data. In this case, the data processing device 11 is provided with each configuration of the command generation unit 501 described with reference to FIG. 36.

Furthermore, each configuration of the command generation unit 501 may be provided in the recipe data management server 21.

The server function of the recipe data management server 21 that manages the recipe data and provides the recipe data to another device may be provided in the data processing device 11 that generates the recipe data.

Figure 45:
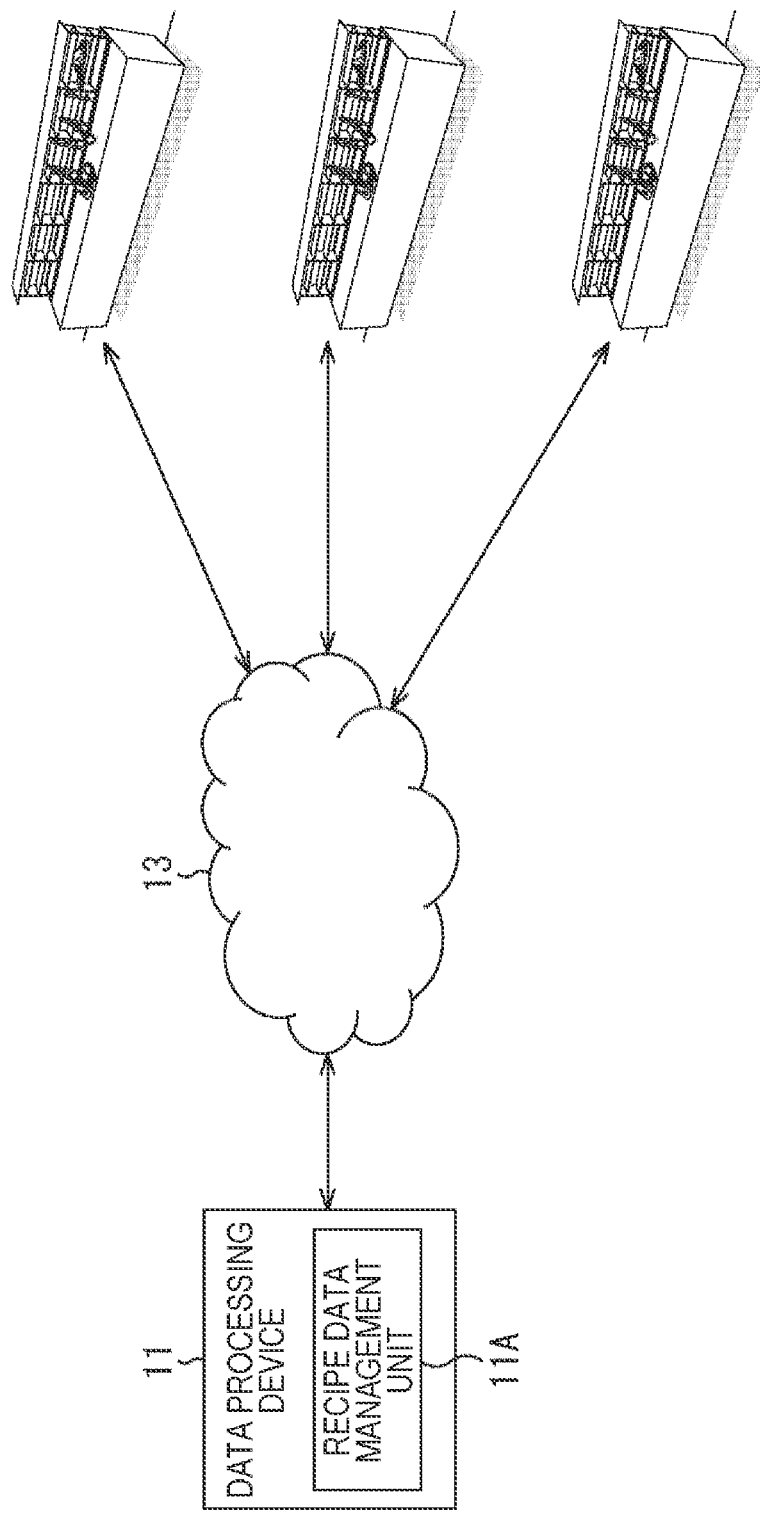
FIG. 45 is a diagram illustrating another configuration example of the cooking system.

FIG. 45 is a diagram illustrating another configuration example of the cooking system.

A recipe data management unit 11A included in the data processing device 11 has a server function of managing the recipe data and providing the recipe data to another device. The recipe data managed by the recipe data management unit 11A is provided to a plurality of cooking robots and a control device that controls the cooking robot.

Data Management

The recipe data, the cooking process data sets (the cooking operation information and the flavor information), and the like described above can be considered as works since they can be said to be products that creatively express ideas and emotions regarding the cooking process.

For example, the chef who performs cooking (for example, a chef who runs a famous restaurant) completes a delicious dish with creativity while repeating trials such as selection of ingredients and tasting in the cooking process. In this case, there is a value as data in the recipe data and the cooking process data sets (the cooking operation information and the flavor information), and a situation where others need to pay the value when using them can be assumed.

Therefore, an application example is also conceivable in which copyright management of the recipe data, the cooking process data sets (the cooking operation information and the flavor information), and the like is performed similarly to that for music and the like.

That is, in the present disclosure, it is also possible to protect individual recipe data and cooking process data sets by using a copyright protection technology such as copy prevention, encryption, or the like that provides a protection function for individual data.

In this case, for example, the recipe data management server 21 of FIG. 25 (the data processing device 11 of FIG. 45) manages the chef and the recipe data (or the cooking process data sets) in a state that copyright is managed in a form that the chef and the recipe data are associated with each other.

Next, in a case where the user desires to cause the cooking robot 1 to perform cooking using the recipe data, the user pays a usage fee for this recipe data, and thus, for example, the recipe data downloaded to the control device 12 can be used for cooking in the cooking robot 1. Note that the usage fee is returned to a chef who is the creator of the recipe data, a data manager who manages the recipe data, and the like.

Furthermore, in the present disclosure, it is also possible to protect individual recipe data and cooking process data sets by using a blockchain technology in which a transaction history of data is managed in a distributed manner as a ledger by a server.

In this case, for example, the recipe data management server 21 of FIG. 25 (the data processing device 11 of FIG. 45) manages the chef and the recipe data (or the cooking process data sets) in the associated form using the blockchain technology in which a transaction history of data is managed in a distributed manner as a ledger by a server (cloud server, edge server, or the like).

Next, in a case where the user desires to cause the cooking robot 1 to perform cooking using the recipe data, the user pays a usage fee for this recipe data, and thus, for example, the recipe data downloaded to the control device 12 can be used for cooking in the cooking robot 1. Note that the usage fee is returned to a chef who is the creator of the recipe data, a data manager who manages the recipe data, and the like.

Thus, it is possible to efficiently manage the recipe data (or the cooking process data sets) as a work expressed in a creative form in consideration of each relationship among the chef, the user, and the usage fee.

Regarding Program

The series of processes described above can be executed by hardware or can be executed by software. In a case where the series of processing is executed by software, a program constituting the software is installed on a computer built into dedicated hardware, a general-purpose personal computer, or the like.

The program to be installed is provided by being recorded in the removable medium 211 illustrated in FIG. 28 including an optical disk (compact disc-read only memory (CD-ROM), digital versatile disc (DVD), or the like), a semiconductor memory, and the like. Furthermore, the information may be provided via a wired or wireless transmission medium such as a local area network, the Internet, or digital broadcasting. The program can be installed in the ROM 202 or the storage unit 208 in advance.

The program executed by the computer may be a program for processing in time series in the order described in the present description, or a program for processing in parallel or at a necessary timing such as when a call is made.

Note that in the present description, a system means a set of a plurality of components (devices, modules (parts), and the like), and it does not matter whether or not all the components are in the same housing. Therefore, both of a plurality of devices housed in separate housings and connected via a network and a single device in which a plurality of modules is housed in one housing are systems.

The effects described herein are merely examples and are not limited, and other effects may be provided.

The embodiments of the present technology are not limited to the above-described embodiments, and various modifications are possible without departing from the gist of the present technology.

For example, the present technology can employ a configuration of cloud computing in which one function is shared by a plurality of devices via a network and processed jointly.

Furthermore, each step described in the above-described flowcharts can be executed by one device, or can be executed in a shared manner by a plurality of devices.

Moreover, in a case where a plurality of processes is included in one step, the plurality of processes included in the one step can be executed in a shared manner by a plurality of devices in addition to being executed by one device.

REFERENCE SIGNS LIST

1 Cooking robot
11 Data processing device
12 Control device
21 Recipe data management server
41 Camera
42 Biological sensor
221 Data processing unit
231 Cooking operation information generation unit
232 Cook biological information generation unit
233 Recipe data generation unit
234 Recipe data output unit
235 Eating person biological information acquisition unit
321 Cooking arm
361 Controller
401 Camera
402 Biological sensor
403 Communication unit
501 Command generation unit
511 Recipe data acquisition unit
512 Recipe data analysis unit
513 Robot state estimation unit
514 Biological information processing unit
515 Control unit
516 Command output unit

The invention claimed is:

1. A data processing system comprising:
at least one sensor configured to measure cook biological data of a cook during a cooking process and during a tasting process; and
circuitry configured to
acquire sensor data from the at least one sensor including the cook biological data indicating a measurement result of a biological reaction of the cook,
generate recipe data including a data set used when a cooking robot including at least one cooking arm performs a cooking operation, the data set linking cooking operation data in which information regarding an ingredient of a dish and information regarding an operation of the cook in the cooking process using the ingredient are described, and the cook biological data indicating the biological reaction of the cook measured in relation to the ingredient and in conjunction with progress of the cooking process, adjust the cooking operation data used during subsequent control of the cooking robot to perform the cooking operation using the ingredient according to the cook biological data, and output the generated recipe data including the adjusted cooking operation data to the cooking robot, wherein the cook biological data is measured during the tasting process and relates to a determination of a flavor of the ingredient following an initial cooking process using the ingredient, wherein the circuitry acquires the cook biological data from a biological sensor configured to measure the biological reaction of the cook during the tasting process, and wherein the cook biological data is linked to each tasting process in which it is determined that content of the cook biological data satisfies a predetermined condition.

2. The data processing system according to claim 1, wherein the cook biological data is linked with sensation data indicating a sensation of the cook measured in conjunction with the progress of each cooking process.

3. The data processing system according to claim 1, wherein the cook biological data includes electroencephalogram data indicating a state of an electroencephalogram of the cook.

4. The data processing system according to claim 1, wherein the cook biological data includes face state data indicating a state of a face of the cook.

5. The data processing system according to claim 1, wherein the cook biological data includes heart rate data indicating a state of a heart rate of the cook.

6. The data processing system according to claim 1, wherein the cook biological data includes pupil data indicating a state of a pupil of the cook.

7. The data processing system according to claim 1, wherein the circuitry updates the recipe data in accordance with eating person biological data indicating a biological reaction of each of one or more eating persons acquired from a biological sensor while the one or more eating persons are eating the dish cooked by the cooking robot.

8. The data processing system according to claim 7, wherein the circuitry generates the recipe data for each of the one or more eating persons by updating the cooking process for each of the eating persons.

9. The data processing system according to claim 7, wherein the circuitry generates the recipe data for at least one attribute of the one or more eating persons by updating the cooking process for each attribute, the at least one attribute of the one or more eating persons includes at least one of an age, a gender, a nationality, or a living area.

10. The data processing system according to claim 7, wherein the eating person biological data is data indicating a reaction when the eating person has had a meal.

11. The data processing system according to claim 7, wherein the eating person biological data is data indicating a state of a voice when the eating person has had a meal.

12. The data processing system according to claim 7, wherein the eating person biological data is data indicating a state of an electromyogram of a body when the eating person has had a meal.

13. The data processing system according to claim 1, wherein the circuitry is further configured to generate an instruction command that gives an instruction on each cooking operation to be executed by the cooking robot based on a basis of the generated recipe data including the adjusted cooking operation data.

14. The data processing system according to claim 13, wherein the cooking robot includes a plurality of arms.

15. The data processing system according to claim 14, wherein the cooking robot performs a cooking operation by causing the plurality of the arms to cooperate according to the instruction command.

16. The data processing system according to claim 1, wherein the circuitry is further configured to implement a server function that manages the recipe data and provides the recipe data to the cooking robot connected via a network.

17. A data processing method, executed by a data processing device, the method comprising:

acquiring sensor data from at least one sensor configured to measure cook biological data of a cook during a cooking process and during a tasting process, the cook biological data indicating a measurement result of a biological reaction of the cook;

generating recipe data including a data set used when a cooking robot including at least one cooking arm performs a cooking operation, the data set linking cooking operation data in which information regarding an ingredient of a dish and information regarding an operation of the cook in the cooking process using the ingredient are described, and the cook biological data indicating the biological reaction of the cook measured in relation to the ingredient and in conjunction with progress of the cooking process;

adjusting the cooking operation data used during subsequent control of the cooking robot to perform the cooking operation using the ingredient according to the cook biological data; and outputting the generated recipe data including the adjusted cooking operation data to the cooking robot, wherein the cook biological data is measured during the tasting process and relates to a determination of a flavor of the ingredient following an initial cooking process using the ingredient, wherein the cook biological data is acquired from a biological sensor configured to measure the biological reaction of the cook during the tasting process, and wherein the cook biological data is linked to each tasting process in which it is determined that content of the cook biological data satisfies a predetermined condition.

* * * * *